(12) United States Patent
Wooten et al.

(10) Patent No.: US 7,212,326 B2
(45) Date of Patent: May 1, 2007

(54) OPTICAL EXTERNAL MODULATOR

(75) Inventors: Ed Wooten, Windsor, CT (US); Karl Kissa, West Simsbury, CT (US); Gregory J. McBrien, Glastonbury, CT (US); Timothy C. Munks, North Granby, CT (US); Andrew Finch, Avon, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 26 days.

(21) Appl. No.: 11/223,553

(22) Filed: Sep. 9, 2005

(65) Prior Publication Data

US 2006/0056002 A1 Mar. 16, 2006

Related U.S. Application Data

(63) Continuation-in-part of application No. 10/852,704, filed on May 24, 2004, now Pat. No. 6,961,166.

(60) Provisional application No. 60/474,771, filed on May 30, 2003.

(51) Int. Cl.
*G02F 1/03* (2006.01)
*G02F 1/00* (2006.01)

(52) U.S. Cl. .................. 359/245; 359/237; 359/279; 385/2; 385/3; 385/14

(58) Field of Classification Search ............ 359/237, 359/238, 239, 241, 245, 279; 385/1, 2, 3, 385/8, 14, 15; 356/345; 398/98, 182, 188; 324/96

See application file for complete search history.

(56) References Cited

U.S. PATENT DOCUMENTS 4,505,587 A 3/1985 Haus et al. .............. 356/345

5,101,450 A 3/1992 Olshansky ..................... 385/3
5,148,503 A 9/1992 Skeie .......................... 385/3
5,161,044 A 11/1992 Nazarathy et al. .......... 359/157

(Continued)

FOREIGN PATENT DOCUMENTS

EP 0496298 6/1992

OTHER PUBLICATIONS

W. K. Burns, et al., "Broad-band reflection traveling-wave LiNbO3 modulator," IEEE Photonics Technology Letters, vol. 10, pp. 805-806, 1998.
W. K. Burns, et al., "Broad-band Unamplified optical link with RF gain using a LiNbO3 modulator," IEEE Photonics Technology Letters, vol. 11, pp 1656-1658, 1999.
G. E. Betts, et al., "Microwave analog optical links using suboctave linerized modulators," IEEE Photonics Technology Letters, vol. 8, pp. 1273-1275, 1996.

(Continued)

*Primary Examiner*—Ricky Mack
*Assistant Examiner*—Tuyen Tra
(74) *Attorney, Agent, or Firm*—Allen, Dyer, Doppelt, Milbrath & Gilchrist, P.A.

(57) ABSTRACT

An optical external modulator includes an optical waveguide having a first interferometer section and a second interferometer section formed on an electro-optic substrate. An electrode structure disposed on the substrate transmits an RF drive signal that is applied to the first and second interferometer sections in series. A reflector optically coupled to the substrate redirects light away from the first interferometer section to the second interferometer section and provides an optical fold region that introduces an optical time delay between the first and second interferometer sections. The optical time delay is used for at least partially compensating for a velocity mismatch between the light and the RF drive signal.

32 Claims, 36 Drawing Sheets

U.S. PATENT DOCUMENTS

| | | | |
|---|---|---|---|
| 5,168,534 | A | 12/1992 | McBrien et al. ............... 385/3 |
| 5,249,243 | A | 9/1993 | Skeie ............................ 385/3 |
| 5,835,212 | A | 11/1998 | Kissa et al. ................. 356/345 |
| 5,886,807 | A | 3/1999 | Cummings .................. 359/263 |
| 5,956,171 | A | 9/1999 | Dennis et al. .............. 359/281 |
| 6,016,198 | A | 1/2000 | Burns et al. ................. 356/345 |
| 6,038,354 | A | 3/2000 | Sato et al. ..................... 385/2 |
| 6,091,864 | A | 7/2000 | Hofmeister .................... 385/2 |
| 6,192,167 | B1 | 2/2001 | Kissa et al. .................... 385/3 |
| 6,243,516 | B1 | 6/2001 | Seino ........................... 385/47 |
| 6,304,685 | B1 | 10/2001 | Burns ............................ 385/3 |
| 6,341,184 | B1 | 1/2002 | Ho et al. ....................... 385/3 |
| 6,522,793 | B1 | 2/2003 | Szilagyi et al. ................ 385/2 |
| 6,535,320 | B1 | 3/2003 | Burns et al. ................. 358/245 |
| 6,580,840 | B1 | 6/2003 | McBrien et al. ............... 385/2 |
| 6,583,917 | B2 | 6/2003 | Melloni et al. ............. 359/245 |
| 6,616,353 | B1 * | 9/2003 | Helkey ....................... 398/183 |
| 6,647,158 | B2 | 11/2003 | Betts et al. .................... 385/2 |
| 6,687,451 | B1 | 2/2004 | Sikora ........................ 385/187 |
| 6,721,081 | B1 | 4/2004 | Mauro et al. ............... 359/279 |
| 6,781,741 | B2 | 8/2004 | Uesaka ....................... 359/279 |
| 6,785,434 | B2 | 8/2004 | Castoldi et al. ............... 385/14 |
| 6,862,387 | B2 | 3/2005 | Howerton et al. ........... 385/47 |
| 2002/0063919 | A1 | 5/2002 | Kovar et al. ................. 385/47 |
| 2003/0175036 | A1 | 9/2003 | Mamyshev et al. ......... 398/188 |
| 2003/0175037 | A1 | 9/2003 | Kimmitt et al. ............ 398/198 |
| 2004/0184755 | A1 | 9/2004 | Sugiyama et al. .......... 385/129 |

OTHER PUBLICATIONS

G. E. Betts, et al., "Optical analog link using a linerized modulator," Proceedings of the Annual Meeting of the IEEE Laser and Electro-optic Society, paper IO4.3, pp. 278-279, 1994.

D. J. M. Sabido, et al., "Improving the dynamic range of a coherent AM analog optical link using a cascaded linearized modulator," IEEE Photonics Technology Letters, vol. 7, pp. 813-815, 1995.

V. Kaman, et al., "Integrated tandem traveling-wave electroabsorption modulators for >100 Gbit/s OTDM applications," IEEE Photonics Technology Letters, vol. 12, pp. 1471-1473, 2000.

B. Mason, et al., "40-Gb/s tandem electroabsorption modulator," IEEE Photonics Technology Letters, vol. 14, pp. 27-29, 2002.

J. C. Cartledge, "Optimum operating points for electroabsorption modulators in 10 gb/s transmission systems using nondispersion shifted fiber," IEEE Journal of Lightwave Technology, vol. 16, pp. 349-357, 1998.

D. Penninckx, et al., "Simple method to find optimum operating point of an integrated laser modulator for a propagation over a standard dispersive fibre," Proceedings of the $22^{nd}$ European Conference on Optical Communication, paper TuP.21, pp. 301-304, 1996.

W.K. Burns, "Linearized Optical Modulator with Fifth Order Correction," IEEE Journal of Lightwave Technology, vol. 13, pp. 1724-1727, 1995.

Wooten et al., "A Review of Lithium Niobate Modulators for Fiber-Optic Communications Systems," IEEE Journal of Selected Topics in Quantum Electronics, vol. 6, No. 1, pp. 69-82 Jan./Feb. 2000.

M.M. Howerton et al., "Subvolt Broadband Lithium Niobate Modulators", NRL review, 2002, Optical Sciences.

J.X. Chen, et al., "Tunable Lithium Niobate Waveguide Loop," IEEE Photonics Technology Letters, vol. 16, No.9, Sep. 2004, pp. 2090-2092.

Marc Currie, "Optical Quantization of Microwave Signals via Distributed Phase Modulation," IEEE Journal of Lightwave Technology, vol. 23, No. 2, Feb. 2005, pp. 827-833.

* cited by examiner

Endface with Polish Error

Endface at Ideal Location

Endface with Polish Error

Endface at Ideal Location

OPTICAL EXTERNAL MODULATOR

CROSS-REFERENCE TO RELATED APPLICATIONS

This application is a continuation-in-part of U.S. Ser. No. 10/852,704 filed May 24, 2004 now U.S. Pat. No. 6,961,166, which claimed the benefit of U.S. Provisional Application No. 60/474,771 filed May 30, 2003, the contents of which are incorporated by reference herein.

MICROFICHE APPENDIX

Not Applicable.

TECHNICAL FIELD

The present application relates generally to folded optical devices, and in particular, to folded optical external modulators and methods of fabricating the same.

BACKGROUND OF THE INVENTION

Optical modulators are currently used in optical communication systems to convert electrical signals representing data or voice into modulated optical signals. Optical modulators are typically based on direct or external modulation. With direct modulation, the optical source is turned on and off at intervals. With external modulation, the optical source is operated continuously and its output light is modulated using an optical external modulator.

Optical external modulators are superior to direct modulation in many ways. For example, optical external modulators are suitable for many high-speed applications and do not typically affect the wavelengths carrying the data signal as much as direct modulation. Furthermore, optical external modulators are often based on electro-optic, magneto-optic, acousto-optic, and/or electric field absorption type effects, thus providing additional design flexibility.

One example of a particularly successful optical external modulator is a Mach-Zehnder optical modulator, which is illustrated schematically in FIG. 1. The Mach-Zehnder optical modulator 10 includes an optical waveguide 20 formed on an electro-optic substrate 30, which for exemplary purposes is lithium niobate ($LiNbO_3$). The optical waveguide 20 includes a first Y-branch 22, a first interferometer arm 24, a second interferometer arm 26, and a second Y-branch 28. A traveling-wave electrode structure 40 is provided near/adjacent the optical waveguide 20. The exact position and design of the electrode structure 40 relative to the optical waveguide 20 is typically dependent on the crystal axis of the lithium niobate substrate 30. For example, when the lithium niobate substrate 30 is x-cut, as shown in FIG. 1, the electrode structure 40 is positioned such that the first interferometer arm 24 is disposed between ground electrode 42 and hot electrode 46, while the second interferometer arm 26 is disposed between ground electrode 44 and hot electrode 46.

In operation, light is input into the modulator 10 from the left side and is output on the right. More specifically, the input light propagates through the optical waveguide 20 until it is split at the first Y-branch 22, where it then propagates equally along the two isolated paths corresponding to the two interferometer arms 24, 26. When a time varying voltage is applied to the traveling-wave electrode structure 40, an electric field is produced that propagates down the electrode structure 40, which is constructed to form a microwave waveguide. The electric field at least partially overlaps the two interferometer arms 24 and 26. In accordance with the electro-optic effect, the electric field causes the relative velocity of the light propagating through the two interferometer arms to change, thus creating a phase shift and producing constructive or destructive interference at the second Y-branch 28. The constructive and/or destructive interference produces an amplitude modulated optical signal, wherein the modulation corresponds to a modulated RF data signal used to produce the time varying voltage.

FIG. 2a illustrates a transfer function of the electrical to optical conversion for a typical Mach-Zehnder optical modulator, such as that shown in FIG. 1. The transfer function is a theoretically sinusoidal curve that represents the points at which the optical modulator will transition from no output to maximum output. For example, when the applied voltage is near a first value $-V_\pi/2$ the modulator output is at a minimum. As the applied voltage approaches 0 the modulator output approaches 50% transmission. When the applied voltage is near a second value $V_\pi/2$, the modulator output is at a maximum. The value $V_\pi$ is known as the "peak-to-peak" or "switching" voltage. The point A, which is approximately half way between the maximum and minimum peaks of the transfer function, is known as a quadrature point. To achieve maximum modulation efficiency, it is usually preferred that the time varying voltage (i.e., an AC type voltage) includes a maximum amplitude of $V_\pi$ and that the optical modulator be biased at quadrature (i.e., a DC bias voltage is set at the quadrature point). Accordingly, the time varying AC voltage is continuously swung around the DC bias voltage in a balanced fashion.

Optical external modulators, such as the Mach-Zehnder optical modulator discussed with respect to FIG. 1, have been found useful in both analog systems, such as cable television and/or radar networks, and digital systems, such as today's long-haul-terrestrial and submarine optical networks. When used in analog systems, the applied voltage is usually between $-V_\pi$ and $V_\pi$, but does not typically reach the extremes of this range. When used in digital systems, such as with a traditional two-level digital data signal, the applied voltage is swung between 0 and $V_\pi$ and/or 0 and $-V_\pi$, so as to generate the digital 1's and 0's in the optical domain. As a result, optical analog external modulators and optical digital external modulators are generally associated with different performance concerns, and thus designs.

In optical analog external modulators, the primary performance concern appears to be the lack of linearity in the transfer function. One solution to this problem is to cascade two optical modulators in series. For example, see U.S. Pat. No. 5,168,534 to McBrien et al., U.S. Pat. No. 5,148,503 to Skeie, U.S. Pat. No. 5,249,243 to Skeie, U.S. Pat. No. 6,091,864 to Hofmeister, and U.S. Pat. No. 6,535,320 to Burns, all hereby incorporated by reference.

In optical digital external modulators, the primary performance concern appears to be the high drive power required to switch between 0 and $V_\pi$ and/or 0 and $-V_\pi$ (i.e., the high driving voltage). Various attempts to lower the drive power of optical digital external modulators have been proposed. For example, in U.S. Pat. No. 6,304,685, Burns teaches etching the lithium niobate substrate, in U.S. Pat. No. 6,341,184, Ho et al. teach including a resonator near one of the arms of a Mach-Zehnder interferometer, and in U.S. Pat. No. 6,647,158, Betts et al. teach using a specific combination of crystal axis orientation, waveguide structure, electrode structure, and biasing of a Mach-Zehnder optical modulator to lower the required drive voltage.

A second performance concern of optical digital external modulators is the breadth of the modulation bandwidth. Modulation bandwidth is typically limited by the fact that the RF signal travels more slowly through the electrodes than the optical signal travels through the optical waveguide. Prior art methods of correcting velocity mismatch have included varying the electrode width, gap and thickness and/or varying the choice and thickness of a buffer layer deposited on the substrate.

A third performance concern in optical digital external modulators is the quality and/or integrity of the optical digital signal after it has been transmitted by the optical modulator (i.e., this factor determines the distance separating the transmitter from the receiver in use). The integrity of a digital optical signal is often characterized by an eye diagram, where a clear and symmetric eye diagram with well defined lines is associated with high transmission performance (e.g., minimal bit errors).

Referring to FIG. 2b, there is shown an eye diagram for an ideal, two-level digital signal. The eye-diagram is a superimposed plot of normalized amplitude versus time, for all the optical signals produced by the optical modulator. In other words, it shows where the digital 1's and 0's of all the bits overlap in one plot (the plot in FIG. 2b is actually two bit periods wide). The X's in the eye diagram are caused by the overlap of all the 1→0 and 0→1 transitions. The center of the X's determine the eye crossing level, which is shown having the ideal value of 50%. The digital signal is understood to be ideal in all properties except for finite (30 psec) rise and fall times.

Further discussion with respect to the quality of the digital signal and eye diagrams is provided in U.S. Pat. No. 6,687,451 to Sikora, hereby incorporated by reference.

SUMMARY OF THE INVENTION

The instant invention relates to folded optical devices, such as folded optical external modulators, with improved efficiency and performance. The improved efficiency and/or performance is achieved through the quasi-velocity matching of the microwave and optical signals and/or by providing angled endfaces.

In accordance with one aspect of the instant invention there is provided an optical external modulator comprising: an electro-optic substrate; an optical waveguide formed on the electro-optic substrate, the optical waveguide including a first interferometer section and a second interferometer section; an electrode structure disposed on the electro-optic substrate, the electrode structure for transmitting an RF drive signal that is applied to the first and second interferometer sections in series; and a reflector optically disposed between the first and second interferometer sections, the reflector for redirecting light away from the first interferometer section to the second interferometer section and disposed to provide an optical fold region that introduces an optical time delay between the first and second interferometer sections, the optical time delay for at least partially compensating for a velocity mismatch between the light and the RF drive signal.

In accordance with one aspect of the instant invention there is provided an optical external modulator comprising: an input port for transmitting an optical signal in a first direction; an electro-optic substrate having first and second endfaces, the second endface opposite the first endface and angled to form an acute angle with the first direction; an optical waveguide forming an interferometer on the electro-optic substrate, the interferometer optically coupled to the input port and including a first interferometer section and a second interferometer section; an electrode structure disposed on the electro-optic substrate, the electrode structure for transmitting an RF drive signal that is applied to the first and second interferometer sections to modulate the optical signal; and a reflective surface coupled to the electro-optic substrate at the second endface, the reflective surface for redirecting light away from the first interferometer section to the second interferometer section and disposed to provide an optical fold region wherein first and second fold sections of the optical waveguide converge at the reflective surface, one of the first and second fold sections being substantially straight, the other of the first and second fold sections including a waveguide bend.

In accordance with one aspect of the instant invention there is provided an optical external modulator comprising: an input port for transmitting an optical signal in a direction of primary optical propagation; an electro-optic substrate having first and second endfaces, the second endface opposite the first endface and angled to form an acute angle with the direction of primary optical propagation; an optical waveguide forming an interferometer on the electro-optic substrate, the interferometer optically coupled to the input port and including a first interferometer section where the optical waveguide branches into first and second interferometer arms and a second interferometer section where the first and second interferometer arms merge; an electrode structure disposed on the electro-optic substrate, the electrode structure for transmitting an RF drive signal that is applied to the optical waveguide to modulate the optical signal; and a reflector coupled to the electro-optic substrate at the second endface, the reflector for folding the first and second interferometer arms.

BRIEF DESCRIPTION OF THE DRAWINGS

Further features and advantages of the present invention will become apparent from the following detailed description, taken in combination with the appended drawings, in which:

FIG. 5b is a schematic diagram of a circuit suitable for use as the high-pass filter and bias-tee network illustrated in FIG. 5a;

It will be noted that throughout the appended drawings, like features are identified by like reference numerals.

DETAILED DESCRIPTION OF THE PREFERRED EMBODIMENTS

Figure 3:
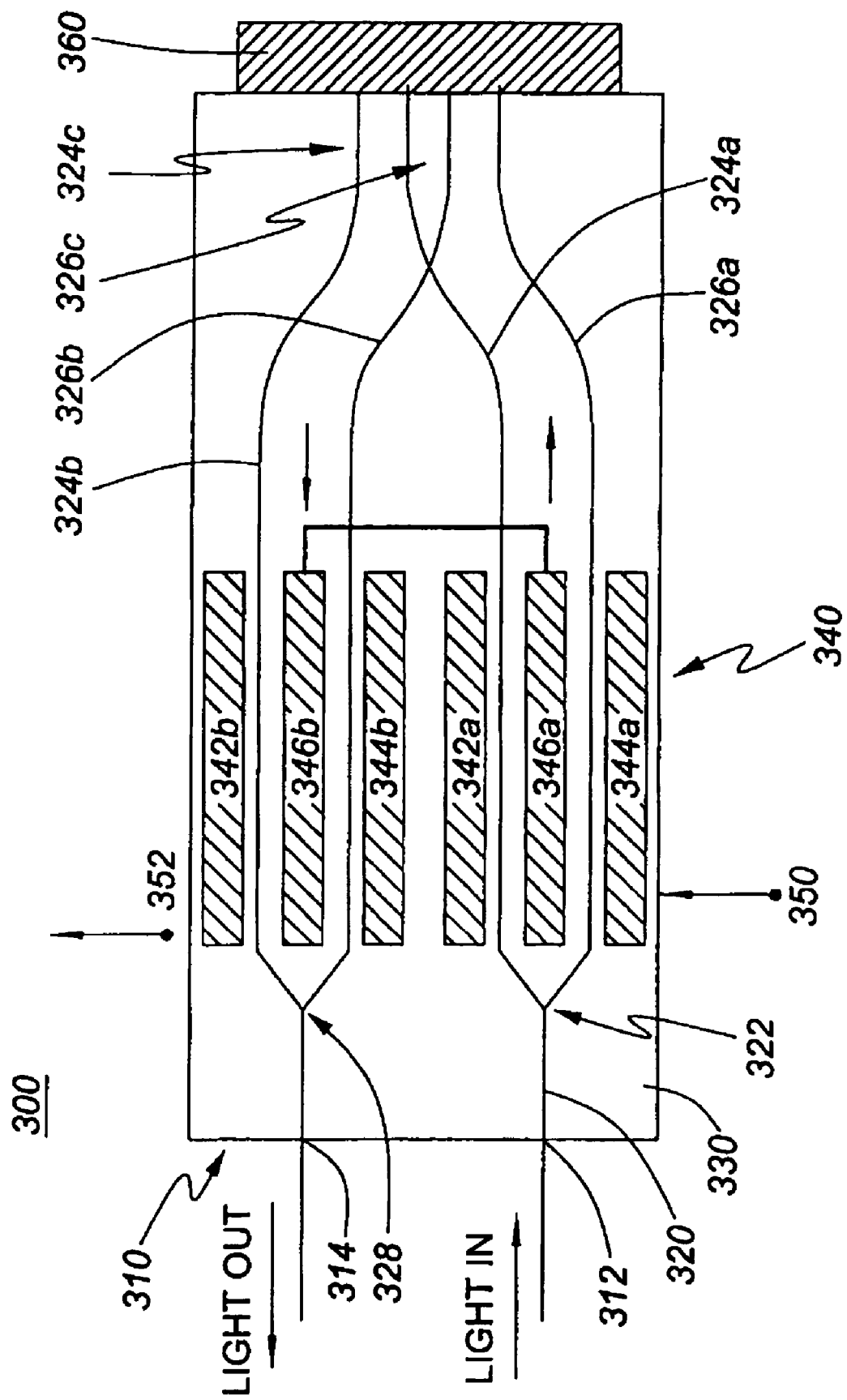
FIG. 3 is a schematic diagram of a Mach-Zehnder optical modulator formed on an x-cut lithium niobate substrate and including two reflective directional couplers.

Referring to FIG. 3, there is shown a schematic diagram of an optical digital external modulator 300 that includes an optical waveguide 320 formed in an x-cut lithium niobate (LiNbO$_3$) substrate 330. The optical waveguide 320 includes a first Y-branch 322, a first interferometer arm 324a/324b, a second interferometer arm 326a/326b, and a second Y-branch 328, which collectively form an integrated Mach-Zehnder interferometer. At the end of the substrate 330 opposing the input/output end 310, the waveguide 320 and a mirror 360 form first 324c and second 326c directional couplers. A traveling-wave electrode structure 340 is provided near the optical waveguide 320 such that the first part of the first interferometer arm 324a is disposed between ground electrode 342a and hot electrode 346a, while the first part of the second interferometer arm 326a is disposed between ground electrode 344a and hot electrode 346a. Similarly, the second part of the first interferometer arm 324b is disposed between ground electrode 342b and hot electrode 346b, while the second part of the second interferometer arm 326b is disposed between ground electrode 344b and hot electrode 346b. A single input terminal 350 provides an input for the driving and bias voltages, while a single output terminal 352 provides an output for the remaining drive signal.

In operation, light is input into the modulator 300 from the input port 312 and is output through the output port 314. More specifically, the light input through the input port propagates through the optical waveguide 320 until it is split at the first Y-branch 322, where it then propagates equally along the two isolated paths corresponding to the two interferometer arms 324a, 326a. When the light propagating through each arm of the interferometer 324a and 326a reaches the corresponding directional couplers 324c and 326c, it is reflected back along the corresponding second parts of the interferometer arms 324b and 326b, respectively. When a time varying drive voltage, corresponding to a RF data modulation signal, is applied to the traveling-wave electrode structure 340 the electro-optic effect causes the relative velocity of the light propagating through the two interferometer arms 324a/b and 326a/b to change, thus creating a phase shift and producing constructive or destructive interference at the second Y-branch 328. The constructive and/or destructive interference produces an output amplitude modulated optical signal, wherein the modulation corresponds to the modulation of the RF data signal.

Figure 1:
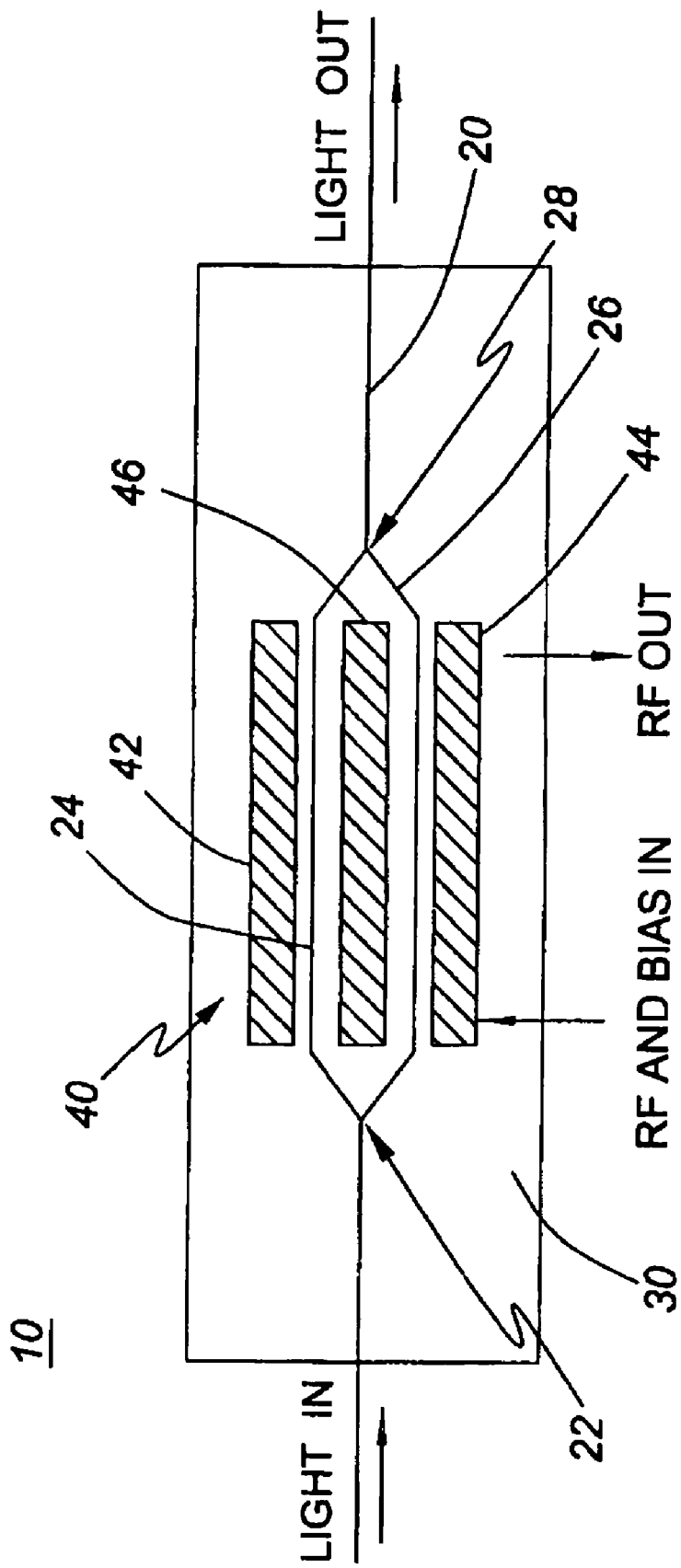
FIG. 1 is a schematic diagram of a prior art Mach-Zehnder optical modulator.
Figure 2A:
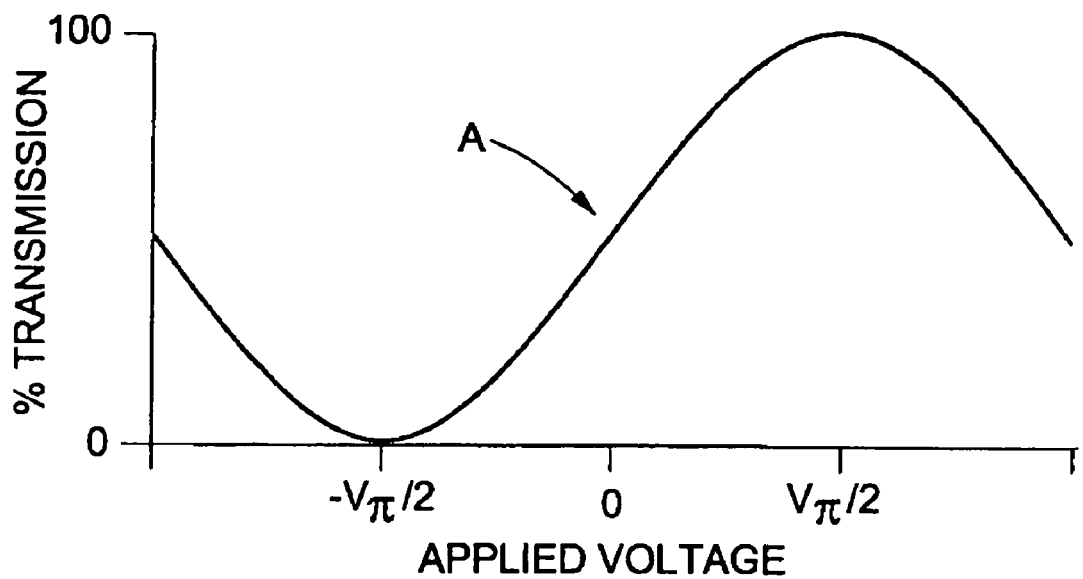
FIG. 2a is a graph of a typical transfer function.
Figure 2B:
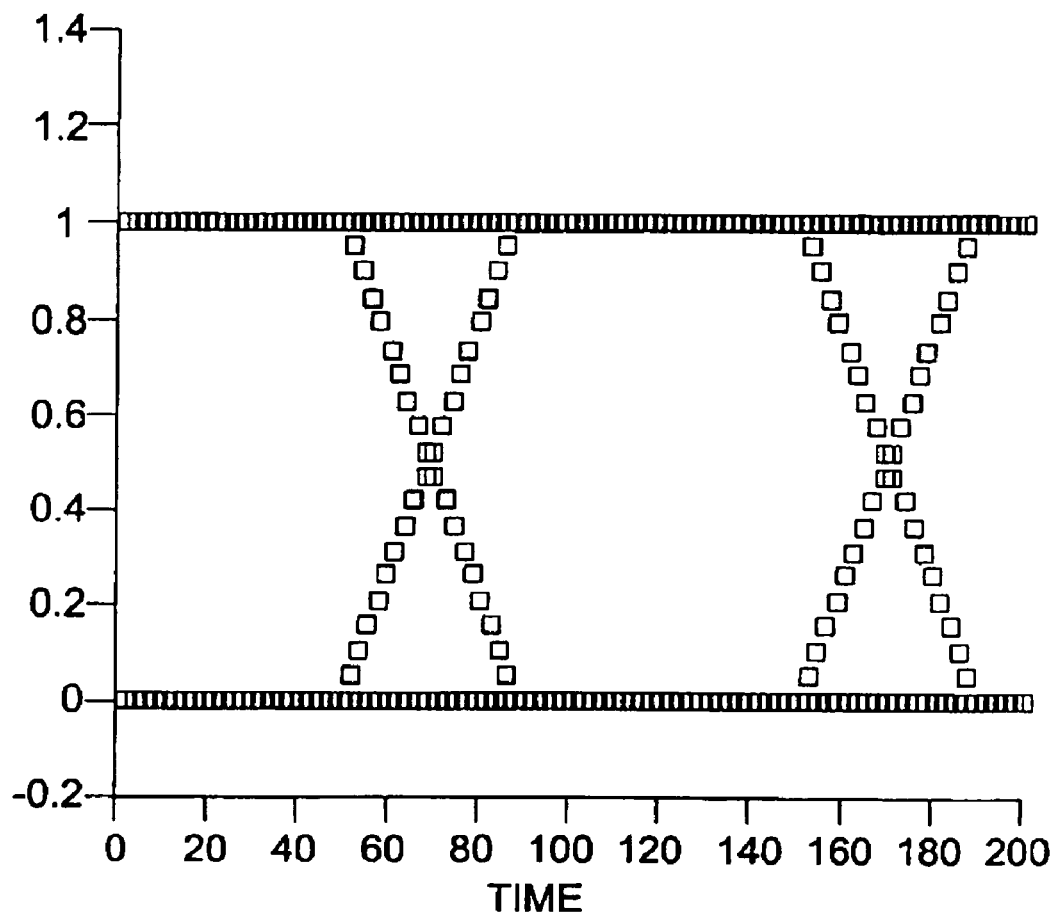
FIG. 2b is a digital eye diagram of an ideal, two-level digital signal.

One advantage of the optical modulator 300 shown in FIG. 3 compared to the optical modulator shown in FIG. 1, is that the reflective design makes the optical modulator more compact and allows light to enter and exit the optical modulator from the same side. Moreover, in comparison to a retro-reflective design, the instant design allows the light to enter and exit through two separate optical fibers, thus eliminating the need for an optical circulator. Furthermore, since the RF drive signal is terminated after it exits the electrode structure 340, it is prevented from returning to the input terminal 350, and hence the RF driver (not shown).

Another advantage of the optical modulator 300 shown in FIG. 3 is that the design allows quasi-velocity matching to be achieved. More specifically, the design of the modulator 300 allows the optical propagation time between the two electrodes 346a and 346b to be longer than the RF travel time. Accordingly, the optical modulator 300 is compatible with electrode structures that allow the RF signal to travel much slower than the light. Such electrode structures are generally more efficient than electrode structures constructed such that the optical and RF velocities match. The lagging RF signal is re-synchronized with the light via the optical time delay between electrodes. The synchronized RF signal helps to strengthen the modulation accumulated through the first section. The additional modulation efficiency is used to lower the drive voltage and/or the total length of the modulator.

Of course, the optical digital external modulator shown in FIG. 3 is described as above for exemplary purposes only. Alternatively, the optical modulator 300 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a z- or y-cut electro-optic substrate, to replace the traditional traveling wave electrode with another electrode structure such as a lumped or dual drive electrode, to replace the mirror with another reflective element, such as a reflective coating deposited on the edge of the substrate, and/or to provide a polarizer (not shown) between the substrate and the mirror and/or near the input/output ports. Optionally, the reflective directional couplers are tunable, allowing chirp, extinction ratio, and/or optical power of the modulator to be tuned. Further optionally, an optical isolator is provided between the laser and the modulator.

Figure 4:
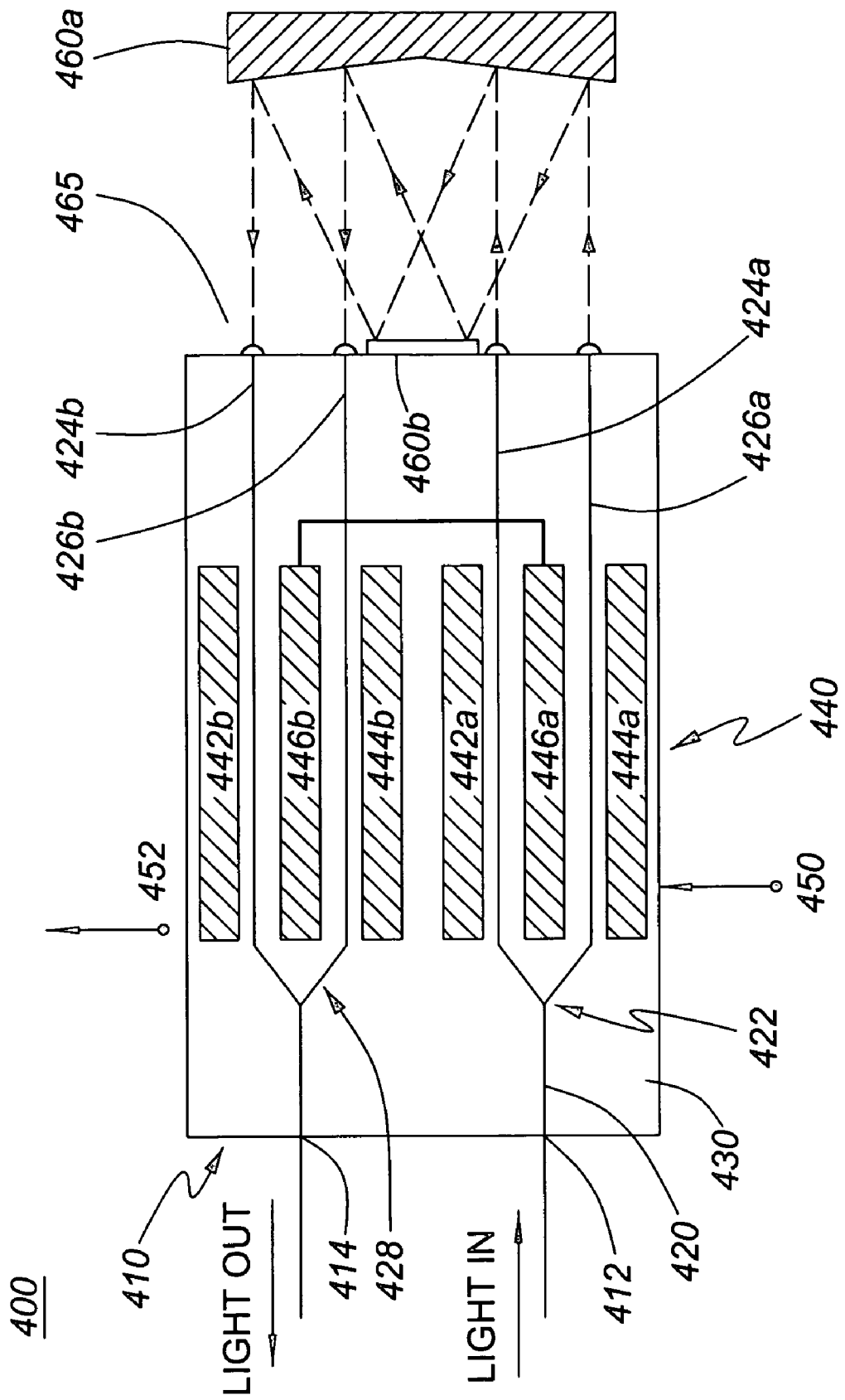
FIG. 4 is a schematic diagram of a Mach-Zehnder optical modulator formed on an x-cut lithium niobate substrate and including a reflective mirror and lens array.

Referring to FIG. 4, there is shown a schematic diagram of an optical digital external modulator 400 that includes an optical waveguide 420 formed in an x-cut lithium niobate (LiNbO$_3$) substrate 430. The optical waveguide 420 includes a first Y-branch 422, a first interferometer arm 424a/424b, a second interferometer arm 426a/426b, and a second Y-branch 428, which collectively form an integrated Mach-Zehnder interferometer. At the end of the substrate 430 opposing the input/output end 410, a lens system 465 and a reflector 460 are provided for reflecting light between 424a and 424b and between 426a and 426b. The lens system 465 includes four micro-lenses, each micro-lens coupled to the end of the substrate 430 where a waveguide terminates. The reflector 460 includes a first mirror 460a having two angled reflective surfaces, which is spaced apart from the substrate, and a second mirror 460b, which is coupled to an endface of the substrate. A traveling-wave electrode structure 440 is provided near the optical waveguide 420 such that the first part of the first interferometer arm 424a is disposed between ground electrode 442a and hot electrode 446a, while the first part of the second interferometer arm 426a is disposed between ground electrode 444a and hot electrode 446a. Similarly, the second part of the first interferometer arm 424b is disposed between ground electrode 442b and hot electrode 446b, while the second part of the second interferometer arm 426b is disposed between ground electrode 444b and hot electrode 446b. A single input terminal 450 provides an input for the driving and bias voltages, while a single output terminal 452 provides an output for the remaining drive signal.

In operation, light is input into the modulator 400 through the input port 412 and is output through the output port 414. More specifically, the light input through the input port propagates through the optical waveguide 420 until it is split at the first Y-branch 422, where it then propagates equally along the two isolated paths corresponding to the two interferometer arms 424a, 426a. When the light propagating through each arm of the interferometer 424a and 426a reaches the lens system 465 and reflector 460, it is reflected back along the corresponding second parts of the interferometer arms 424b and 426b, respectively. When a time varying drive voltage, corresponding to a RF data modulation signal, is applied to the traveling-wave electrode structure 440 the electro-optic effect causes the relative velocity of the light propagating through the two interferometer arms 424a/b and 426a/b to change, thus creating a phase shift and producing constructive or destructive interference at the second Y-branch 428. The constructive and/or destructive interference produces an output amplitude modulated optical signal, wherein the modulation corresponds to the modulation of the RF data signal.

In addition to the advantages discussed with reference to the optical modulator 300 illustrated in FIG. 3, the optical modulator 400 shown in FIG. 4 has the further advantage that the lens system 465 and reflector 460 do not need to be precisely tuned in the same manner as the directional couplers shown in FIG. 3. As a result, the risk that the some of the light will not be coupled over to the other waveguide, and thus return back to the optical input is low. Furthermore, there is little risk that residual or backscattered light from the transmission link will be reflected back into the link.

Of course, the optical digital external modulator shown in FIG. 4 is described as above for exemplary purposes only. Alternatively, the optical modulator 400 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror 460a with two separate angled mirrors. Alternatively, the mirror 460a is replaced with a roof-top prism with the further option of providing the reflective surface 460b on the prism rather than on the substrate. Further optionally, a polarizer (not shown) is provided near the input/output ports.

Referring to FIG. 8a, there is shown a schematic diagram of an optical digital external modulator 500 in accordance with an embodiment of the instant invention that includes an optical waveguide 520 formed in an x-cut lithium niobate (LiNbO$_3$) substrate 530. The optical waveguide 520 forms a first Mach-Zehnder interferometer 520a and a second Mach-Zehnder interferometer 520b. The first 520a and second 520b interferometers have a cascaded arrangement, where the first and second interferometers are laterally displaced. The first interferometer 520a includes a first Y-branch 522a, a first interferometer arm 524a, a second interferometer arm 526a, and a second Y-branch 528a. The second interferometer 520b includes a first Y-branch 522b, a first interferometer arm 524b, a second interferometer arm 526b, and a second Y-branch 528b. At the end of the substrate 530 opposing the input/output end 510, a mirror 560 and lens 565 are provided to fold the optical path from the first interferometer 520a to the second 520b. A traveling-wave electrode structure 540 is provided near the optical waveguide 520 such that the first interferometer arm 524a of the first interferometer 520a is disposed between ground electrode 542a and hot electrode 546a, while the second interferometer arm 526a is disposed between ground electrode 544a and hot electrode 546a. Similarly, the first interferometer arm 524b of the second interferometer 520b is disposed between ground electrode 542b and hot electrode 546b, while the second interferometer arm 526b is disposed between ground electrode 544b and hot electrode 546b. A single input terminal 550 provides an input for the driving voltages, while a single output terminal 552 provides an output for the remaining drive signal. A high-pass filter and bias-tee network 580 is provided between the first 546a and second 546b hot electrodes. Preferably, the high-pass filter and bias tee network includes a high-pass filter for passing higher frequencies and rejecting lower ones and a bias-tee for injecting DC bias voltages into the RF circuit without affecting the flow of the RF.

Figure 5A:
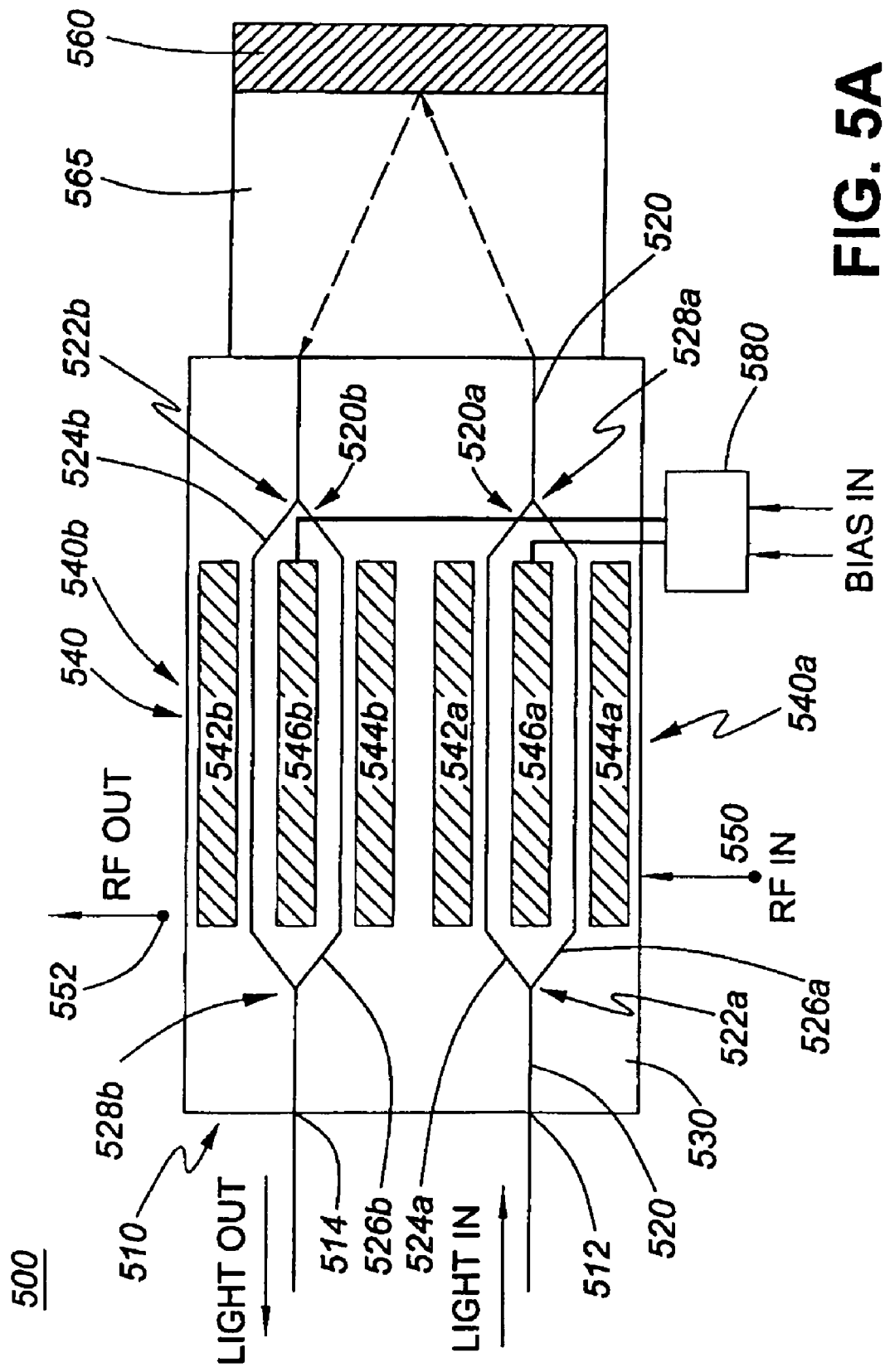
FIG. 5a is a schematic diagram of a Mach-Zehnder optical modulator formed on an x-cut lithium niobate substrate and including a reflective mirror and lens, the optical modulator has a series cascaded arrangement and biasing means in accordance with one embodiment of the instant invention.
Figure 5B:
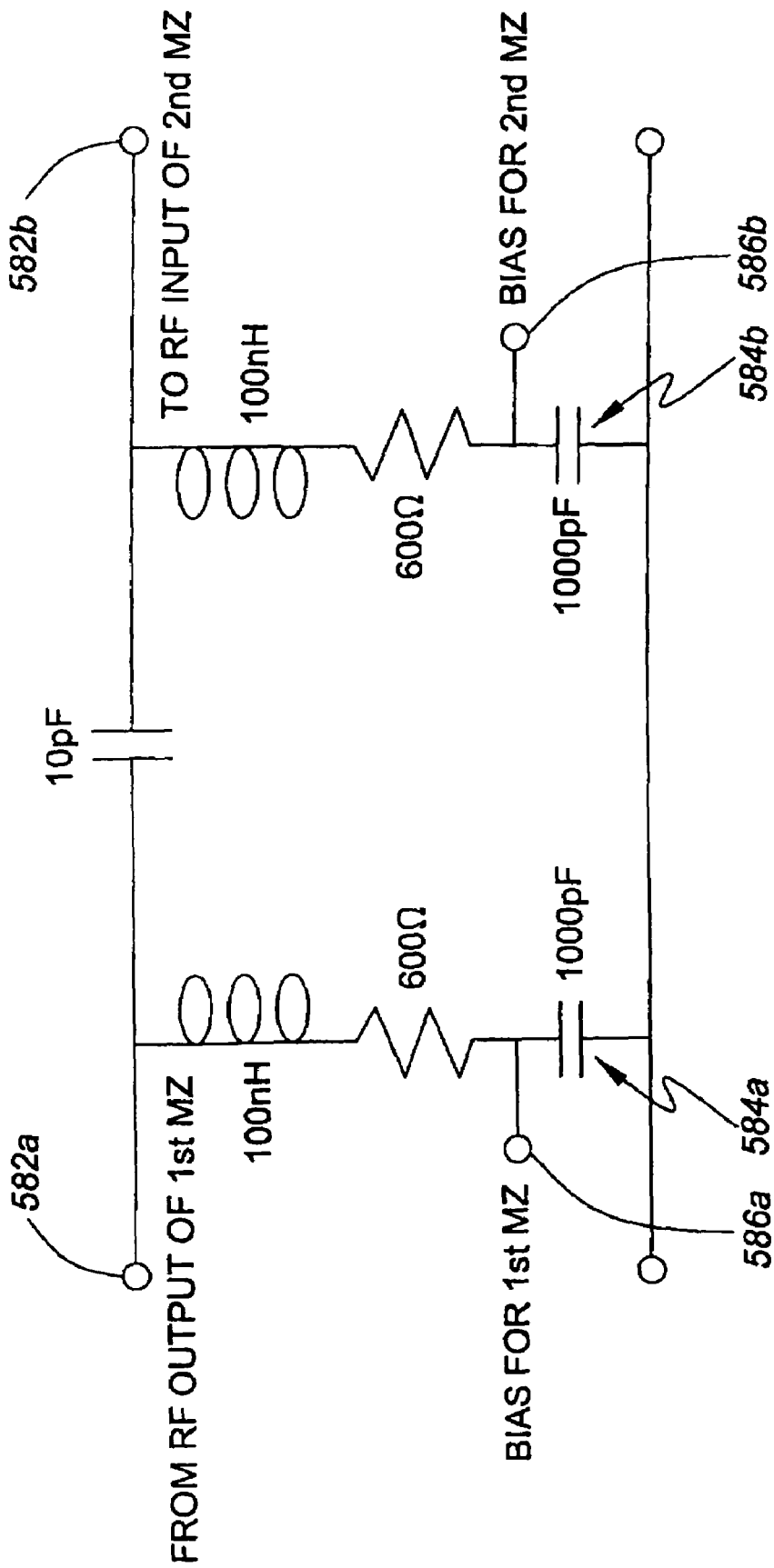

FIG. 5b illustrates one configuration of a circuit serving as a high-pass filter and bias-tee network, for use in the optical modulator illustrated in FIG. 5a. More specifically, it shows a circuit containing a 10 pF capacitor, two 100 nH inductors, two 600Ω resistors, and two 1000 pF capacitors. The 10 pF capacitor blocks the low frequencies of the RF signal input at terminal 582a and passes the higher frequencies to terminal 582b. A first LCR shunt path 584a including one of the 100 nH inductors, 600Ω resistors, and 1000 pF capacitors shunts the low frequencies blocked by the 10 pF capacitor and provides an input path for injecting a DC bias voltage into the first interferometer. A second LCR shunt path 584b including the other of 100 nH inductors, 600Ω resistors, and 1000 pF capacitors provides an input path for injecting a DC bias voltage into the second interferometer. In other words, the Pi configuration allows two isolated DC voltages, which independently control the bias points of the two cascaded interferometers, to be injected at terminals 586a and 586b without disturbing the RF signal transmitted from terminal 582a to 582b. Of course other circuit configurations that provide the function of the high-pass filter and a bias-tee network are also possible.

In operation, light is input into the modulator 500 from the input port 512 and is output through the output port 514. More specifically, the light input through the input port 512 propagates through the optical waveguide 520 to the first interferometer 520a, where it is split at the first Y-branch 522a, and is transmitted equally along the two isolated paths corresponding to the two interferometer arms 524a, 526a. When a time varying voltage is applied to the first part of the electrode structure 540a via terminal 550, an electric field is produced that propagates down the traveling-wave electrode structure 540a, which is constructed to form a microwave waveguide. The electric field at least partially overlaps the two interferometer arms 524a and 526a. In accordance with the electro-optic effect, the electric field causes the relative velocity of the light propagating through the two interferometer arms 524a, 526a to change, thus creating a phase shift and producing constructive or destructive interference at the second Y-branch 528a. The constructive and/or destructive interference produces an amplitude modulated optical signal, wherein the modulation corresponds to a modulated RF data signal used to produce the time varying voltage. The amplitude modulated optical signal propagates through the optical waveguide 520 to the lens 565 and mirror 560, where it is reflected and transmitted to the second interferometer 520b. The light input into the second interferometer 520b is split at the first Y-branch 522b, where it then propagates equally along the two isolated paths corresponding to the two interferometer arms 524b, 526b. Simultaneously, the RF drive signal remaining at the end of the first electrode 546a is sent to the second part of electrode structure 540b after passing through the high pass filter 580. When the filtered RF drive signal is applied to the second part of the electrode structure 540b, an electric field is produced that propagates down the electrode structure 540b, which is constructed to form a microwave waveguide. The electric field at least partially overlaps the two interferometer arms 524b and 526b. In accordance with the electro-optic effect, the electric field further impresses the synchronized modulated RF data signal onto the amplitude modulated optical signal, which is subsequently output through the output port 514.

One advantage of the optical modulator 500 shown in FIG. 5*a* compared to other cascaded modulators is that the reflective design makes the optical modulator 500 more compact and allows light to enter and exit the optical modulator from the same side. Moreover, in comparison to retro-reflective designs, the instant design allows the light to enter and exit through two separate optical fibers, thus eliminating the need for an optical circulator. Furthermore, since the RF drive signal is terminated after it exits the electrode structure 540, it is prevented from returning to the input terminal 550, and hence the RF driver (not shown).

A second advantage of the optical modulator 500 shown in FIG. 5*a* is that the design allows quasi-velocity matching to be achieved. More specifically, the design of the modulator 500 allows the optical propagation time between the two electrodes 546*a* and 546*b* to be longer than the RF travel time. Accordingly, the optical modulator 500 is compatible with electrode structures that allow the RF signal to travel much slower than the light. Such electrode structures are generally more efficient than electrode structures constructed such that the optical and RF velocities match. The lagging RF signal is re-synchronized with the light via the optical time delay between electrodes. The synchronized RF signal helps to strengthen the modulation accumulated through the first section. The additional modulation efficiency is used to lower the drive voltage and/or the total length of the modulator.

A third advantage of the optical modulator 500 shown in FIG. 5*a* is that it is broken up into two interferometers, namely, a forward interferometer 520*a* and a reverse path interferometer 520*b*. Accordingly, the lens 565 and mirror 560 are not part of the interferometer. Since the lens and mirror are only used to fold the optical beam, rather than folding the interferometer arms, biasing shifts associated with temperature changes, aging, vibration, and/or shock are minimized.

A fourth advantage of the optical modulator 500 shown in FIG. 5*a* is that the design allows for both the forward interferometer and the reverse path interferometer to be driven with the same RF drive signal, thus eliminating the challenge of synchronizing two or more RF data signals and reducing the required drive power.

By providing a high-pass filter 580 between the cascaded interferometers, the frequency response of the optical modulator 500 is easily shaped. More specifically, the high-pass filter 580 advantageously reduces the amount of roll-off in the frequency response by only allowing the higher frequencies to pass to the second interferometer, thus reducing the interaction length of the electrode structure 540 by a factor of 2 for the lower RF frequencies. This lowers the modulation efficiency for the lower frequencies and produces a flatter frequency response. Notably, the roll-off arises from velocity walk-off and RF loss within each of the first and second interferometers.

A fifth advantage of the optical modulator 500 shown in FIG. 5*a*, is that it is easily optimized for digital signal transmission by selecting the digital RF data signal amplitude and bias points accordingly. For example, in traditional Mach-Zehnder optical modulators the interferometer is typically biased at the quadrature point of the single interferometer so as to maximize the on/off ratio.

Figure 5C:
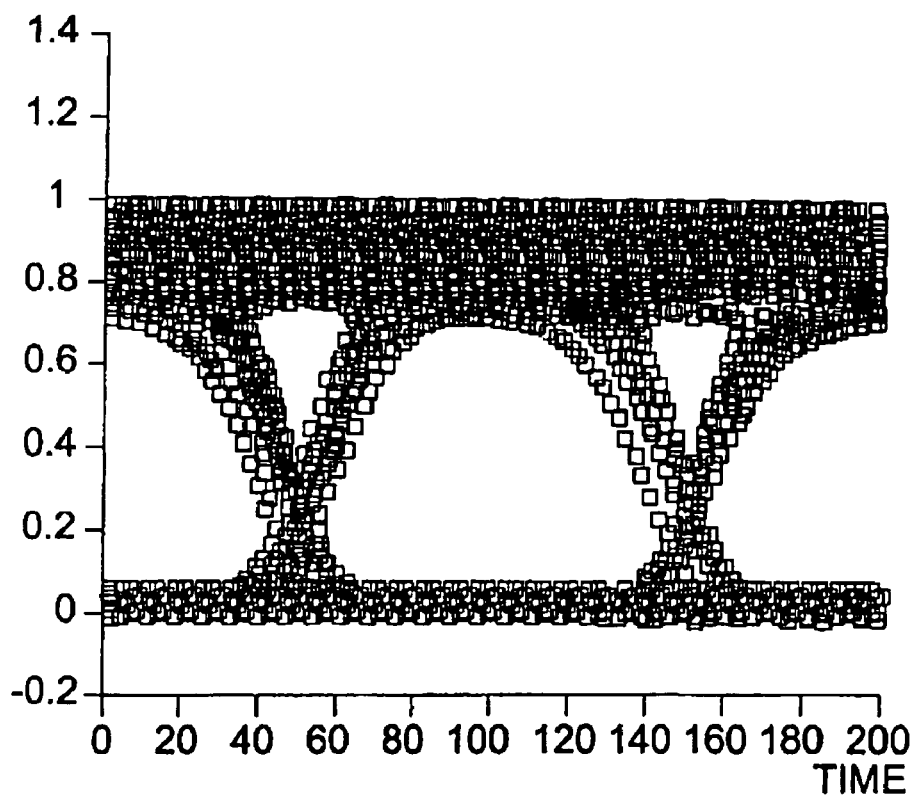
FIG. 5c is a simulated eye diagram of an optical signal after passing through the optical modulator shown in FIG. 5a, when both interferometers are biased at quadrature.

FIG. 5*c* illustrates a simulated eye diagram of an optical signal after passing through the optical modulator shown in FIG. 5*a*, when both interferometers are biased at quadrature. The simulation accounts for RF loss, quasi-velocity matching, and high-pass filter effects. Notably, there is vertical asymmetry in the shape of the eye. More specifically, the eye crossing level is about 25% rather than the preferred 50%, and the ones (full-on) are broadened in the vertical direction more than the zeros (full-off). This distortion, which is due to the multiplication of the transfer functions of the two interferometers, will negatively affect transmission performance, particularly after long transmission distances.

According to the instant invention, the optical modulator is biased for a very slight insertion loss at the on-state (e.g., less than 1 dB). For example, according to one embodiment both interferometers are biased 25° from quadrature, or at 65°, where 90° is the phase at quadrature and 0° is the phase for the interferometers being full-on. In this instance, the net intensity after passing through both interferometers is approximately at the half-power point, when no RF is applied.

Figure 5D:
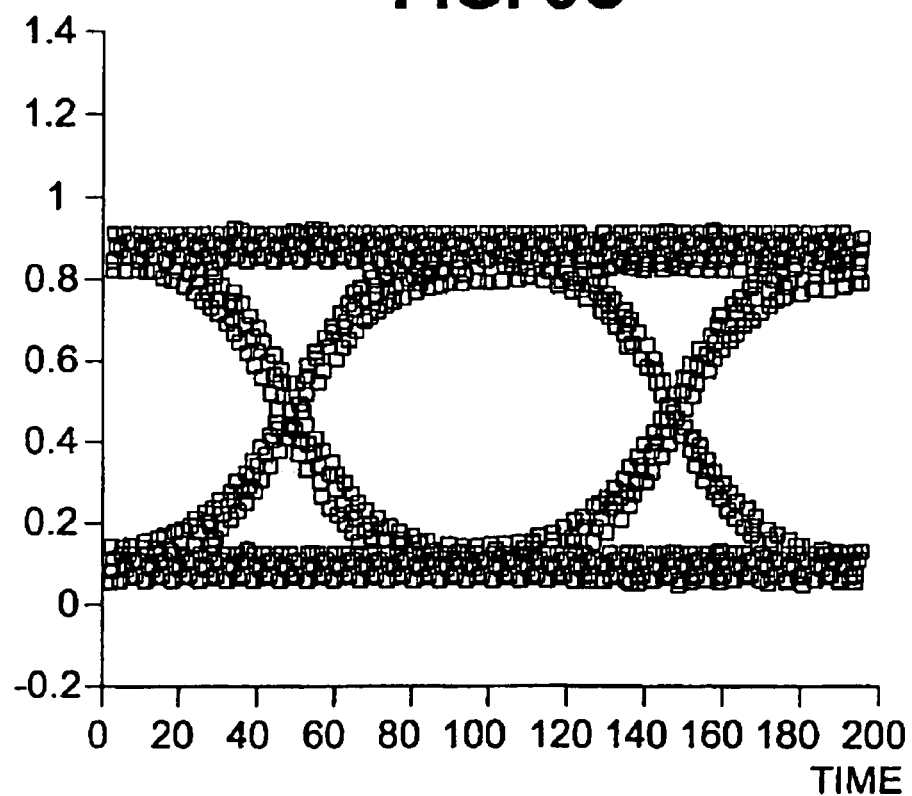
FIG. 5d is a simulated eye diagram of an optical signal after passing through the optical modulator shown in FIG. 5a, when both interferometers are biased 25° from quadrature.

FIG. 5*d* illustrates a simulated eye diagram of an optical signal after passing through the optical modulator shown in FIG. 5*a*, when both interferometers are biased 25° from quadrature. The simulation accounts for RF loss, quasi-velocity matching, and high-pass filter effects. The simulation also includes under-driving the modulator. Notably, there is essentially no asymmetry in the shape of the eye. More specifically, the eye crossing level is about 50%, and the ones (full-on) and zeros (full-off) have approximately equal vertical width. In other words, these bias point settings theoretically provide a symmetric data eye. Of course, other bias points that also provide a compromise between insertion loss, drive voltage, and on/off ratio are also possible.

Advantageously, biasing both interferometers in the optical modulator off quadrature also allows the off excursions of the RF data signal to pass through a relatively linear portion of the transfer function, i.e., the middle portion. This allows the digital data to experience a greater degree of linearity in the electrical to optical transductance. The greater linearity reduces the size of the side lobes in the optical spectrum of the modulated optical signal, especially when the electrical signal applied to the modulator is band-limited. Band-limiting truncates the electrical spectrum of the RF data signal, and thus the width of the optical spectrum, such that there is an increase in tolerance to fiber dispersion. The larger dispersion tolerance permits transmission over longer fiber distance, with much less distortion in the transmitted digital signal than with a conventional optical modulator at the same distance.

Under-driving the optical modulator advantageously results in even greater linearity of the transfer function. The improved linearity further improves the performance over long lengths of dispersive fiber, such as 120 km of single mode fiber. Under-driving the cascaded modulator also results in a lower on/off ratio (9 dB) and about 0.5 db optical loss compared to a modulator based on a single interferometer, due to the fact that the cascaded modulator is never turned completely on or off.

Of course, the optical digital external modulator shown in FIG. 5*a* is described as above for exemplary purposes only. Alternatively, the optical modulator 500 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Further optionally, a polarizer (not shown) is provided between the substrate and the lens and/or near the input/output ports.

Figure 6:
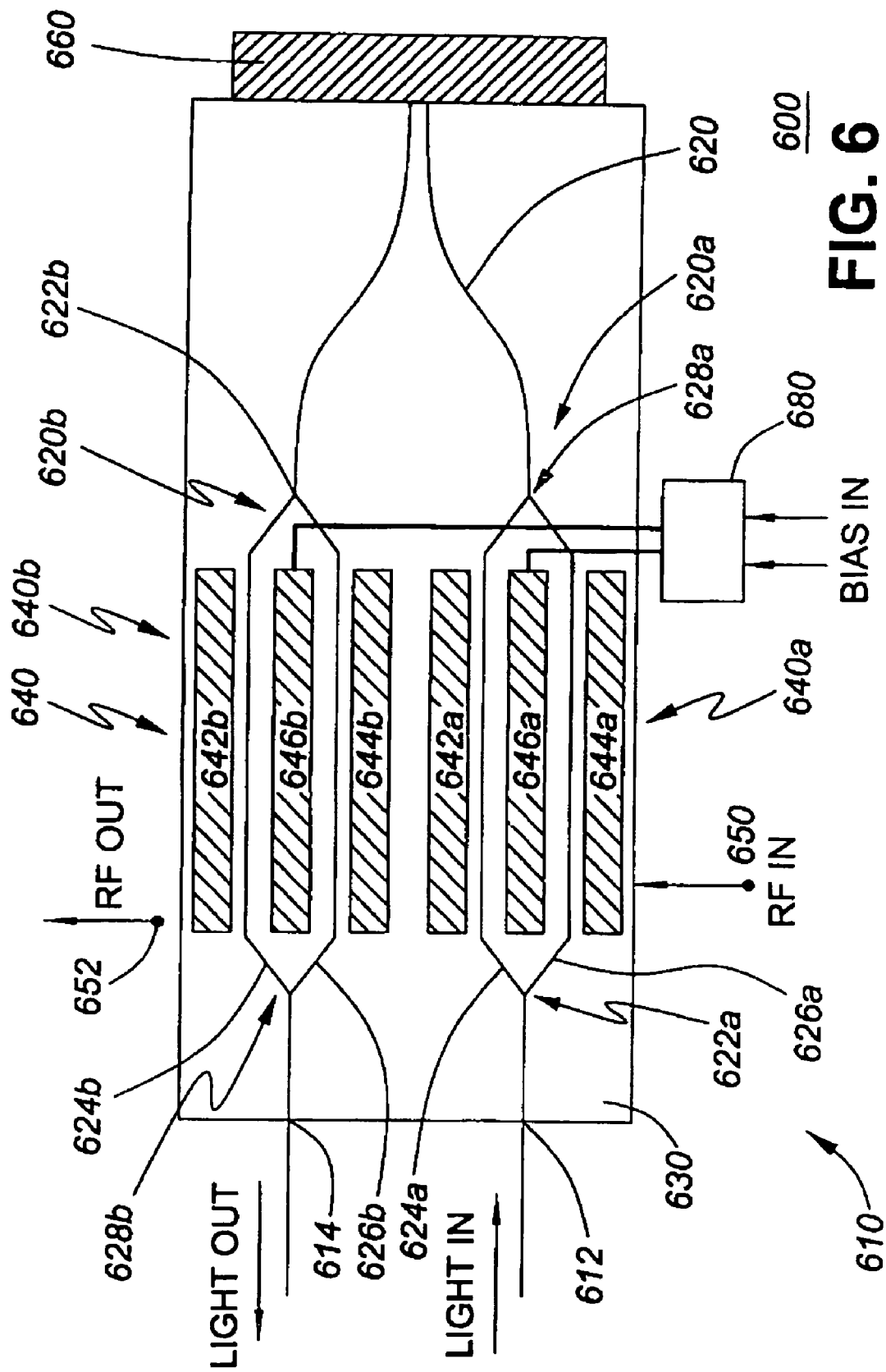
FIG. 6 is a schematic diagram of a Mach-Zehnder optical modulator formed on an x-cut lithium niobate substrate and including a reflective directional coupler, the optical modulator has a series cascaded arrangement and biasing means in accordance with another embodiment of the instant invention.

Referring to FIG. 6, there is shown a schematic diagram of an optical digital external modulator 600 in accordance with another embodiment of the instant invention that includes an optical waveguide 620 formed in an x-cut lithium niobate (LiNbO$_3$) substrate 630. The optical waveguide 620 forms a first Mach-Zehnder interferometer 620a and a second Mach-Zehnder interferometer 620b. The first interferometer 620a includes a first Y-branch 622a, a first interferometer arm 624a, a second interferometer arm 626a, and a second Y-branch 628a. The second interferometer 620b includes a first Y-branch 622b, a first interferometer arm 624b, a second interferometer arm 626b, and a second Y-branch 628b. At the end of the substrate 630 opposing the input/output end 610, the optical waveguide 620 and mirror 660 form a reflective direction coupler for folding the optical path from the first interferometer 620a to the second 620b. A traveling-wave electrode structure 640 is provided near the optical waveguide 620 such that the first interferometer arm 624a is disposed between ground electrode 642a and hot electrode 646a, while the second interferometer arm 626a is disposed between ground electrode 644a and hot electrode 646a. Similarly, the first interferometer arm 624b is disposed between ground electrode 642b and hot electrode 646b, while the second interferometer arm 626b is disposed between ground electrode 644b and hot electrode 646b. A single input terminal 650 provides an input for the driving voltages, while a single output terminal 652 provides an output for the remaining drive signal. A high-pass filter and bias-tee network 680 is provided between the first 646a and second 646b hot electrodes. The high-pass filter and bias tee network includes a high-pass filter for passing higher frequencies and rejecting lower ones and bias-tees for injecting DC bias voltages into the RF circuit without affecting the flow of the RF. For example, FIG. 5b illustrates one configuration of a circuit suitable for use as the high-pass filter and bias-tee network 680.

In operation, light is input into the modulator 600 from the input port 612 and is output through the output port 614. More specifically, the light input through the input port 612 propagates through the optical waveguide 620 to the first interferometer 620a, where it is split at the first Y-branch 622a, and is transmitted equally along the two isolated paths corresponding to the two interferometer arms 624a, 626a. When a time varying voltage is applied to the first part of the electrode structure 640a via terminal 650, an electric field is produced that propagates down the first part of the traveling-wave electrode structure 640a, which is constructed to form a microwave waveguide. The electric field at least partially overlaps the two interferometer arms 624a and 626a. In accordance with the electro-optic effect, the electric field causes the relative velocity of the light propagating through the two interferometer arms 624a, 626a to change, thus creating a phase shift and producing constructive or destructive interference at the second Y-branch 628a. The constructive and/or destructive interference produces an amplitude modulated optical signal, wherein the modulation corresponds to a modulated RF data signal used to produce the time varying voltage. The amplitude modulated optical signal propagates through the optical waveguide 620 to the mirror 660 where it is reflected and transmitted to the second interferometer 620b. The light input into the second interferometer 620b is split at the first Y-branch 622b, where it then propagates equally along the two isolated paths corresponding to the two interferometer arms 624b, 626b. Simultaneously, the RF drive signal remaining at the end of the first part of the electrode structure 640a is sent to the second part of the electrode structure 640b after passing through the high pass filter 680. When the filtered RF drive signal is applied to the second part of the electrode structure 640b, an electric field is produced that propagates down the electrode structure 640b, which is constructed to form a microwave waveguide. The electric field at least partially overlaps the two interferometer arms 624b and 626b. In accordance with the electro-optic effect, the electric field further impresses the synchronized modulated RF data signal onto the amplitude modulated optical signal, which is subsequently output through the output port 614.

In addition to the first, second, fourth, and fifth advantages of the optical modulators discussed with reference to FIG. 5a, the optical modulator shown in FIG. 6 has the additional advantage that the directional coupler does not form part of the Mach-Zehnder interferometer. Since the directional coupler is only used to fold the optical beam, rather than folding the interferometer arms, biasing shifts associated with temperature changes, aging, vibration, and/or shock are minimized. Furthermore, the optical modulator illustrated in FIG. 6 only requires a mirror or reflective surface beyond what is on the substrate/chip.

Of course, the optical digital external modulator shown in FIG. 6 is described as above for exemplary purposes only. Alternatively, the optical modulator 600 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, a polarizer (not shown) is provided between the substrate and the lens and/or near the input/output ports. Further optionally, the need for the mirror is obviated by designing the optical waveguide 620 with a u-turn rather than as a directional coupler.

Figure 7:
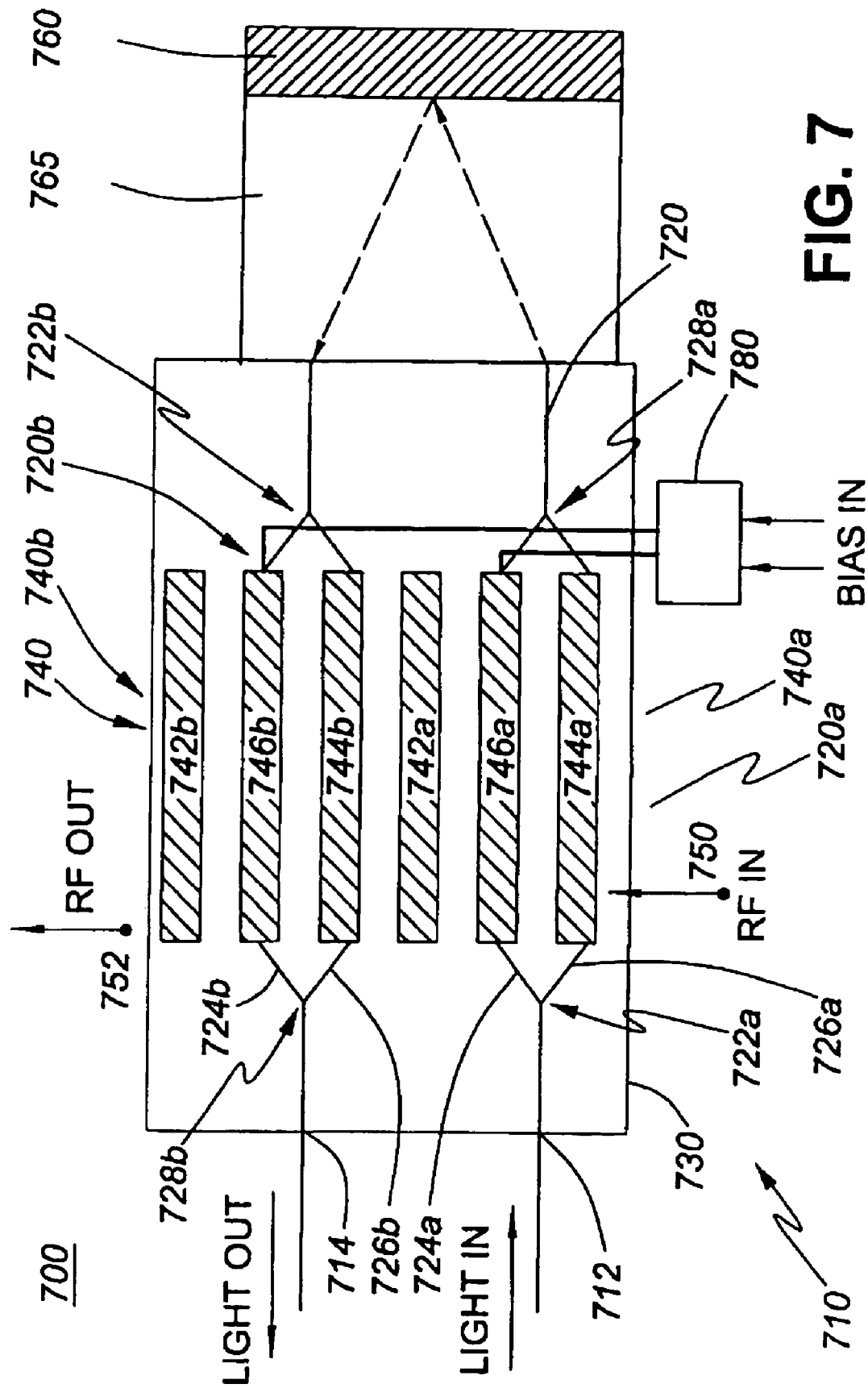
FIG. 7 is a schematic diagram of a Mach-Zehnder optical modulator formed on a z-cut lithium niobate substrate and including a reflective mirror and lens, the optical modulator has a series cascaded arrangement and biasing means in accordance with other embodiment of the instant invention.

Referring to FIG. 7, there is shown a schematic diagram of an optical digital external modulator 700 in accordance with another embodiment of the instant invention that includes an optical waveguide 720 formed in an z-cut lithium niobate (LiNbO$_3$) substrate 730. The optical waveguide 720 includes a first Mach-Zehnder interferometer 720a and a second Mach-Zehnder interferometer 720b. The first interferometer 720a includes a first Y-branch 722a, a first interferometer arm 724a, a second interferometer arm 726a, and a second Y-branch 728a. The second interferometer 720b includes a first Y-branch 722b, a first interferometer arm 724b, a second interferometer arm 726b, and a second Y-branch 728b. At the end of the substrate 730 opposing the input/output end 710, a mirror 760 and lens 765 are provided to fold the optical path from the first interferometer 720a to the second 720b. A traveling-wave electrode structure 740 including ground electrodes 742a, 744a, 742b, and 744b and hot electrodes 746a and 746b is provided near the optical waveguide 720 such that the first interferometer arm 724a is disposed beneath hot electrode 746a, while the second interferometer arm 726a is disposed beneath ground electrode 744a. Similarly, the first interferometer arm 724b is disposed beneath hot electrode 746b, while the second interferometer arm 726b is disposed beneath ground electrode 744b. A single input terminal 750 provides an input for the driving voltages, while a single output terminal 752 provides an output for the remaining drive signal. A high-pass filter and bias-tee network 780 is provided between the first 746a and second 746b hot electrodes. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light is input into the modulator 700 from the input port 712 and is output through the output port 714. More specifically, the light input through the input port 712 propagates through the optical waveguide 720 to the first interferometer 720a, where it is split at the first Y-branch 722a, and is transmitted equally along the two isolated paths corresponding to the two interferometer arms 724a, 726a. When a time varying voltage is applied to the first part of the electrode structure 740a via terminal 750, an electric field is produced that propagates down the first part of the traveling-wave electrode structure 740a, which is constructed to form a microwave waveguide. The electric field at least partially overlaps the two interferometer arms 724a and 726a. In accordance with the electro-optic effect, the electric field causes the relative velocity of the light propagating through the two interferometer arms 724a, 726a to change, thus creating a phase shift and producing constructive or destructive interference at the second Y-branch 728a. The constructive and/or destructive interference produces an amplitude modulated optical signal, wherein the modulation corresponds to a modulated RF data signal used to produce the time varying voltage. The amplitude modulated optical signal propagates through the optical waveguide 720 to the lens 765 and mirror 760, where it is reflected and transmitted to the second interferometer 720b. The light input into the second interferometer 720b is split at the first Y-branch 722b, where it then propagates equally along the two isolated paths corresponding to the two interferometer arms 724b, 726b. Simultaneously, the RF drive signal remaining at the end of the first part of the electrode structure 740a is sent to the second part of the electrode structure 740b after passing through the high pass filter 780. When the filtered RF drive signal is applied to the second part of the electrode structure 740b, an electric field is produced that propagates down the electrode structure 740b, which is constructed to form a microwave waveguide. The electric field at least partially overlaps the two interferometer arms 724b and 726b. In accordance with the electro-optic effect, the electric field further impresses the synchronized modulated RF data signal onto the amplitude modulated optical signal, which is subsequently output through the output port 714.

In addition to the advantages discussed with reference to FIG. 5a, the optical modulator 700 exhibits the additional advantages associated with z-cut lithium niobate. More specifically, since the electrodes run underneath the electrodes and since the hot electrodes 746a and 746b produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer.

Of course, the optical digital external modulator shown in FIG. 7 is described as above for exemplary purposes only. Alternatively, the optical modulator 700 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Optionally, a polarizer (not shown) is provided between the substrate and the lens and/or near the input/output ports.

Figure 8:
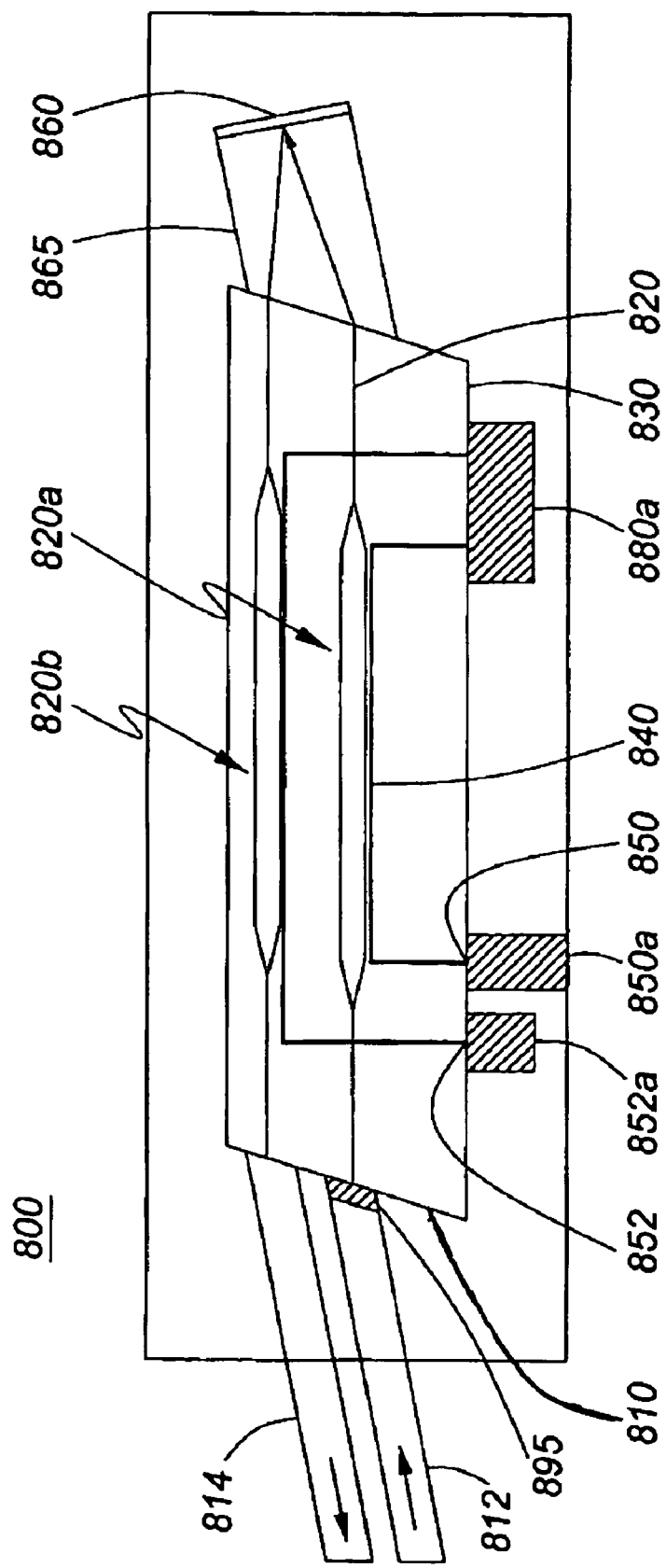
FIG. 8 is an enhanced schematic diagram of a Mach-Zehnder optical modulator formed on a z-cut lithium niobate substrate and including beam folding micro-optics, the optical modulator has a series cascaded arrangement and biasing means in accordance with yet another embodiment of the instant invention.

Referring to FIG. 8, there is shown a schematic diagram of an optical digital external modulator 800 in accordance with yet another embodiment of the instant invention that includes an optical waveguide 820 formed in an z-cut lithium niobate ($LiNbO_3$) substrate 830. The optical waveguide 820 includes a first Mach-Zehnder interferometer 820a and a second Mach-Zehnder interferometer 820b. Input 812 and output 814 optical fibers are attached to one end 810 of the substrate 830. Optionally, the two fibers are aligned and mounted to the substrate with silicon V-grooves. At the end of the substrate 830 opposing the input/output end 810, beam folding micro-optics are provided to fold the optical path from the first interferometer 820a to the second 820b. More specifically, the beam folding micro-optics include a GRIN lens 865 and a reflective coating 860. A traveling-wave electrode structure 840, which for improved clarity does not show the individual electrodes, is provided near the first and second interferometers 820a and 820b. A single input terminal 850 provides an input for the driving voltages, while a single output terminal 852 provides an output for the remaining drive signal. Each of the input 850 and output 852 terminals are coupled to a separate ceramic substrate 850a and 852a on which the RF launch and RF termination circuits are formed, respectively. An RF driver (not shown) is coupled to the RF launch ceramic 850a. A high-pass filter and bias-tee network (not shown) is provided on a third substrate 880a and forms part of the electrical path linking the first and second stages of the optical modulator. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network. A polarizer 895 is provided between the substrate and the input optical fiber 812 to attenuate the unwanted polarization state.

In operation, light is input into the modulator 800 from the input fiber 812 and is output the output fiber 814. More specifically, the light input through the input fiber 812 propagates through the optical waveguide 820 to the first interferometer 820a. When a time varying voltage is applied to the electrode structure 840 via terminal 850, an electric field is produced that propagates down the traveling-wave electrode structure 840, which is constructed to form a microwave waveguide. The electric field at least partially overlaps the two interferometer arms of the first interferometer 820a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 820 to the reflective surface 860, where it is reflected and transmitted to the second interferometer 820b. Simultaneously, the RF drive signal remaining at the end of the first interferometer 820a passes through the high pass filter and is applied to the second interferometer 820b. This creates an electric field that propagates down the electrode structure 840, which is constructed to form a microwave waveguide, and at least partially overlaps the two interferometer arms of the second interferometer 820b. In accordance with the electro-optic effect, the electric field further impresses the synchronized modulated RF data signal onto the amplitude modulated optical signal, which is subsequently output the output fiber 814.

In addition to the advantages discussed with reference to FIG. 5a, the optical modulator 800 exhibits the additional advantages associated with z-cut lithium niobate. More specifically, since the electrodes run underneath the electrodes and since the hot electrodes produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer.

Of course, the optical digital external modulator shown in FIG. 8 is described as above for exemplary purposes only. Alternatively, the optical modulator 800 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, the reflective surface is replace with another reflector such as a prism.

Figure 9:
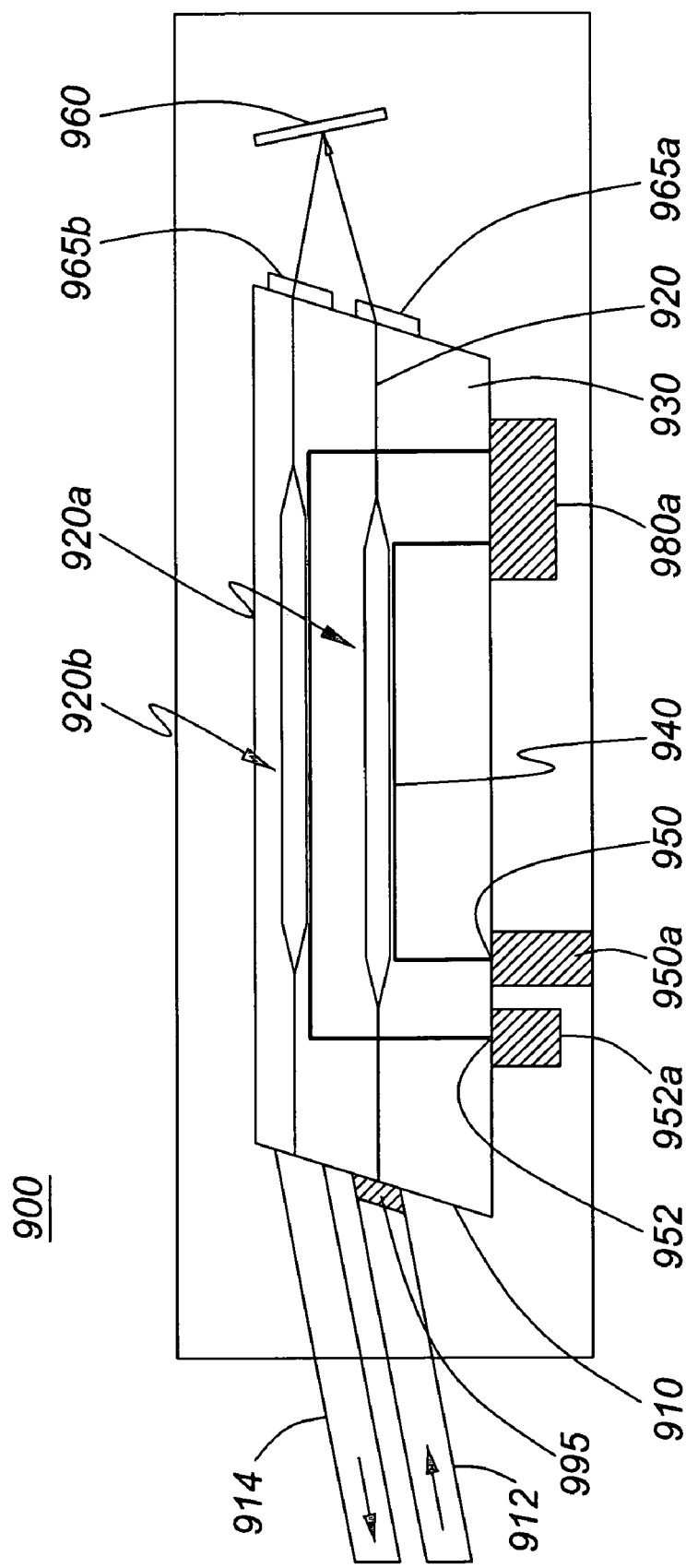
FIG. 9 is an enhanced schematic diagram of a Mach-Zehnder optical modulator formed on a z-cut lithium niobate substrate and including a VOA function via a MEMS mirror, the optical modulator has a series cascaded arrangement and biasing means in accordance with another embodiment of the instant invention.

Referring to FIG. 9, there is shown a schematic diagram of an optical digital external modulator 900 in accordance with yet another embodiment of the instant invention that includes an optical waveguide 920 formed in an z-cut lithium niobate ($LiNbO_3$) substrate 930. The optical waveguide 920 includes a first Mach-Zehnder interferometer 920a and a second Mach-Zehnder interferometer 920b. Input 912 and output 914 optical fibers are attached to one end 910 of the substrate 930. Optionally, the two fibers are aligned and mounted to the substrate with silicon V-grooves. At the end of the substrate 930 opposing the input/output end 910, a mirror 960, a first lens 965a, and a second lens 965b are provided to fold the optical path from the first interferometer 920a to the second 920b. More specifically, the mirror is a micro-electro-mechanical (MEMS) mirror that is tiltable to control the amount of light that enters the second interferometer 920b. A traveling-wave electrode structure 940, which for improved clarity does not show the individual electrodes, is provided near the first and second interferometers 920a and 920b. A single input terminal 950 provides an input for the driving voltages, while a single output terminal 952 provides an output for the remaining drive signal. Each of the input 950 and output 952 terminals are coupled to a separate ceramic substrate 950a and 952a on which the RF launch and RF termination circuits are formed, respectively. An RF driver (not shown) is coupled to the RF launch ceramic 950a. A high-pass filter and bias-tee network (not shown) is provided on the third substrate 980a and forms part of the electrical path linking the first and second stages of the optical modulator. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network. A polarizer 995 is provided between the substrate and the input optical fiber 912 to attenuate the unwanted polarization state.

In operation, light is input into the modulator 900 from the input fiber 912 and is output the output fiber 914. More specifically, the light input through the input fiber 912 propagates through the optical waveguide 920 to the first interferometer 920a. When a time varying voltage is applied to the electrode structure 940 via terminal 950, an electric field is produced that propagates down the traveling-wave electrode structure 940, which is constructed to form a microwave waveguide. The electric field at least partially overlaps the two interferometer arms of the first interferometer 920a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 920 to the MEMS mirror 960, where it is reflected and transmitted to the second interferometer 920b. Simultaneously, the RF drive signal remaining at the end of the first interferometer 920a passes through the high pass filter (not shown) and is applied to the second interferometer 920b. This creates an electric field that propagates down the electrode structure 940, which is constructed to form a microwave waveguide, and at least partially overlaps the two interferometer arms of the second interferometer 920b. In accordance with the electro-optic effect, the electric field further impresses the synchronized modulated RF data signal onto the amplitude modulated optical signal, which is subsequently output the output fiber 914.

In addition to the advantages discussed with reference to FIG. 5a, the dual serial optical modulator 900 exhibits the additional advantages associated with z-cut lithium niobate. More specifically, since the electrodes run underneath the electrodes and since the hot electrodes produce stronger effects than the ground electrodes, there is an imbalance in the modulation. This imbalance chirps the optical frequency during the 0→1 and 1→0 transitions of the digital signal. The chirp compresses the digital pulses in the data stream, when they are transmitted over dispersive fiber. The combination of improved linearity and chirp significantly improves the transmission performance over 120 km of single mode fiber relative to a conventional z-cut modulator based on only one interferometer. Furthermore, incorporating a MEMS mirror advantageously provides a voltage-operated-attenuation (VOA) function.

Of course, the optical digital external modulator shown in FIG. 9 is described as above for exemplary purposes only. Alternatively, the optical modulator 900 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, the MEMS mirror is replaced with another reflector and the VOA function is achieved by including liquid crystal shutters (not shown) in the optical path.

Figure 10:
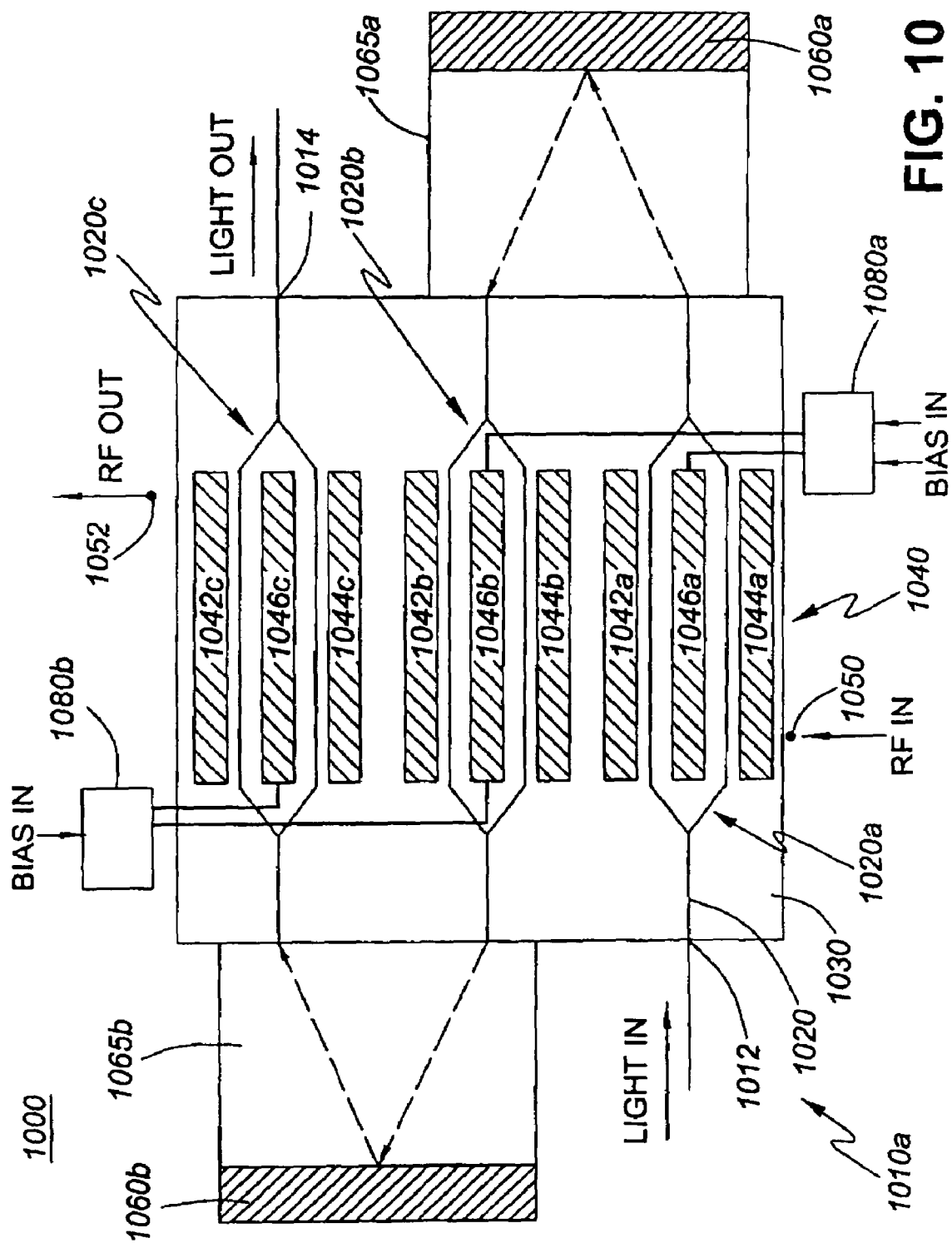
FIG. 10 is a schematic diagram of a three stage Mach-Zehnder optical modulator formed on a x-cut lithium niobate substrate and including two lenses and two mirrors, the optical modulator has a series cascaded arrangement and biasing means in accordance with another embodiment of the instant invention.

Referring to FIG. 10, there is shown a schematic diagram of an optical digital external modulator 1000 in accordance with another embodiment of the instant invention that includes an optical waveguide 1020 formed in an x-cut lithium niobate (LiNbO$_3$) substrate 1030. The optical waveguide 1020 includes a first Mach-Zehnder interferometer 1020a, a second Mach-Zehnder interferometer 1020b, and a third Mach-Zehnder interferometer 1020c. Each interferometer includes a first Y-branch, a first interferometer arm, a second interferometer arm, and a second Y-branch. At the end of the substrate 1030 opposing the input end 1010, a first mirror 1060a and first lens 1065a are provided to fold the optical path from the first interferometer 1020a to the second 1020b. At the input end 1010, a second mirror 1060b and second lens 1065b are provided to fold the optical path from the second interferometer 1020b to the third 1020c. A traveling-wave electrode structure 1040 is provided near the optical waveguide 1020 such that the first interferometer 1020a has a first arm disposed between a ground electrode 1042a and hot electrode 1046a, while the second interferometer arm is disposed between ground electrode 1044a and hot electrode 1046a. Similarly, the second interferometer 1020b has first interferometer arm disposed between ground electrode 1042b and hot electrode 1046b, while the second interferometer arm is disposed between ground electrode 1044b and hot electrode 1046b. Finally, the third interferometer 1020c has a first interferometer arm disposed between ground electrode 1042c and hot electrode 1046c, while the second interferometer arm is disposed between ground electrode 1044c and hot electrode 1046c. A single input terminal 1050 provides an input for the driving voltage, while a single output terminal 1052 provides an output for the remaining drive signal. A first high-pass filter and bias-tee network 1080a is provided between the first 1046a and second 1046b hot electrodes, while a second high-pass filter and bias-tee network 1080b is provided between the second 1046b and third 1046c hot electrodes. Preferably, each high-pass filter and bias tee network includes a high-pass filter for passing higher frequencies and rejecting lower ones and one or two bias-tees for injecting one or two DC bias voltages into the RF circuit without affecting the flow of the RF. For example, FIG. 5b shows one example of a circuit suitable for serving as each high-pass filter and bias-tee network.

In operation, light is input into the modulator 1000 from the input port 1012 and is output through the output port 1014. More specifically, the light input through the input port 1012 propagates through the optical waveguide 1020 to the first interferometer 1020a. When a time varying voltage is applied to the electrode structure 1040 via terminal 1050, an electric field is produced that propagates down the first part of the traveling-wave electrode structure 1040, which is constructed to form a microwave waveguide. The electric field at least partially overlaps the two interferometer arms of the first interferometer 1020a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1020 to the first mirror 1060a where it is reflected and transmitted to the second interferometer 1020b. Simultaneously, the RF drive signal remaining at the end of the first part of the electrode structure 1040 is sent to the second part of the electrode structure 1040 after passing through the high pass filter 1080a. When the filtered RF drive signal is applied to the second part of the electrode structure 1040, an electric field is produced that propagates down the electrode structure, which is constructed to form a microwave waveguide. The electric field at least partially overlaps the two interferometer arms in the second interferometer 1020b. In accordance with the electro-optic effect, the electric field further impresses the synchronized modulated RF data signal onto the amplitude modulated optical signal. The strengthened amplitude modulated optical signal propagates through the optical waveguide 1020 to the second mirror 1060b where it is reflected and transmitted to the third interferometer 1020c. Simultaneously, the RF drive signal remaining at the end of the second part of the electrode structure 1040 is sent to the third part of the electrode structure after passing through the second high pass filter 1080b. When the filtered RF drive signal is applied to the third part of the electrode structure 1040, an electric field is produced that propagates down the electrode structure 1040, which is constructed to form a microwave waveguide. The electric field at least partially overlaps the two interferometer arms of the third interferometer 1020c. In accordance with the electro-optic effect, the electric field further impresses the synchronized modulated RF data signal onto the amplitude modulated optical signal to create an even stronger amplitude modulated optical signal, which is subsequently output through the output port 1014.

In addition to the advantages of the optical modulator discussed with reference to FIG. 5a, the three stage optical modulator shown in FIG. 10 has the additional advantage that the overall device length is approximately one-third the length of a conventional modulator.

Of course, the optical digital external modulator shown in FIG. 10 is described as above for exemplary purposes only. Alternatively, the optical modulator 1000 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. In this case, the edge of the substrate is positioned at the apex of intersecting waveguides, allowing the optical path to be folded without the need for micro-optics. Optionally, the mirror is replaced with a prism. Further optionally, a polarizer (not shown) is provided between the substrate and the lens and/or near the input/output ports. Further optionally, a DOC (not shown) is mounted on the substrate for tapping light to provide power monitoring and/or feedback for bias control.

Figure 11:
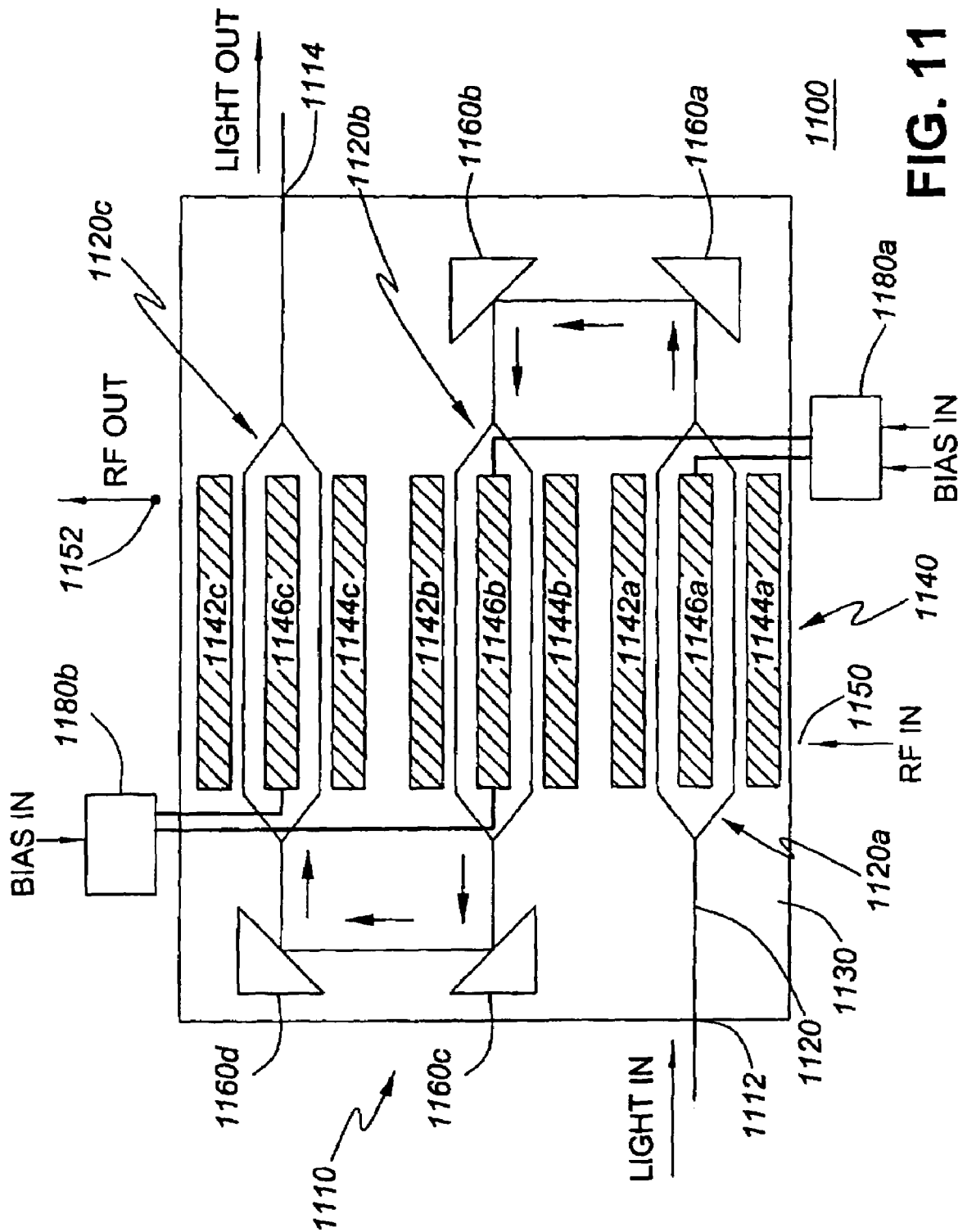
FIG. 11 is a schematic diagram of a three stage Mach-Zehnder optical modulator formed on a x-cut lithium niobate substrate and including integrated mirrors, the optical modulator has a series cascaded arrangement and biasing means in accordance with another embodiment of the instant invention.

Referring to FIG. 11, there is shown a schematic diagram of an optical digital external modulator 1100 in accordance with another embodiment of the instant invention that includes an optical waveguide 1120 formed in an x-cut lithium niobate (LiNbO$_3$) substrate 1130. The optical waveguide 1120 includes a first Mach-Zehnder interferometer 1120a, a second Mach-Zehnder interferometer 1120b, and a third Mach-Zehnder interferometer 1120c. Each interferometer includes a first Y-branch, a first interferometer arm, a second interferometer arm, and a second Y-branch. At the end of the substrate 1130 opposing the input end 1110, first 1160a and second 1160b reflective surfaces are provided to fold the optical path from the first interferometer 1120a to the second 1120b. At the input end 1110, third 1160c and fourth 1160d reflective surfaces are provided to fold the optical path from the second interferometer 1120b to the third 1120c. Preferably, the reflective surfaces are fabricated by etching a region of the substrate and metallizing the etched surfaces. Ideally, the etched surfaces are highly vertical with little tilt. A traveling-wave electrode structure 1140 is provided near the optical waveguide 1120 such that the first interferometer 1120a has a first arm disposed between a ground electrode 1142a and hot electrode 1146a, while the second interferometer arm is disposed between ground electrode 1144a and hot electrode 1146a. Similarly, the second interferometer 1120b has first interferometer arm disposed between ground electrode 1142b and hot electrode 1146b, while the second interferometer arm is disposed between ground electrode 1144b and hot electrode 1146b. Finally, the third interferometer 1120c has a first interferometer arm disposed between ground electrode 1142c and hot electrode 1146c, while the second interferometer arm is disposed between ground electrode 1144c and hot electrode 1146c. A single input terminal 1150 provides an input for the driving voltage, while a single output terminal 1152 provides an output for the remaining drive signal. A first high-pass filter and bias-tee network 1180a is provided between the first 1146a and second 1146b hot electrodes, while a second high-pass filter and bias-tee network 1180b is provided between the second 1146b and third 1146c hot electrodes. Preferably, each high-pass filter and bias tee network includes a high-pass filter for passing higher frequencies and rejecting lower ones and one or two bias-tees for injecting DC bias voltages into the RF circuit without affecting the flow of the RF. For example, FIG. 5b shows one example of a circuit suitable for serving as each high-pass filter and bias-tee network.

In operation, light is input into the modulator 1100 from the input port 1112 and is output through the output port 1114. More specifically, the light input through the input port 1112 propagates through the optical waveguide 1120 to the first interferometer 1120a. When a time varying voltage is applied to the electrode structure 1140 via terminal 1150, an electric field is produced that propagates down the first part of the traveling-wave electrode structure 1140, which is constructed to form a microwave waveguide. The electric field at least partially overlaps the two interferometer arms of the first interferometer 1120a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1120 to the first reflective surface 1160a where it is reflected to the second reflective surface 1160b and transmitted to the second interferometer 1120b. Simultaneously, the RF drive signal remaining at the end of the first part of the electrode structure 1140 is sent to the second part of the electrode structure after passing through the high pass filter 1180a. When the filtered RF drive signal is applied to the second part of the electrode structure 1140, an electric field is produced that propagates down the electrode structure, which is constructed to form a microwave waveguide. The electric field at least partially overlaps the two interferometer arms in the second interferometer 1120b. In accordance with the electro-optic effect, the electric field further impresses the synchronized modulated RF data signal onto the amplitude modulated optical signal. The strengthened amplitude modulated optical signal propagates through the optical waveguide 1120 to the third reflective surface 1160c where it is reflected to the fourth reflective surface 1160d and transmitted to the third interferometer 1120c. Simultaneously, the RF drive signal remaining at the end of the second part of the electrode structure 1140 is sent to the third part of the electrode structure after passing through the second high pass filter 1180b. When the filtered RF drive signal is applied to the third part of the electrode structure 1140, an electric field is produced that propagates down the electrode structure 1140, which is constructed to form a microwave waveguide. The electric field at least partially overlaps the two interferometer arms of the third interferometer 1120c. In accordance with the electro-optic effect, the electric field further impresses the synchronized modulated RF data signal onto the amplitude modulated optical signal to create an even stronger amplitude modulated optical signal, which is subsequently output through the output port 1114.

In addition to the advantages of the optical modulators discussed with reference to FIG. 10, the three stage optical modulator shown in FIG. 11 has the additional advantage that the reflective surfaces are integrated into the substrate.

Of course, the optical digital external modulator shown in FIG. 11 is described as above for exemplary purposes only. Alternatively, the optical modulator 1100 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, and/or to replace the traditional traveling wave electrode with another electrode structure such as a lumped or dual drive electrode. Optionally, a polarizer (not shown) is provided adjacent to the substrate near the input and/or output ports. Further optionally, a photo-detector (not shown) is mounted near one or more of the reflective surfaces to tap light to provide power monitoring and/or feedback for bias control.

Figure 12:
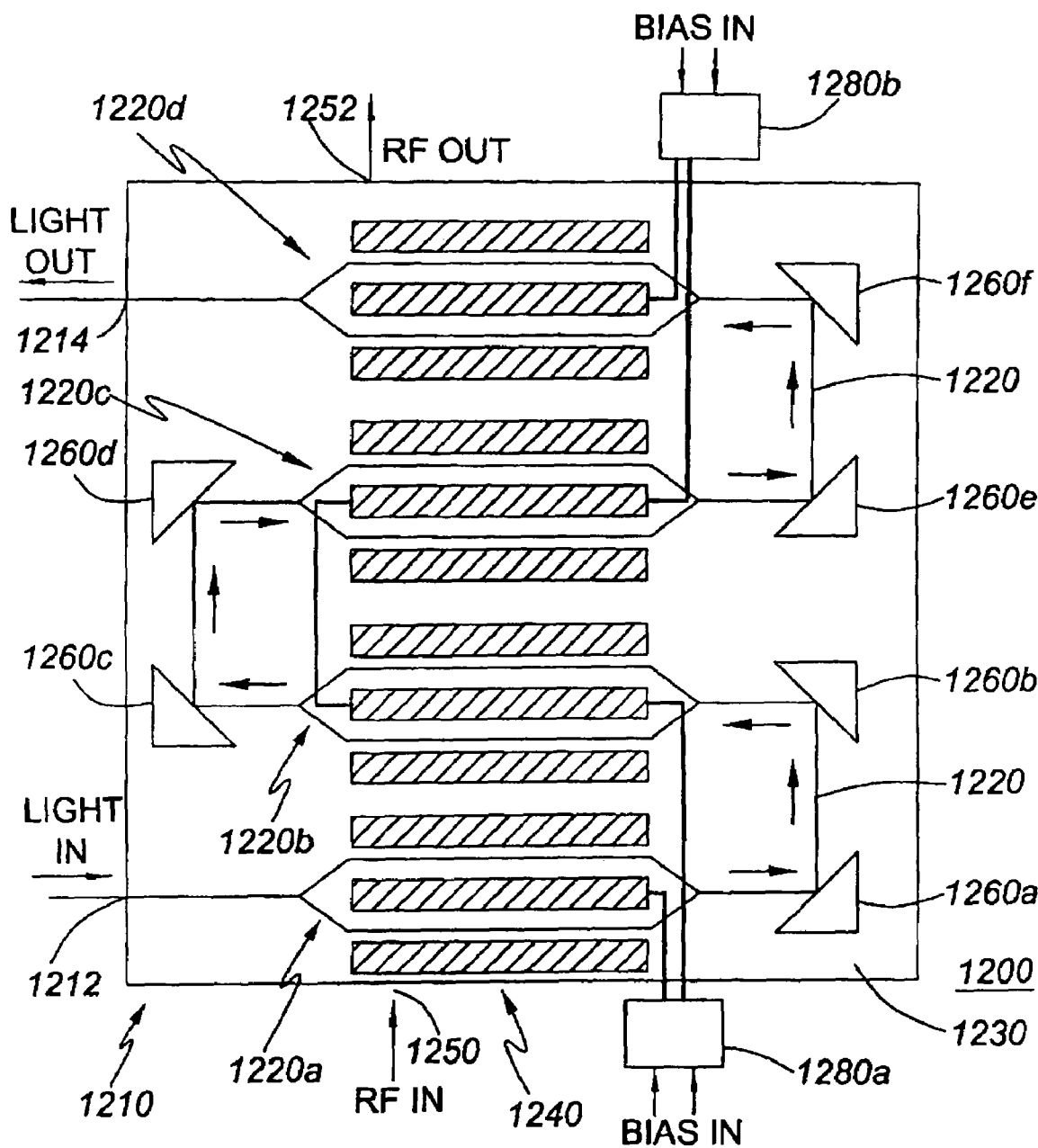
FIG. 12 is a schematic diagram of a four stage Mach-Zehnder optical modulator formed on a x-cut lithium niobate substrate and including integrated mirrors, the optical modulator has a series cascaded arrangement and biasing means in accordance with another embodiment of the instant invention.

Referring to FIG. 12, there is shown a schematic diagram of an optical digital external modulator 1200 in accordance with yet another embodiment of the instant invention that includes an optical waveguide 1220 formed in an x-cut lithium niobate (LiNbO$_3$) substrate 1230. The optical waveguide 1220 includes a first Mach-Zehnder interferometer 1220*a*, a second Mach-Zehnder interferometer 1220*b*, a third Mach-Zehnder interferometer 1220*c*, and a fourth Mach-Zehnder interferometer 1220*d*. Each interferometer includes a first Y-branch, a first interferometer arm, a second interferometer arm, and a second Y-branch. At the end of the substrate 1230 opposing the input/output end 1210, first 1260*a* and second 1260*b* reflective surfaces are provided to fold the optical path from the first interferometer 1220*a* to the second 1220*b*, while fifth 1260*e* and sixth 1260*f* reflective surfaces are provided to fold the optical path from the third interferometer 1020*c*. to the fourth 1020*d*. At the input end 1210, third 1260*c* and fourth 1260*d* reflective surfaces are provided to fold the optical path from the second interferometer 1220*b* to the third 1220*c*. Preferably, the reflective surfaces are fabricated by etching a region of the substrate and metallizing the etched surfaces. Ideally, the etched surfaces are highly vertical with little tilt. A traveling-wave electrode structure 1240 is provided near the optical waveguide 1220. A single input terminal 1250 provides an input for the driving voltage, while a single output terminal 1252 provides an output for the remaining drive signal. A first high-pass filter and bias-tee network 1280*a* is provided in the electrical path connecting sections of the electrode structure positioned near the first and second interferometers, while a second high-pass filter and bias-tee network 1280*b* is provided in the electrical path connecting sections of the electrode structure positioned near the third 1220*c* and fourth 1220*d* interferometers. Preferably, each high-pass filter and bias tee network includes a high-pass filter for passing higher frequencies and rejecting lower ones and bias-tees for injecting DC bias voltages into the RF circuit without affecting the flow of the RF. For example, FIG. 5*b* shows one example of a circuit suitable for serving as each high-pass filter and bias-tee network.

In operation, light is input into the modulator 1200 from the input port 1212 and is output through the output port 1214. More specifically, the light input through the input port 1212 propagates through the optical waveguide 1220 such that it sequentially passes through the first interferometer 1220*a*, the second interferometer 1220*b*, the third interferometer 1220*c*, and the fourth interferometer 1220*d*. When a time varying voltage corresponding to a modulated RF data signal is launched into the electrode structure 1240 via terminal 1250, an electric field is produced. The electric field propagates through the electrode structure, which is constructed to form a continuous microwave waveguide, such that it also at least partially overlaps with each of the four interferometers before being output terminal 1252. At each stage of the optical modulator, the electric field impresses the modulation from the RF data signal onto the optical signal producing a relatively strong amplitude modulated optical signal, which is output through the output port 1214.

In addition to the advantages of the optical modulators discussed with reference to FIG. 5*a*, the four stage optical modulator shown in FIG. 12 has the advantage that the overall device length is approximately one-fourth the length of a conventional modulator. Furthermore, the optical modulator 1200 has the additional advantage that the reflective surfaces are integrated onto the substrate.

Of course, the optical digital external modulator shown in FIG. 12 is described as above for exemplary purposes only. Alternatively, the optical modulator 1200 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, to use a z- or y-cut electro-optic substrate, and/or to replace the traditional traveling wave electrode with another electrode structure such as a lumped or dual drive electrode. Optionally, a polarizer (not shown) is provided adjacent to the substrate near the input and/or output ports. Further optionally, a photo-detector (not shown) is mounted near one or more of the reflective surfaces to tap light to provide power monitoring and/or feedback for bias control.

Figure 13:
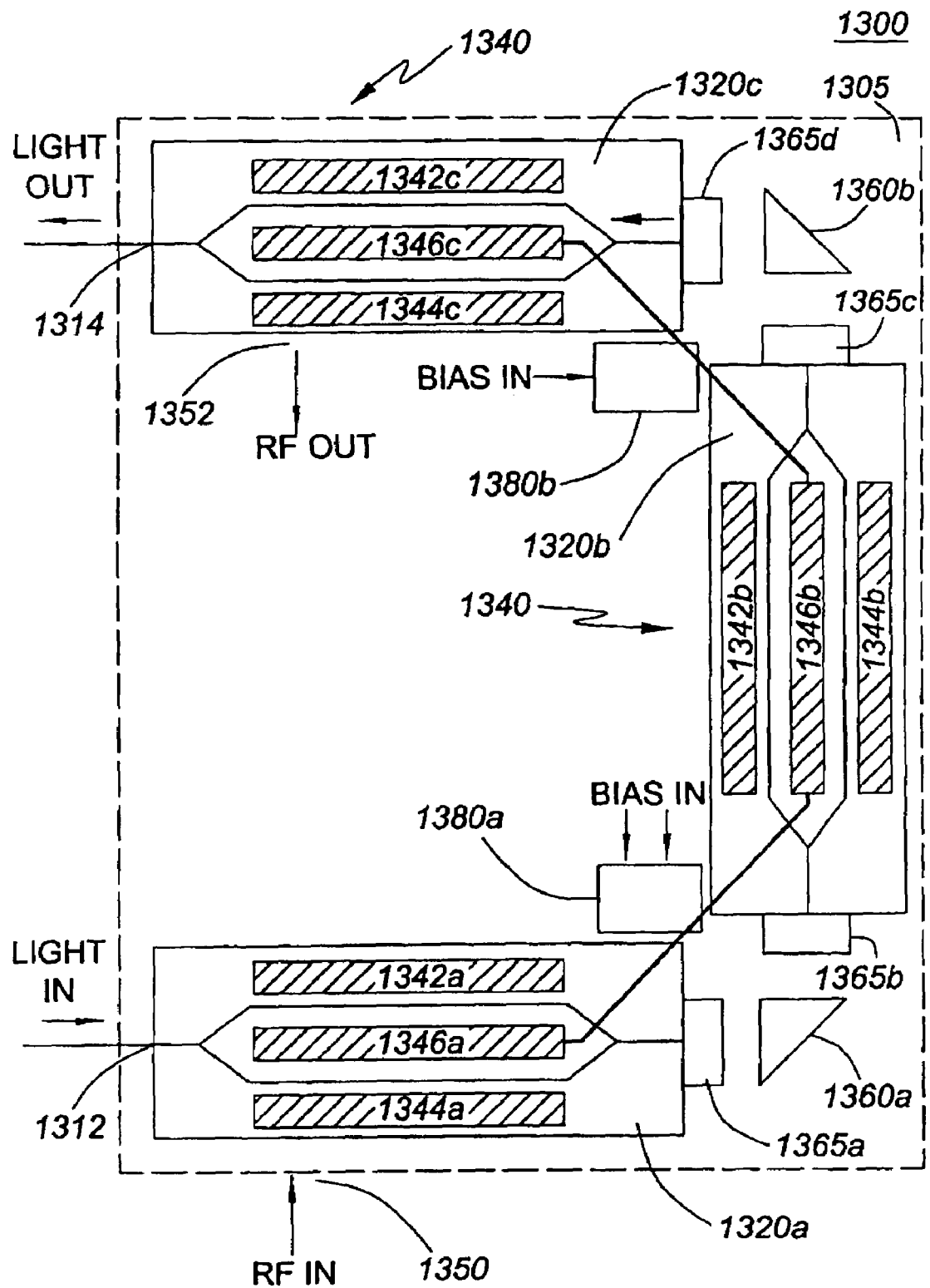
FIG. 13 is a schematic diagram of a three stage Mach-Zehnder optical modulator formed from three x-cut lithium niobate substrates, the optical modulator has a series cascaded arrangement and biasing means in accordance with another embodiment of the instant invention.

Referring to FIG. 13, there is shown a schematic diagram of an optical digital external modulator 1300 in accordance with another embodiment of the instant invention that includes a first Mach-Zehnder interferometer 1320*a*, a second Mach-Zehnder interferometer 1320*b*, and a third Mach-Zehnder interferometer 1320*c*, each of which is formed in a separate substrate or die. Electrode/waveguide orientation corresponding to x-cut lithium niobate is shown. Each die is mounted to a same tray 1305. Each interferometer includes a first Y-branch, a first interferometer arm, a second interferometer arm, and a second Y-branch. A first beam-folding prism 1360*a*, a first lens 1365*a*, and a second lens 1365*b* are provided to fold the optical path from the first interferometer 1320*a* to the second 1320*b*. A second beam-folding prism 1360*b*, third lens 1365*c*, and fourth lens 1365*d* are provided to fold the optical path from the second interferometer 1320*b* to the third 1320*c*. A traveling-wave electrode structure 1340 is coupled to each of the three interferometers such that in a first stage, the first interferometer 1320*a* has a first interferometer arm disposed between ground electrode 1342*a* and hot electrode 1346*a*, while the second interferometer arm is disposed between ground electrode 1344a and hot electrode 1346a. In the second stage, the second interferometer 1320b has first interferometer arm disposed between ground electrode 1342b and hot electrode 1346b, while the second interferometer arm is disposed between ground electrode 1344b and hot electrode 1346b. In the third stage, the third interferometer 1320c has a first interferometer arm disposed between ground electrode 1342c and hot electrode 1346c, while the second interferometer arm is disposed between ground electrode 1344c and hot electrode 1346c. A single input terminal 1350 provides an input for the driving voltage, while a single output terminal 1352 provides an output for the remaining drive signal. A first high-pass filter and bias-tee network 1380a is provided between the first 1346a and second 1346b hot electrodes, while a second high-pass filter and bias-tee network 1380b is provided between the second 1346b and third 1346c hot electrodes. Preferably, each high-pass filter and bias tee network includes a high-pass filter for passing higher frequencies and rejecting lower ones and one or two bias-tees for injecting DC bias voltages into the RF circuit without affecting the flow of the RF. For example, FIG. 5b shows one example of a circuit suitable for serving as each high-pass filter and bias-tee network. Advantageously, the electrical path between stages is shorter than the optical path between stages.

In operation, light is input into the modulator 1300 from the input port 1312 and is output through the output port 1314. More specifically, the light input through the input port 1312 propagates to the first interferometer 1320a. When a time varying voltage is applied to the electrode structure 1340 via terminal 1350, an electric field is produced that propagates down the first part of the traveling-wave electrode structure 1340, which is constructed to form a microwave waveguide. The electric field at least partially overlaps the two interferometer arms of the first interferometer 1320a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates to the first beam folding prism 1360a where it is redirected and transmitted to the second interferometer 1320b. Simultaneously, the RF drive signal remaining at the end of the first part of the electrode structure 1340 is sent to the second part of the electrode structure after passing through the high pass filter 1380a. When the filtered RF drive signal is applied to the second part of the electrode structure 1340, an electric field is produced that propagates down the electrode structure, which is constructed to form a microwave waveguide. The electric field at least partially overlaps the two interferometer arms in the second interferometer 1320b. In accordance with the electro-optic effect, the electric field further impresses the synchronized modulated RF data signal onto the amplitude modulated optical signal. The strengthened amplitude modulated optical signal propagates through the optical waveguide 1320 to the second beam-folding prism 1360b where it is redirected and transmitted to the third interferometer 1320c. Simultaneously, the RF drive signal remaining at the end of the second part of the electrode structure 1340 is sent to the third part of the electrode structure after passing through the second high pass filter 1380b. When the filtered RF drive signal is applied to the third part of the electrode structure 1340, an electric field is produced that propagates down the electrode structure 1340, which is constructed to form a microwave waveguide. The electric field at least partially overlaps the two interferometer arms of the third interferometer 1320c. In accordance with the electro-optic effect, the electric field further impresses the synchronized modulated RF data signal onto the amplitude modulated optical signal to create an even stronger amplitude modulated optical signal, which is subsequently output through the output port 1314.

Of course, the optical digital external modulator shown in FIG. 13 is described as above for exemplary purposes only. Alternatively, the optical modulator 1300 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace each lithium niobate substrate with another electro-optic substrate, such as a semiconductor (e.g., GaAs or InP), to provide an RF input terminal for each interferometer, to use a z- or y-cut electro-optic substrates, and/or to replace the traditional traveling wave electrode with another electrode structure such as a lumped or dual drive electrode. Optionally, a polarizer (not shown) is provided adjacent to the substrate near the input and/or output ports and/or between one of the substrates and a corresponding lens.

Figure 14:
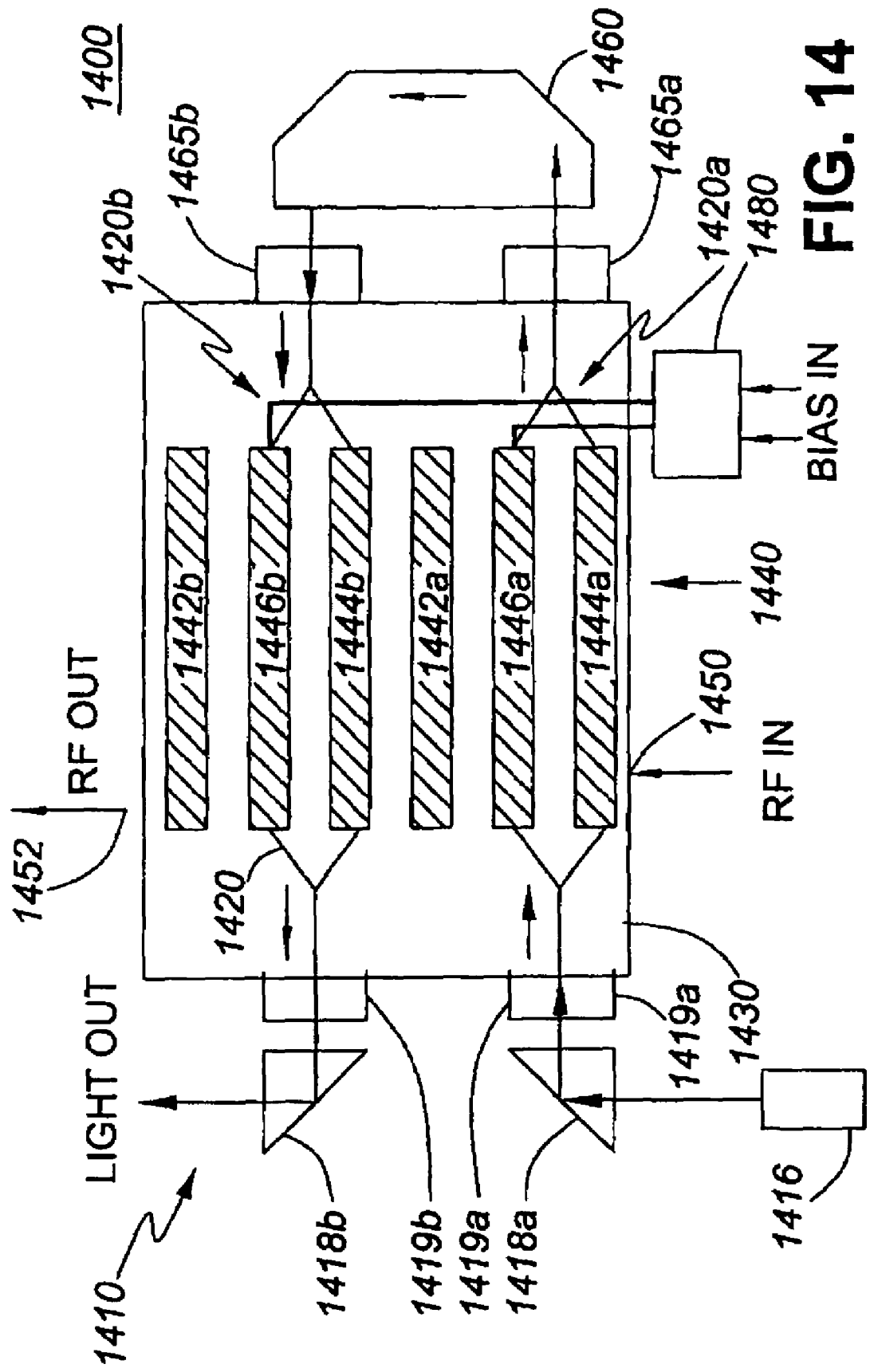
FIG. 14 is a schematic diagram of a dual stage Mach-Zehnder optical modulator formed on a z-cut lithium niobate substrate and integrated with a laser, the optical modulator has a series cascaded arrangement and biasing means in accordance with another embodiment of the instant invention.

Referring to FIG. 14, there is shown a schematic diagram of an optical digital external modulator 1400 in accordance with another embodiment of the instant invention that includes an optical waveguide 1420 formed in an z-cut lithium niobate (LiNbO$_3$) substrate 1430. The optical waveguide 1420 includes a first Mach-Zehnder interferometer 1420a and a second Mach-Zehnder interferometer 1420b. Each interferometer includes a first Y-branch, a first interferometer arm, a second interferometer arm, and a second Y-branch. At the input end of the substrate 1410 an optical source, which for exemplary purposes is shown as a laser 1416, provides a continuous-wave light signal. A first prism 1418a, first lens 1419a, second prism 1418b, and second lens 1419b are provided to couple light into and out of the optical waveguide 1420. At the end of the substrate 1430 opposing the input/output end 1410, a third prism 1460, a third lens 1465a, and a fourth lens 1465b are provided to fold the optical path from the first interferometer 1420a to the second 1420b. A traveling-wave electrode structure 1440 including ground electrodes 1442a, 1444a, 1442b, and 1444b and hot electrodes 1446a and 1446b is formed on the substrate 1430. A single input terminal 1450 provides an input for the driving voltages, while a single output terminal 1452 provides an output for the remaining drive signal. A high-pass filter and bias-tee network 1480 is provided between the first 1446a and second 1446b hot electrodes. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light from the laser 1416 is redirected by prism 1418a to lens 1419a and is transmitted through the optical waveguide 1420 to the first interferometer 1420a, where it is split at the first Y-branch, and is transmitted equally along the two isolated paths corresponding to the two interferometer arms. When a time varying voltage is applied to the first part of the electrode structure 1440 via terminal 1450, an electric field is produced that propagates down the first part of the traveling-wave electrode structure 1440, which is constructed to form a microwave waveguide. The electric field at least partially overlaps the two interferometer arms. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1420 to the lens 1465a, prism 1460, and lens 1465b, where it is reflected and transmitted to the second interferometer 1420b. The light input into the second interferometer 1420b is split at the first Y-branch, where it then propagates equally along the two isolated paths corresponding to the two interferometer arms. Simultaneously, the RF drive signal remaining at the end of the first part of the electrode structure 1440 is sent to the second part of the electrode structure 1440 after passing through the high pass filter 1480. When the filtered RF drive signal is applied to the second part of the electrode structure 1440, an electric field is produced that propagates down the electrode structure 1440, which is constructed to form a microwave waveguide. The electric field at least partially overlaps the two interferometer arms. In accordance with the electro-optic effect, the electric field further impresses the synchronized modulated RF data signal onto the amplitude modulated optical signal. The modulated optical signal is transmitted through the lens 1419b, and is redirected by prism 1418b out of the optical modulator 1400.

Of course, the optical digital external modulator shown in FIG. 14 is described as above for exemplary purposes only. Alternatively, the optical modulator 1400 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided.

Figure 15:
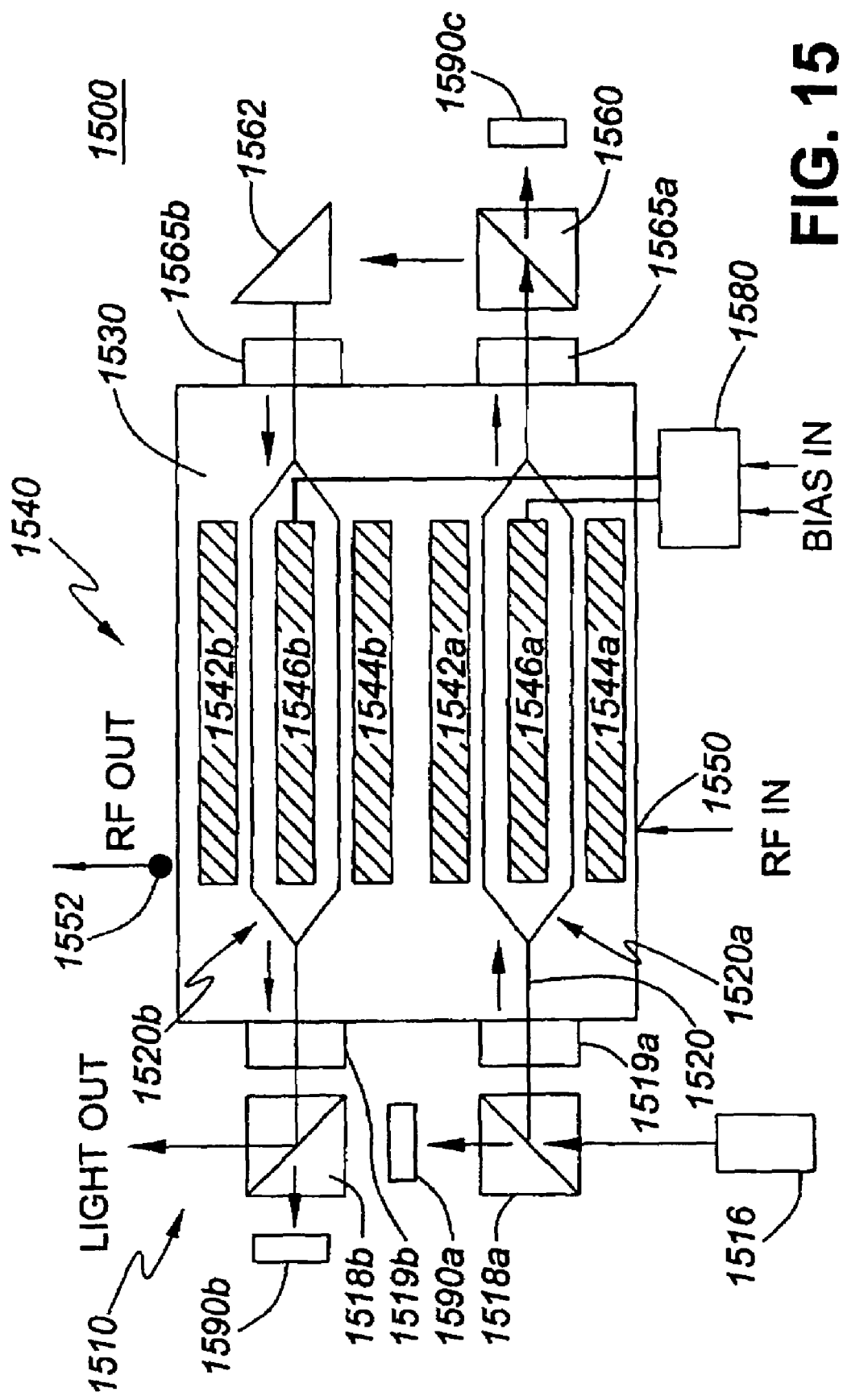
FIG. 15 is a schematic diagram of a dual stage Mach-Zehnder optical modulator formed on a x-cut lithium niobate substrate, integrated with a laser, and including a photodetector, the optical modulator has a series cascaded arrangement and biasing means in accordance with another embodiment of the instant invention.

Referring to FIG. 15, there is shown a schematic diagram of an optical digital external modulator 1500 in accordance with another embodiment of the instant invention that includes an optical waveguide 1520 formed in an x-cut lithium niobate (LiNbO$_3$) substrate 1530. The optical waveguide 1520 includes a first Mach-Zehnder interferometer 1520a and a second Mach-Zehnder interferometer 1520b. Each interferometer includes a first Y-branch, a first interferometer arm, a second interferometer arm, and a second Y-branch. At the input end of the substrate 1510 an optical source, which for exemplary purposes is shown as a laser 1516, provides a continuous beam of light. A first beam-splitter 1518a, first lens 1519a, second beam-splitter 1518b, and second lens 1519b are provided to couple light into and out of the optical waveguide 1520. At the end of the substrate 1530 opposing the input/output end 1510, a third lens 1565a, a third beam-splitter 1560, a prism 1562, and a fourth lens 1565b are provided to fold the optical path from the first interferometer 1520a to the second 1520b. Each of the first 1518a, second 1518b, and third beam-splitters 1560 is designed to tap a predetermined amount light and transmit it to a photo-detector 1590a, 1590b, and 1590c, respectively. A traveling-wave electrode structure 1540 including ground electrodes 1542a, 1544a, 1542b, and 1544b and hot electrodes 1546a and 1546b is formed on the substrate 1530 adjacent the first 1520a and second 1520b interferometers. A single input terminal 1550 provides an input for the driving voltages, while a single output terminal 1552 provides an output for the remaining drive signal. A high-pass filter and bias-tee network 1580 is provided between the first 1546a and second 1546b hot electrodes. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network.

In operation, light from the laser 1516 is transmitted to the first beam-splitter 1518a. The first beam-splitter splits the light into a first sub-beam that is transmitted to the first photo-detector 1590a and a second sub-beam that is transmitted to the first lens 1519a. The second sub-beam of light is then transmitted through the optical waveguide 1520 to the first interferometer 1520a, where it is split at the first Y-branch, and is transmitted equally along the two isolated paths corresponding to the two interferometer arms of the first interferometer 1520a. When a time varying voltage is applied to the first part of the electrode structure 1540 via terminal 1550, an electric field is produced that propagates down the first part of the traveling-wave electrode structure 1540, which is constructed to form a microwave waveguide. The electric field at least partially overlaps the two interferometer arms. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 1520 to the lens 1565a and beam-splitter 1560. The beam-splitter 1560 splits the light into a first sub-beam that is transmitted to the photo-detector 1590c and a second sub-beam that is transmitted to the prism 1562 and lens 1565b. The second sub-beam of light is input into the second interferometer 1520b, where it is split at the first Y-branch and propagates equally along the two isolated paths corresponding to the two interferometer arms of the second interferometer 1520b. Simultaneously, the RF drive signal remaining at the end of the first part of the electrode structure 1540 is sent to the second part of the electrode structure 1540 after passing through the high pass filter 1580. When the filtered RF drive signal is applied to the second part of the electrode structure 1540, an electric field is produced that propagates down the electrode structure 1540, which is constructed to form a microwave waveguide. The electric field at least partially overlaps the two interferometer arms of the second interferometer 1520b. In accordance with the electro-optic effect, the electric field further impresses the synchronized modulated RF data signal onto the amplitude modulated optical signal, which is subsequently transmitted to the second lens 1519b and beam-splitter 1518b. The beam-splitter 1518b splits the light into a first sub-beam that is transmitted to the second photo-detector 1590b and a second sub-beam that is output the optical modulator.

Advantageously, the tapped light is used to provide power monitoring and/or feedback for bias control.

Of course, the optical digital external modulator shown in FIG. 15 is described as above for exemplary purposes only. Alternatively, the optical modulator 1500 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided.

Figure 16:
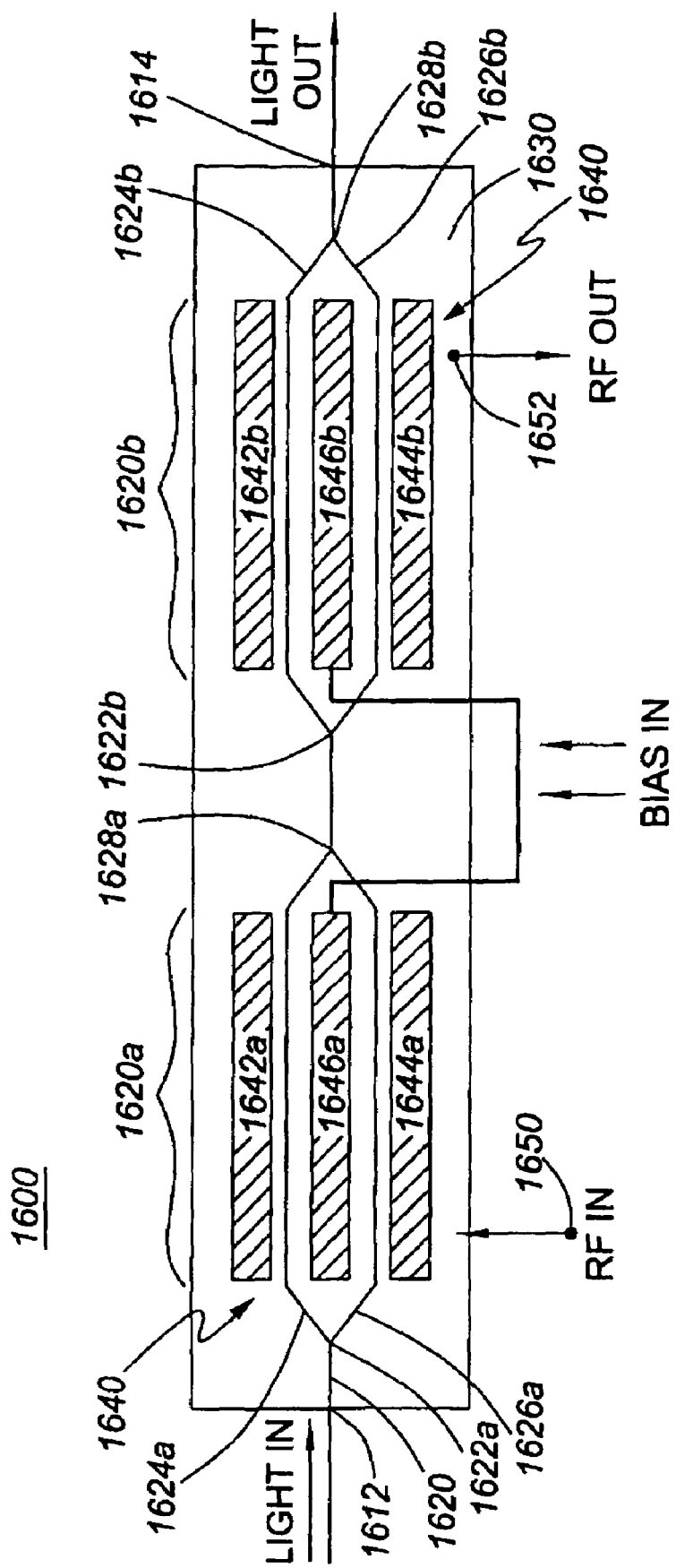
FIG. 16 is a schematic diagram of a dual stage Mach-Zehnder optical modulator formed on an x-cut lithium niobate substrate and having a series cascaded arrangement and biasing means in accordance with one embodiment of the instant invention.

Referring to FIG. 16, there is shown a schematic diagram of an optical digital external modulator 1600 in accordance with an embodiment of the instant invention that includes an optical waveguide 1620 formed in an x-cut lithium niobate (LiNbO$_3$) substrate 1630. The optical waveguide 1620 includes a first Mach-Zehnder interferometer 1620a connected to a second Mach-Zehnder interferometer 1620b in series. The first interferometer 1620a includes a first Y-branch 1622a, a first interferometer arm 1624a, a second interferometer arm 1626a, and a second Y-branch 1628a. The second interferometer 1620b includes a first Y-branch 1622b, a first interferometer arm 1624b, a second interferometer arm 1626b, and a second Y-branch 1628b. The first 1620a and second 1620b interferometers have a cascaded arrangement. A traveling-wave electrode structure 1640 is provided near the optical waveguide 1620 such that the first interferometer arm 1624a is disposed between ground electrode 1642a and hot electrode 1646a, while the second interferometer arm 1626a is disposed between ground electrode 1644a and hot electrode 1646a. Similarly, the first interferometer arm 1624b is disposed between ground electrode 1642b and hot electrode 1646b, while the second interferometer arm 1626b is disposed between ground electrode 1644b and hot electrode 1646b. A single input terminal 1650 provides an input for the RF drive signal that passes through both interferometers, while a single output terminal 1652 provides an output for the remaining RF drive signal. A high-pass filter and bias tee network (not shown) includes a high-pass filter for passing higher frequencies and rejecting lower ones and includes bias-tees for injecting DC bias voltages into the RF circuit without affecting the flow of the RF.

In operation, light is input into the modulator 1600 from the input port 1612 and is output through the output port 1614. More specifically, the light input through the input port 1612 propagates through the optical waveguide 1620 to the first interferometer 1620a, where it is split at the first Y-branch 1622a, and is transmitted equally along the two isolated paths corresponding to the two interferometer arms 1624a, 1626a. When a time varying voltage is applied to the electrode structure 1640 via terminal 1650, an electric field is produced that propagates down the traveling-wave electrode structure 1640, which is constructed to form a microwave waveguide. The electric field at least partially overlaps the two interferometer arms 1624a and 1626a. In accordance with the electro-optic effect, the electric field causes the relative velocity of the light propagating through the two interferometer arms 1624a, 1626a to change, thus creating a phase shift and producing constructive or destructive interference at the second Y-branch 1628a. The constructive and/or destructive interference produces an amplitude modulated optical signal, wherein the modulation corresponds to a modulated RF data signal used to produce the time varying voltage. The amplitude modulated optical signal propagates through the optical waveguide 1620 to the second interferometer 1620b. The light input into the second interferometer 1620b is split at the first Y-branch 1622b, where it then propagates equally along the two isolated paths corresponding to the two interferometer arms 1624b, 1626b. Simultaneously, the RF drive signal remaining at the end of the first interferometer 1620a passes through a high-pass filter and bias-tee network (not shown) before being sent to the second interferometer 1620b, such that the corresponding electric field also at least partially overlaps the two interferometer arms 1624b and 1626b. In accordance with the electro-optic effect, the electric field further impresses the synchronized modulated RF data signal onto the amplitude modulated optical signal, which is subsequently output through the output port 1614.

An advantage of the optical modulator shown in FIG. 16 is that it has a cascaded arrangement where the optical modulator 1600 is broken into two interferometers, namely, a first interferometer 1620a and a second interferometer 1620b. This cascaded arrangement allows the optical modulator 1600 to be optimized for digital signal transmission. For example, as with the optical modulator 500 shown in FIG. 5a, driving the optical modulator 1600 with an RF data signal and selecting the appropriate bias points provides an optical external digital modulator with improved performance for digital signal transmission.

Figure 17A:
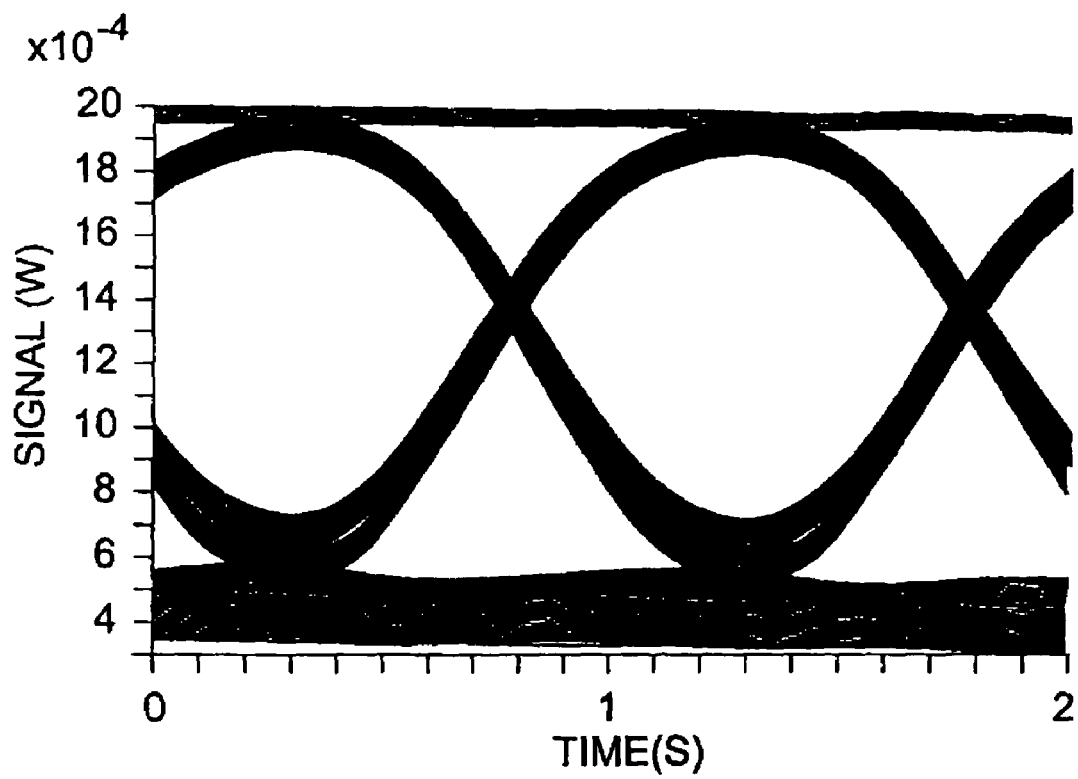
FIG. 17a is a simulated eye diagram of an optical signal after passing through the first stage of the optical modulator shown in FIG. 17, when both interferometers are biased 25° from quadrature.
Figure 17B:
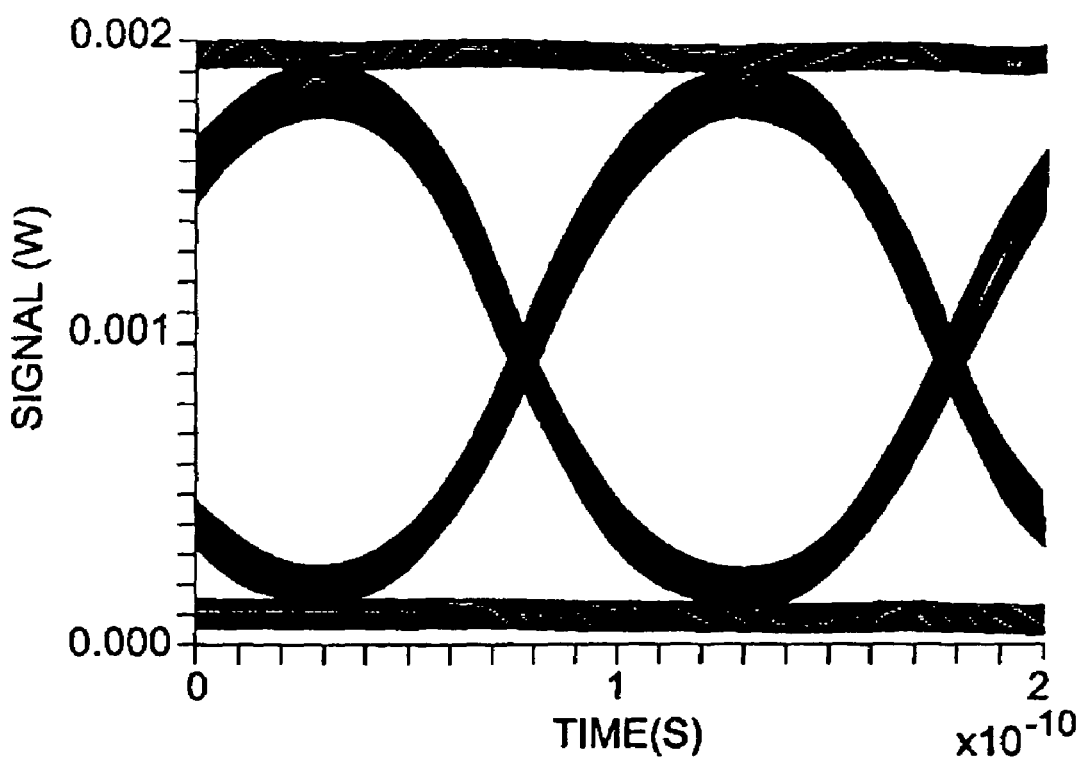
FIG. 17b is a simulated eye diagram of an optical signal after passing through both the first and second stages of the optical modulator shown in FIG. 17, when both interferometers are biased 25° from quadrature.

Referring to FIGS. 17a and 17b, there is shown simulated eye diagrams after each stage of the optical modulator 1600, when both interferometers are biased at 65°. More specifically, FIG. 17a shows a digital eye diagram after the optical signal has passed through the first interferometer 1620a, while FIG. 17b shows a digital eye diagram after the optical signal has passed through both the first interferometer 1620a and the second interferometer 1620b. Notably, providing a bias point 25° from quadrature for the first stage of the optical modulator results in an eye-crossing level that is above the 50% level. However, after passing through the second stage of the optical modulator, the symmetry to the eye diagram is restored. Each simulation includes velocity matching and a bias point of 65° for each interferometer, and neglects the effects of RF electrode loss. The electrical signal bandwidth is limited to 5 GHz.

Of course, the optical digital external modulator shown in FIG. 16 is described as above for exemplary purposes only. Alternatively, the optical modulator 1600 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode. Optionally, a polarizer or polarizing optics (not shown) are provided. Further optionally, a DOC (not shown) is mounted on the substrate for tapping light to provide power monitoring and/or feedback for bias control. To reduce the length of the cascaded modulator shown in FIG. 16, an electro-absorption (EA) modulator (not shown) is optionally provided in each of the four interferometer arms.

In each of the embodiments shown in FIGS. 5*a* and 6–16, the optical modulator is typically biased for a very slight insertion loss at the on-state (e.g., less than 1 dB). Preferably, each optical modulator is biased to produce a digital eye diagram that has an eye crossing level at approximately 50% transmission. Since each optical modulator includes one or more interferometers, this means that each interferometer in the cascade will be biased off, and in particular above, quadrature.

As discussed with reference to FIG. 5*a*, one embodiment involves biasing both interferometers of a two-stage interferometer 25° from quadrature, or at 65°, where 90° is the phase at quadrature and 0° is the phase for the interferometers being full-on. According to another embodiment, each of the two interferometers of a two-stage optical modulator is operated at a different bias point (e.g., the first interferometer 20° from quadrature and the second interferometer 30° from quadrature, or alternatively, the first interferometer 35° from quadrature and the second interferometer 15° from quadrature). According to yet another embodiment, each of the four interferometers of a four-stage optical modulator is biased at 47°. According to yet another embodiment, the first, second, third and fourth interferometers of a four-stage optical modulator are biased at 41.5°, 46.5°, 47.5°, and 51.5°, respectively. Other appropriate bias points can be calculated and/or selected by those skilled in the art.

In each instance, the net intensity after passing through the cascade of interferometers is approximately at the half-power point, when no RF drive signal is applied. In a conventional optical modulator, this corresponds to the single interferometer being set to the 50% transmission point (i.e., the quadrature point). In a cascaded modulator, the net intensity becomes the product of the transmission of each interferometer in the cascade. Thus, depending if there are two, three, or four interferometers, the transmission of each interferometer will be about 71%, 80%, and 84%, respectively.

Optimizing an optical modulator by selecting the bias points of each interferometer in the cascade so that the digital eye diagram has an eye-crossing about the half power level advantageously provides a linearization that improves transmission performance for digital data signals over an optical fiber (e.g., where the digital data signal is not simply a train of equally spaced identical pulses). For example, transmission performance would be affected when transitions between the on and off states of a two-level digital data signal are distorted by dispersion of the optical fiber. The linearization discussed above minimizes the degradation of the digital optical signal due to optical fiber dispersion.

Notably, the advantages of providing linearity for optical digital external modulators, and in particular, for optical digital external modulators used for two-level digital data signals, has not been recognized in the prior art. Presumably, this is because one skilled in the art might have expected greater signal distortion when driving a cascaded modulator from full-on to full-off. Furthermore, the insertion loss with no digital signal applied would be 3 dB higher than for a single modulator, assuming both interferometers were biased at the conventional quadrature.

In each of the above cascaded optical modulator embodiments, the traditional Mach-Zehnder interferometer is optionally replaced with another interferometer. For example, according to one embodiment the cascaded interferometers are nested Mach-Zehnder interferometers.

Figure 18:
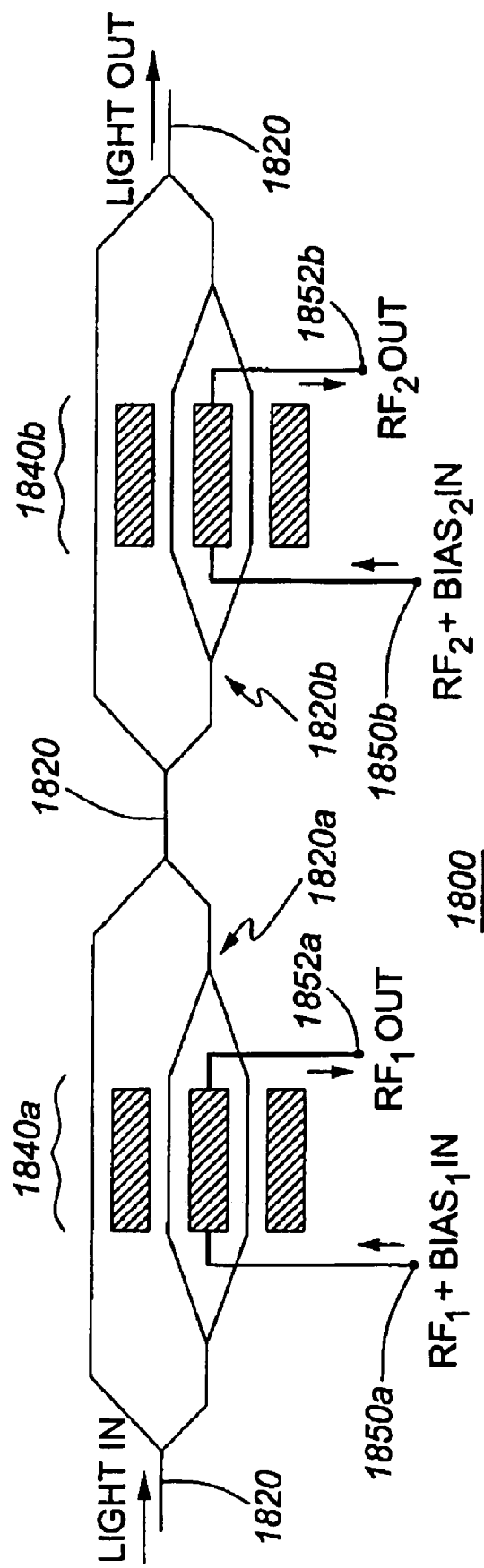
FIG. 18 is a schematic diagram of a dual stage nested Mach-Zehnder optical modulator formed on an x-cut lithium niobate substrate, the optical modulator has a series cascaded arrangement and biasing means in accordance with one embodiment of the instant invention.

Referring to FIG. 18, there is shown a schematic diagram of an optical digital external modulator 1800 in accordance with an embodiment of the instant invention. Electrode/waveguide orientation corresponding to x-cut lithium niobate is shown. The optical modulator 1800 includes an optical waveguide 1820 forming a first Mach-Zehnder interferometer 1820*a* that is cascaded with a second Mach-Zehnder interferometer 1820*b*. Each Mach-Zehnder interferometer 1820*a* and 1820*b* is a nested Mach-Zehnder having three arms. A traveling-wave electrode structure 1840*a*/1840*b* is coupled to the first 1820*a* and second 1820*b* interferometers. The traveling electrode structure includes a first traveling-wave electrode 1840*a* for modulating two of the three optical paths of the first interferometer 1820*a* and a second traveling-wave electrode 1840*b* for modulating two of the three optical paths of the second interferometer 1820*b*. Each traveling electrode 1840*a* and 1840*b* includes two ground electrodes and a central hot electrode. A single input terminal 1850*a* provides an input for the RF drive signal for the first nested interferometer 1820*a*, while a single output terminal 1852*a* provides an output for the remaining RF drive signal from the first nested interferometer. Similarly, a single input terminal 1850*b* provides an input for the RF drive signal for the second nested interferometer 1820*b*, while a single output terminal 1852*b* provides an output for the remaining RF drive signal from the second nested interferometer. Nominally, all y-junctions divide and combine optical power equally. For example, the third upper arm of each nested interferometer nominally carries twice as much optical power as either of the lower arms that are modulated.

In operation, light input into the modulator 1800 propagates through the optical waveguide 1820 to the first interferometer 1820*a*. When a time varying voltage is applied to the electrode 1840*a* via terminal 1850*a*, an electric field is produced that modulates the optical path of two arms of the three arm interferometer 1820*a* and produces an amplitude modulated optical signal. The amplitude modulated optical signal propagates through the optical waveguide 1820 to the second interferometer 1820*b*. When a time varying voltage is applied to the electrode 1840*b* via terminal 1850*b*, another electric field is produced that modulates the optical path of two arms of the three arm interferometer 1820*b*. The modulation from the second stage strengthens the modulation from the first stage, to produce a relatively strong modulated optical signal. Preferably, each interferometer in the optical modulator 1800 is driven with a time varying voltage that corresponds to an RF data signal and is operated at a bias point selected to provide a symmetric digital eye diagram.

Of course, the optical digital external modulator shown in FIG. 18 is described as above for exemplary purposes only. Alternatively, the optical modulator 1800 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), and/or to replace the traditional traveling wave electrode with another electrode structure such as a lumped or dual drive electrode. Optionally, a polarizer or polarizing optics (not shown) are provided. Further optionally, a DOC (not shown) is mounted on the substrate for tapping light to provide power monitoring and/or feedback for bias control. Further optionally, the two RF drive signals are provided by a single RF source, which is split into two sub-signals.

In the optical modulator 1800 shown in FIG. 18, each stage of the two-stage modulator is driven in parallel. It is also possible for the optical modulator 1800 to be driven in series as described with respect to FIGS. 5*a* and 6–16. Since a single RF drive signal is applied to each stage of the multi-stage optical modulator 1800, in series, drive power is advantageously conserved.

For example, according to one embodiment, the RF signal from terminal 1852*a* passes through a high-pass filter and bias-tee network (not shown) before being sent to terminal 1850*b*. Preferably, the high-pass filter and bias tee network includes a high-pass filter for passing higher frequencies and rejecting lower ones and includes bias-tees for injecting DC bias voltages into the RF circuit without affecting the flow of the RF.

Referring again to FIGS. 3 and 4, embodiments of an optical digital external modulator 400 based on a single folded interferometer are shown. As discussed above, advantages associated with these embodiments include a compact design, light entering and exiting on the same side of the device and through two separate optical fibers, and quasi-velocity matching between the optical signal and the RF signal. The embodiment shown in FIG. 4 has a further advantage over the embodiment shown in FIG. 3, in that very little optical power reflected by the reflector returns along the incident optical path. This high isolation is provided by the relatively large incident angle on the reflector. Notably, even small amount of optical power traveling in the opposite direction of to the incoming light will travel back to the optical source and disrupt its operation. Furthermore, if there are multiple optical folds, reflections between two optical turns creates an etalon, which disrupts proper modulator operation.

Figure 19:
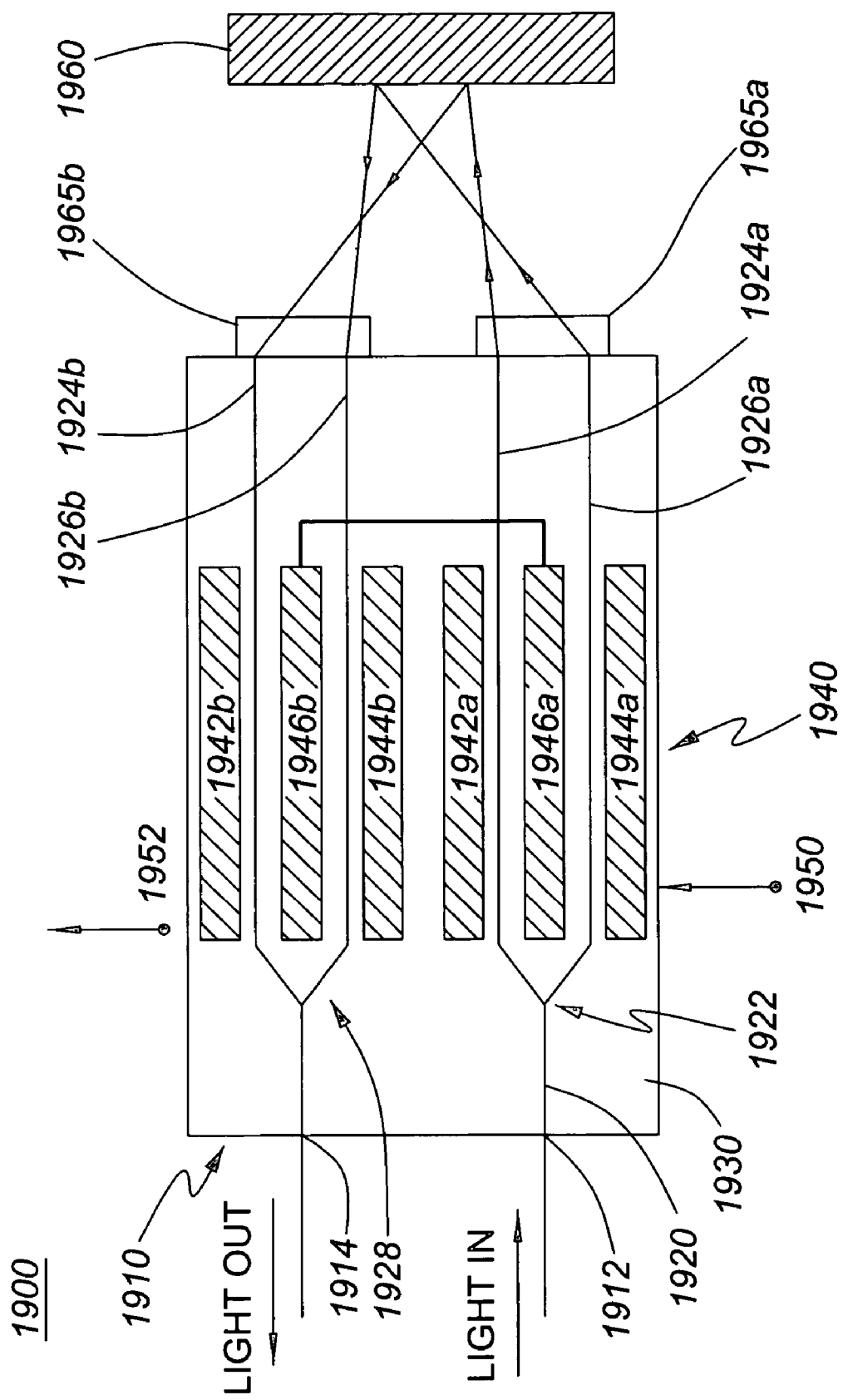
FIG. 19 is a schematic diagram of a Mach-Zehnder optical modulator formed on an x-cut lithium niobate substrate and including a reflective mirror and lens array.

Referring to FIG. 19, there is shown a schematic diagram of another embodiment of an optical digital external modulator having a relatively large incident angle on a reflector. The optical modulator 1900 includes an optical waveguide 1920 formed in an x-cut lithium niobate (LiNbO$_3$) substrate 1930. The optical waveguide 1920 includes a first Y-branch 1922, a first interferometer arm 1924*a*/1924*b*, a second interferometer arm 1926*a*/1926*b*, and a second Y-branch 1928, which collectively form an integrated Mach-Zehnder interferometer. At the end of the substrate 1930 opposing the input/output end 1910, a first lens array 1965*a*, a second lens array 1956*b*, and a mirror 1960 are provided for reflecting light between interferometer arms sections. Each micro-lens in the lens arrays 1965*a*/1965*b* is positioned (e.g., off-axis) so as to direct the collimated beams of light as shown. A traveling-wave electrode structure 1940 is provided near the optical waveguide 1920 such that the first part of the first interferometer arm 1924*a* is disposed between ground electrode 1942*a* and hot electrode 1946*a*, while the first part of the second interferometer arm 1926*a* is disposed between ground electrode 1944*a* and hot electrode 1946*a*. Similarly, the second part of the first interferometer arm 1924*b* is disposed between ground electrode 1942*b* and hot electrode 1946*b*, while the second part of the second interferometer arm 1926*b* is disposed between ground electrode 1944*b* and hot electrode 1946*b*. A single input terminal 1950 provides an input for the driving and bias voltages, while a single output terminal 1952 provides an output for the remaining drive signal. Alternatively, the bias voltage is injected via the output terminal 1952.

In operation, light is input into the modulator 1900 through the input port 1912 and is output through the output port 1914. More specifically, the light input through the input port propagates through the optical waveguide 1920 until it is split at the first Y-branch 1922, where it then propagates equally along the two isolated paths corresponding to the two interferometer arms 1924*a*, 1926*a*. When the light propagating through each arm of the interferometer 1924*a* and 1926*a* reaches the first lens array 1965*a* it is collimated and directed to mirror 1960. The mirror reflects the light back through the second lens array 1965*b* where it is focused on the corresponding second parts of the interferometer arms 1926*b* and 1924*b*, respectively. When a time varying drive voltage, corresponding to a RF data modulation signal, is applied to the traveling-wave electrode structure 1940 the electro-optic effect causes the relative velocity of the light propagating through the two interferometer arms 1924*a/b* and 1926*a/b* to change, thus creating a phase shift and producing constructive or destructive interference at the second Y-branch 1928. The constructive and/or destructive interference produces an output amplitude modulated optical signal, where the modulation corresponds to the modulation of the RF data signal.

Advantageously, this embodiment also provides quasi-velocity matching between the optical signal and the RF signal. More specifically, quasi-velocity matching is provided by introducing an optical time delay that allows the optical modulator to be compatible with the more efficient electrode structures that allow the RF signal to travel much slower than the light. The exact time delay is dependent on the amount of free-space at the end of the substrate.

Of course, the optical digital external modulator shown in FIG. 19 is described as above for exemplary purposes only. Alternatively, the optical modulator 1900 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a z- or y-cut electro-optic substrate, to replace the traditional traveling wave electrode with another electrode structure such as a lumped or dual drive electrode, to use refractive or diffractive lenses, and/or to replace the mirror with another reflective element. Further optionally, a polarizer (not shown) is provided between the substrate and the lenses and/or near the input/output ports.

Figure 20:
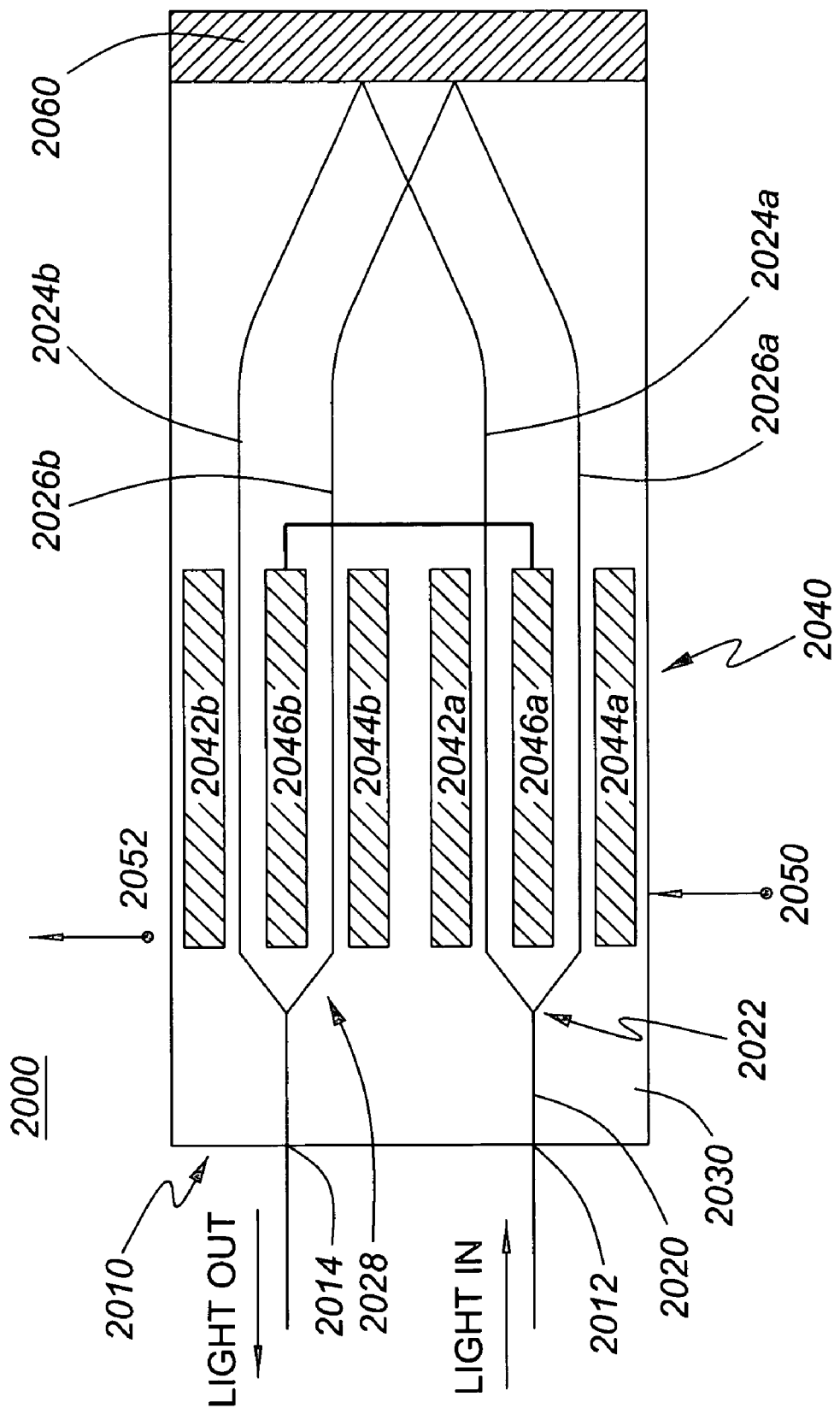
FIG. 20 is a schematic diagram of a Mach-Zehnder optical modulator formed on an x-cut lithium niobate substrate and including a reflective mirror.

Referring to FIG. 20, there is shown a schematic diagram of yet another embodiment of an optical digital external modulator having a relatively large incident angle on a reflector. The optical modulator 2000 includes an optical waveguide 2020 formed in an x-cut lithium niobate (LiNbO$_3$) substrate 2030. The optical waveguide 2020 includes a first Y-branch 2022, a first interferometer arm 2024*a*/2024*b*, a second interferometer arm 2026*a*/2026*b*, and a second Y-branch 2028, which collectively form an integrated Mach-Zehnder interferometer. At the end of the substrate 2030 opposing the input/output end 2010, a mirror 2060 is provided for reflecting light between interferometer arm sections (i.e., from 2024*a* to 2024*b* and from 2026*a* to 2026*b*). Notably, both interferometer arms 2024*a*/2026*a* approach the mirror 2060 with a continuously varying angle, while both interferometer arms 2024*b*/2026*b* are diverted away from the mirror with a continuously varying angle. A traveling-wave electrode structure 2040 is provided near the optical waveguide 2020 such that the first part of the first interferometer arm 2024a is disposed between ground electrode 2042a and hot electrode 2046a, while the first part of the second interferometer arm 2026a is disposed between ground electrode 2044a and hot electrode 2046a. Similarly, the second part of the first interferometer arm 2024b is disposed between ground electrode 2042b and hot electrode 2046b, while the second part of the second interferometer arm 2026b is disposed between ground electrode 2044b and hot electrode 2046b. A single input terminal 2050 provides an input for the driving and bias voltages, while a single output terminal 2052 provides an output for the remaining drive signal.

In operation, light is input into the modulator 2000 through the input port 2012 and is output through the output port 2014. More specifically, the light input through the input port propagates through the optical waveguide 2020 until it is split at the first Y-branch 2022, where it then propagates equally along the two isolated paths corresponding to the two interferometer arms 2024a, 2026a. When the light propagating through each arm of the interferometer 2024a and 2026a reaches the mirror 2060, it is reflected back along a different optical path corresponding to the second parts of the interferometer arms 2024b and 2026b, respectively. When a time varying drive voltage, corresponding to a RF data modulation signal, is applied to the traveling-wave electrode structure 2040 the electro-optic effect causes the relative velocity of the light propagating through the two interferometer arms 2024a/b and 2026a/b to change, thus creating a phase shift and producing constructive or destructive interference at the second Y-branch 2028. The constructive and/or destructive interference produces an output amplitude modulated optical signal, wherein the modulation corresponds to the modulation of the RF data signal.

One advantage of this embodiment is that it allows quasi-velocity matching between the optical signal and the RF signal. More specifically, quasi-velocity matching is provided by selecting the length of the optical waveguide(s) between the straight sections of the interferometer arms 2024a/2026a and 2024b/2026b to introduce an optical delay so that the optical modulator is compatible with the more efficient electrode structures that allow the RF signal to travel much slower than the light.

A second advantage of this embodiment is that the directional turn in the substrate is provided solely by the mirror, thus making this design both simple and suitable for high-speed modulator applications.

Of course, the optical digital external modulator shown in FIG. 20 is described as above for exemplary purposes only. Alternatively, the optical modulator 2000 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a z- or y-cut electro-optic substrate, to replace the traditional traveling wave electrode with another electrode structure such as a lumped or dual drive electrode, and/or to replace the mirror with another reflective element, such as a reflective coating deposited on the edge of the substrate. Optionally, a polarizer (not shown) is provided near the input/output ports.

Figure 21:
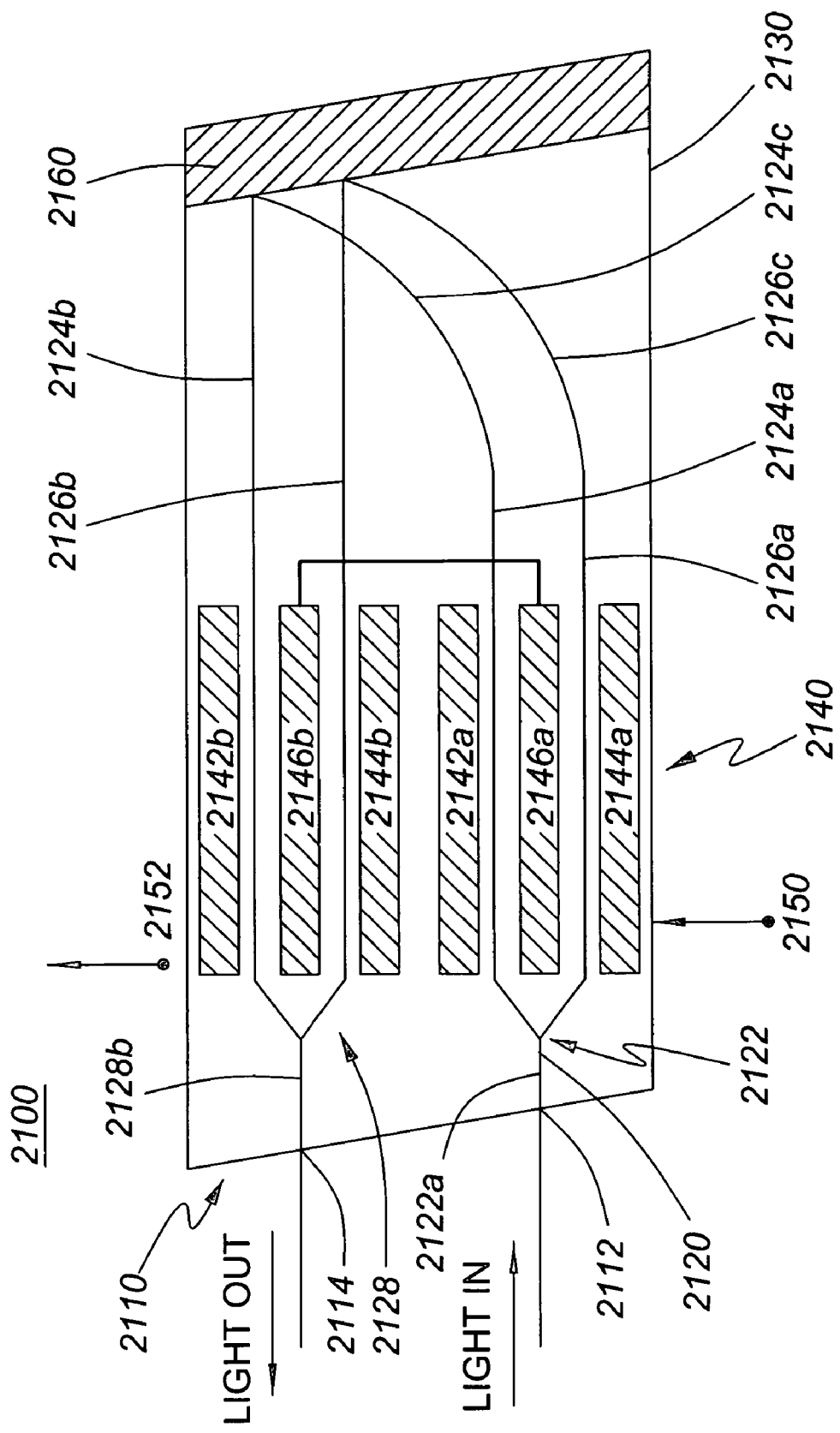
FIG. 21 is a schematic diagram of a Mach-Zehnder optical modulator formed on an x-cut lithium niobate substrate and including a reflective mirror and angled endfaces.

Referring to FIG. 21, there is shown a schematic diagram of yet another embodiment of an optical digital external modulator having a relatively large incident angle on a reflector. The optical modulator 2100 includes an optical waveguide 2120 formed in an x-cut lithium niobate (LiNbO$_3$) substrate 2130. The optical waveguide 2120 includes a first Y-branch 2122, a first interferometer arm 2124a/2124b, a second interferometer arm 2126a/2126b, and a second Y-branch 2128, which collectively form an integrated Mach-Zehnder interferometer. At the end of the substrate 2130 opposing the input/output end 2110, a mirror or reflective surface 2160 is provided for reflecting light within the different parts of the interferometer arms (i.e., between 2124a and 2124b and between 2126a and 2126b). The parts of the interferometer arms 2124a/2126a that approach the mirror 2060 from the optical input have a waveguide bend 2124c/2126c, while the parts of the interferometer arms 2024b/2026b that are diverted away from the mirror are straight (i.e., without a bend or continuously varying angle). The mirror 2160 is coupled to the substrate so as to form an angle (i.e., that is other than 90°) to the primary direction of optical propagation. More specifically, the mirror is coupled to an angled endface of the substrate 2130. The primary direction of optical propagation is defined by the direction of the waveguides that couple optical power to and from input/output optical fibers (not shown). For example, in this embodiment the input 2122a and output 2128b optical waveguide sections couple light into and out of the device and their optical axes define the primary direction of optical propagation. A traveling-wave electrode structure 2140 is provided near the optical waveguide 2120 such that the first part of the first interferometer arm 2124a is disposed between ground electrode 2142a and hot electrode 2146a, while the first part of the second interferometer arm 2126a is disposed between ground electrode 2144a and hot electrode 2146a. Similarly, the second part of the first interferometer arm 2124b is disposed between ground electrode 2142b and hot electrode 2146b, while the second part of the second interferometer arm 2126b is disposed between ground electrode 2144b and hot electrode 2146b. A single input terminal 2150 provides an input for the driving and bias voltages, while a single output terminal 2152 provides an output for the remaining drive signal.

In operation, light is input into the modulator 2100 through the input port 2112 and is output through the output port 2114. More specifically, the light input through the input port propagates through the optical waveguide 2120 until it is split at the first Y-branch 2122, where it then propagates equally along the two isolated paths corresponding to the two interferometer arms 2124a, 2126a. When the light propagating through each arm of the interferometer 2124a and 2126a reaches the mirror 2160, it is reflected back along a different optical path corresponding to the second parts of the interferometer arms 2124b and 2126b, respectively. When a time varying drive voltage, corresponding to a RF data modulation signal, is applied to the traveling-wave electrode structure 2140 the electro-optic effect causes the relative velocity of the light propagating through the two interferometer arms 2124a/b and 2126a/b to change, thus creating a phase shift and producing constructive or destructive interference at the second Y-branch 2128. The constructive and/or destructive interference produces an output amplitude modulated optical signal, where the modulation corresponds to the modulation of the RF data signal.

One advantage provided by this embodiment is that it allows quasi-velocity matching between the optical signal and the RF signal. More specifically, quasi-velocity matching is provided by selecting the length of the optical waveguide(s) between the active sections of interferometer arms 2124a/2126a and 2124b/2126b to introduce an optical time delay so that the optical modulator is compatible with the more efficient electrode structures that allow the RF signal to travel much slower than the light.

A second advantage provided by this embodiment is that the directional turn in the substrate is effected solely by the mirror, thus making this design both simple and suitable for high-speed modulator applications.

A third advantage provided by this embodiment is that it uses angled endfaces. The use of angled endfaces on the substrate obviates the need for anti-reflection (AR) coatings at locations where the waveguides launch light into or receive light from optical fibres. This is particularly beneficial for multi-pass modulator configurations where the input and/or output waveguides are on the same side of the substrate as the high-reflection (HR) coating used to form the mirror (e.g., providing AR and HR coatings on different locations of the same endface increases manufacturing cost and complexity). Notably, the symmetric waveguide arrangement illustrated in FIG. 20 is not compatible with the use of angled endfaces, but instead relies upon the use of endfaces that are 90° with respect to the primary direction of optical propagation.

Figure 22:
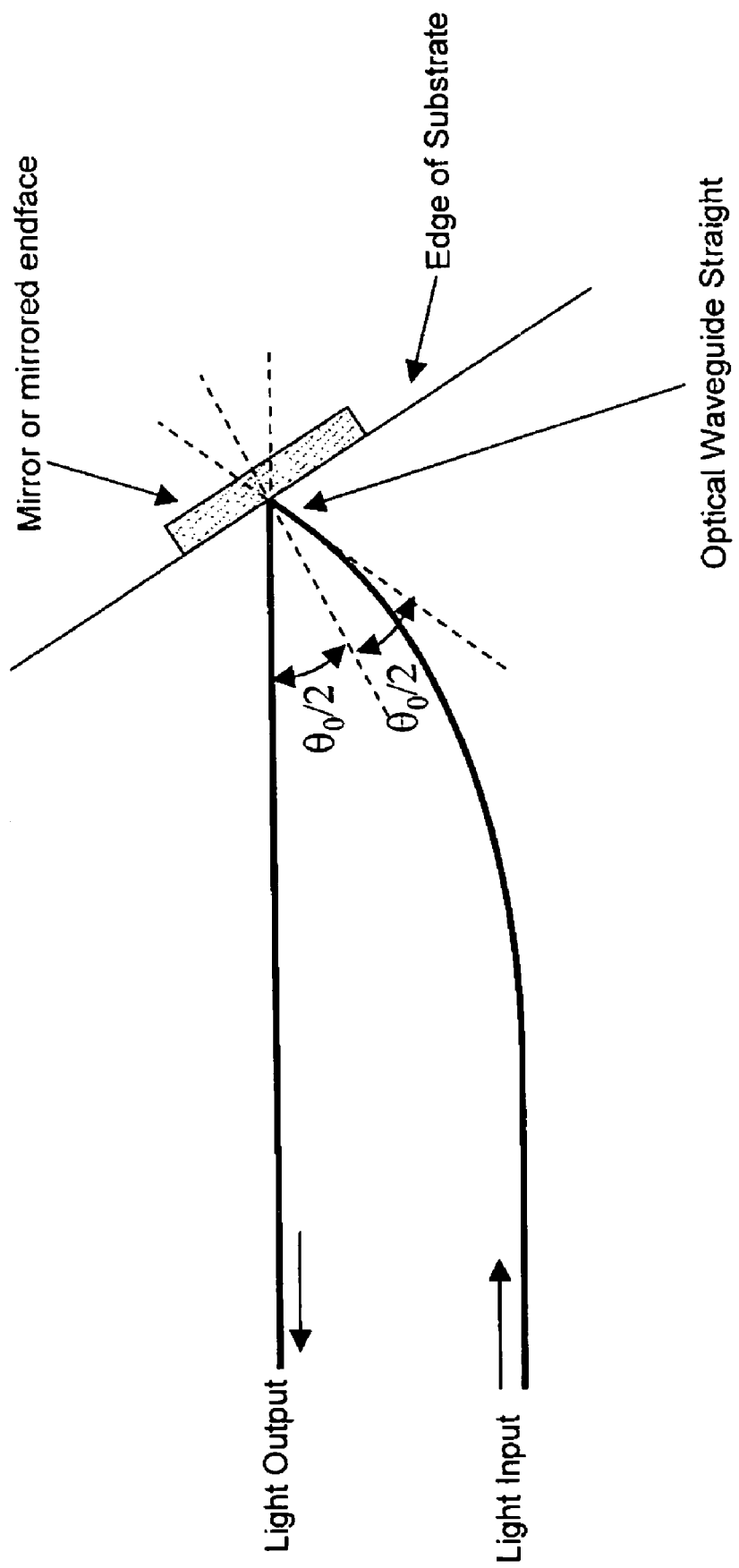
FIG. 22 is a schematic diagram of a folded waveguide and an angled endface.
Figure 23:
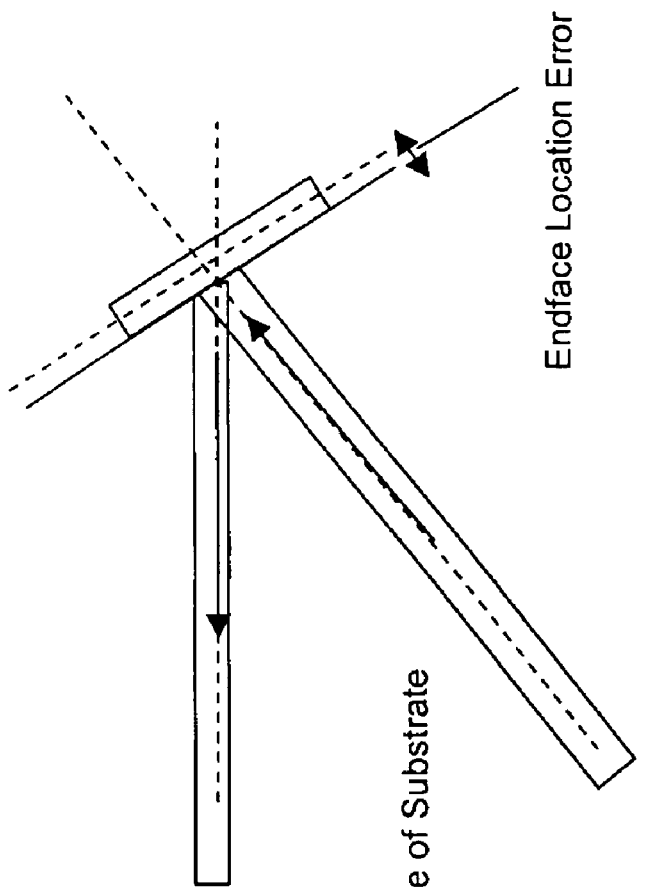
FIG. 23A is schematic diagram showing straight waveguides at an endface with no polishing errors.
FIG. 23B is schematic diagram showing straight waveguides at an endface with polishing errors.
Figure 23:
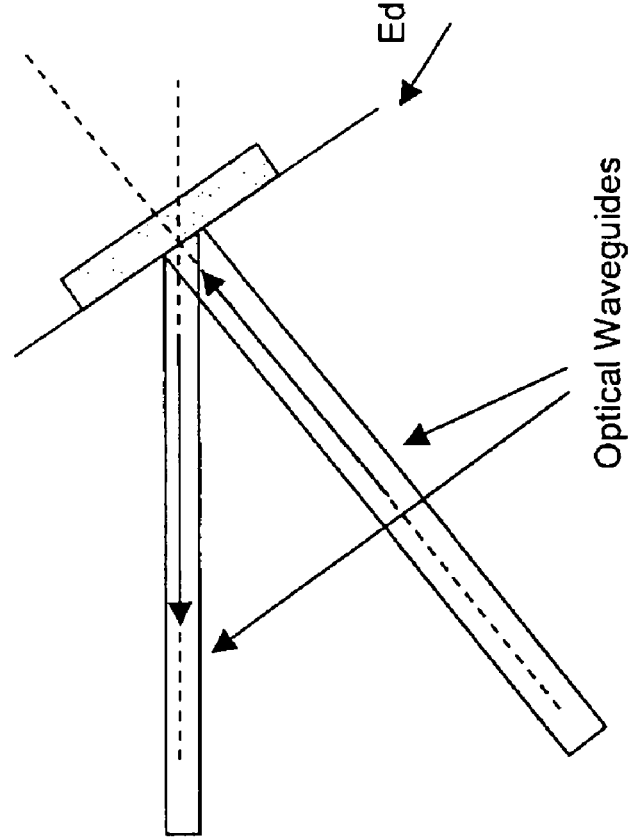
Figure 24B:
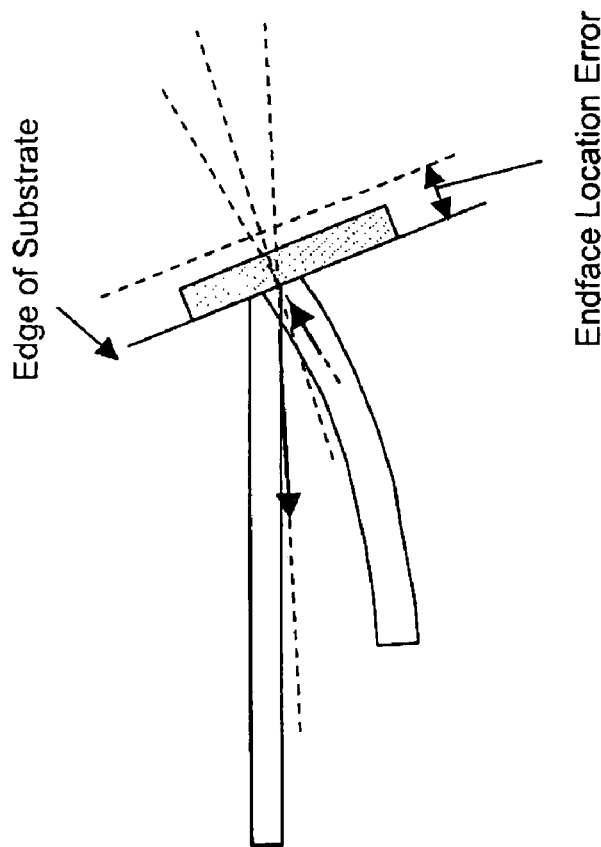
FIG. 24B is a schematic diagram showing a bent waveguide at an endface with polishing errors.
Figure 24A:
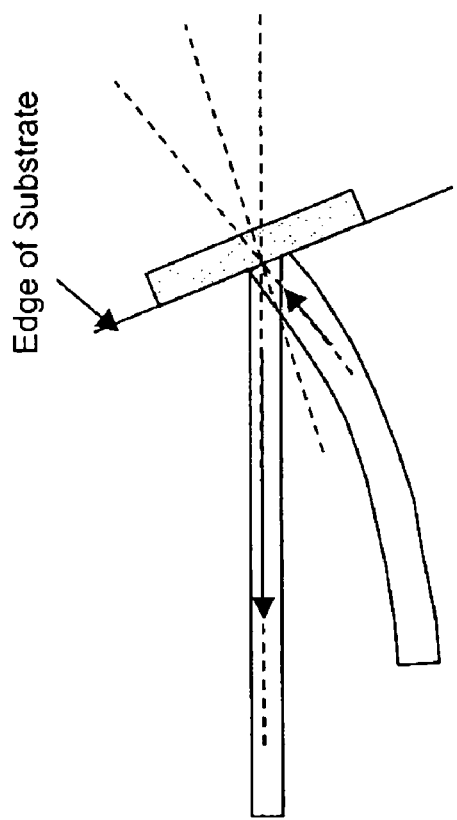
FIG. 24A is a schematic diagram showing a bent waveguide at an endface with no polishing errors.

A fourth advantage provided by this embodiment is that the waveguides in the optical fold region are straight. More specifically, while the parts of the interferometer arms 2124a/2126a that approach the mirror 2060 from the optical input have a waveguide bend 2124c/2126c, the waveguides are actually straight near the mirror 2160. This is shown more clearly in the simplified diagram illustrated in FIG. 22, where the angle $\theta_0$ is referred to as the branching angle. The use of straight waveguides prevents the optical propagation directions coming into and leaving the mirror 2160 from changing direction due to polishing errors, and thus reduces the loss of optical signal at the optical fold. For example, consider the schematic examples illustrated in FIGS. 23A, 23B, 24A, and 24B. In FIGS. 23A and 23B, over-polishing a substrate having two straight waveguides creates a lateral offset in the optical propagation direction (i.e., the propagation direction shifts but the angle does not change). In FIGS. 24A and 24B, over polishing a substrate having a bend near the optical fold creates both a lateral offset and a direction change. The latter results in the optical signal traveling in a direction that is not collinear with the outgoing waveguide and thus is a greater source of optical loss.

Of course, the optical digital external modulator shown in FIG. 21 is described as above for exemplary purposes only. Alternatively, the optical modulator 2100 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a z- or y-cut electro-optic substrate, to replace the traditional traveling wave electrode with another electrode structure such as a lumped or dual drive electrode, and/or to replace the mirror with another reflective element. Further optionally, a polarizer (not shown) is provided near the input/output ports.

Figure 25:
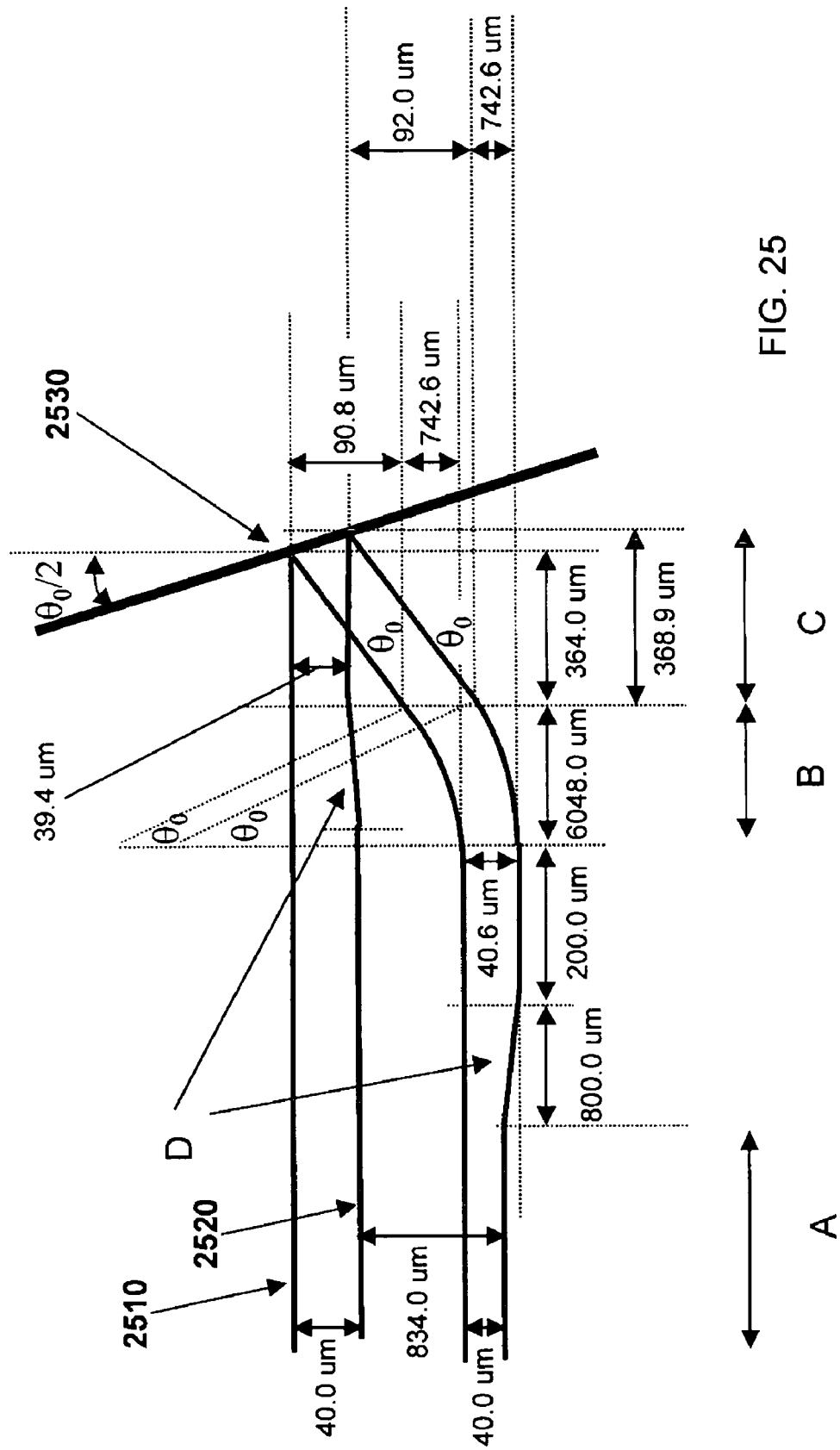
FIG. 25 is a schematic diagram showing a specific example of the optical fold region in a Mach-Zehnder optical modulator having a reflector on an angled endface.
Figure 26:
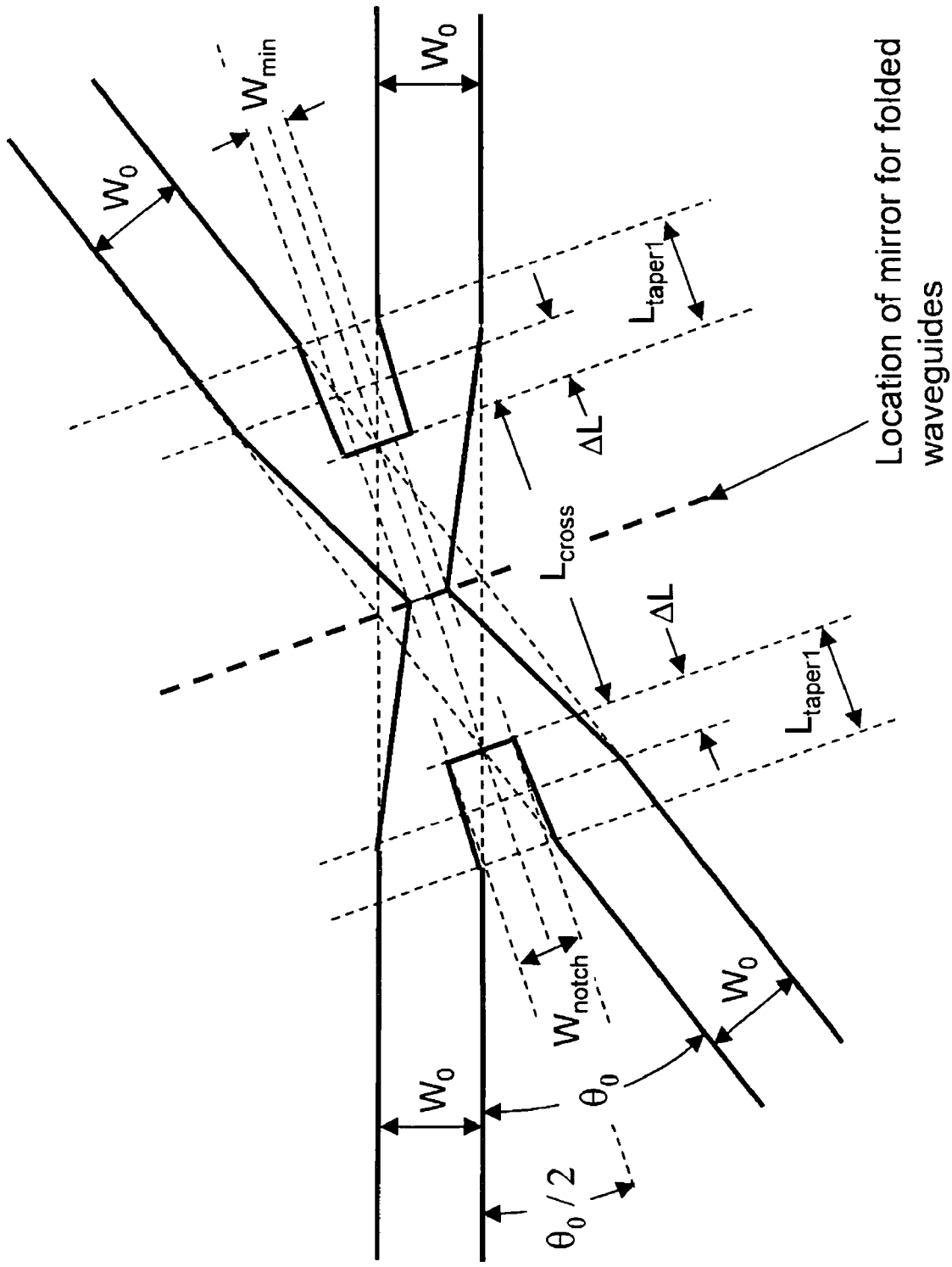
FIG. 26 is a schematic diagram showing a design for reducing optical loss in crossing waveguides.

Referring to FIG. 25, there is shown an example of two waveguides that have been optimized to reduce optical signal loss and that would be suitable for use in the optical modulator shown in FIG. 21. The waveguides 2510 and 2520 have two straight and parallel sections. The first straight and parallel section (A) and the second straight and parallel section (C) are coupled via a bend section (B). Each waveguide in the bend section (B) is made using a circular arc. The height and length of the bend section is the same in each of the waveguides and the waveguide width is constant around the bends. The waveguides 2510 and 2520 also include additional bend sections (D) which increase the distance between waveguides near the optical fold and/or to maintain the distance between waveguides in the straight and parallel section (A). The bends in the additional bend section(s) (D) are fabricated to be either gradual or abrupt. Notably, the waveguides 2510 and 2520 are shown to cross over each other in the straight and parallel section (C) near the reflector 2530. Since each waveguide is fabricated to cross over the other, they advantageously both exhibit the same optical loss. Optionally, the waveguides 2510 and 2520 are fabricated to reduce optical loss in the cross-over region. For example, the waveguides are optionally designed to be sculpted at the cross-over point. Furthermore, since the straight waveguides at the optical fold are equivalent to the crossing waveguides, this region is also optionally fabricated to be sculpted. An example of waveguide sculpting for reducing optical loss at cross-over points is shown in FIG. 26. The sculpting includes narrowing the waveguides at the intersection and providing a notch. FIG. 26 also shows how the straight waveguides at the optical fold are equivalent to the cross-over by showing a plane of symmetry that corresponds to the location of the mirror. Some examples of suitable values for the dimensions are $W_o$=5–7 μm, $W_{notch}$=4 μm, $W_{min}$=3 μm, $L_{taper}$=30 μm, $\Delta L$=0, and $\theta_o$=14 degrees, where $L_{cross}=W_o/\tan(\theta_o/2)$=45.6 μm. Notably, fabricating the modulator such that $\theta_o$ is greater than 10 degrees significantly reduces back-reflection at fiber-chip interfaces.

Figure 27:
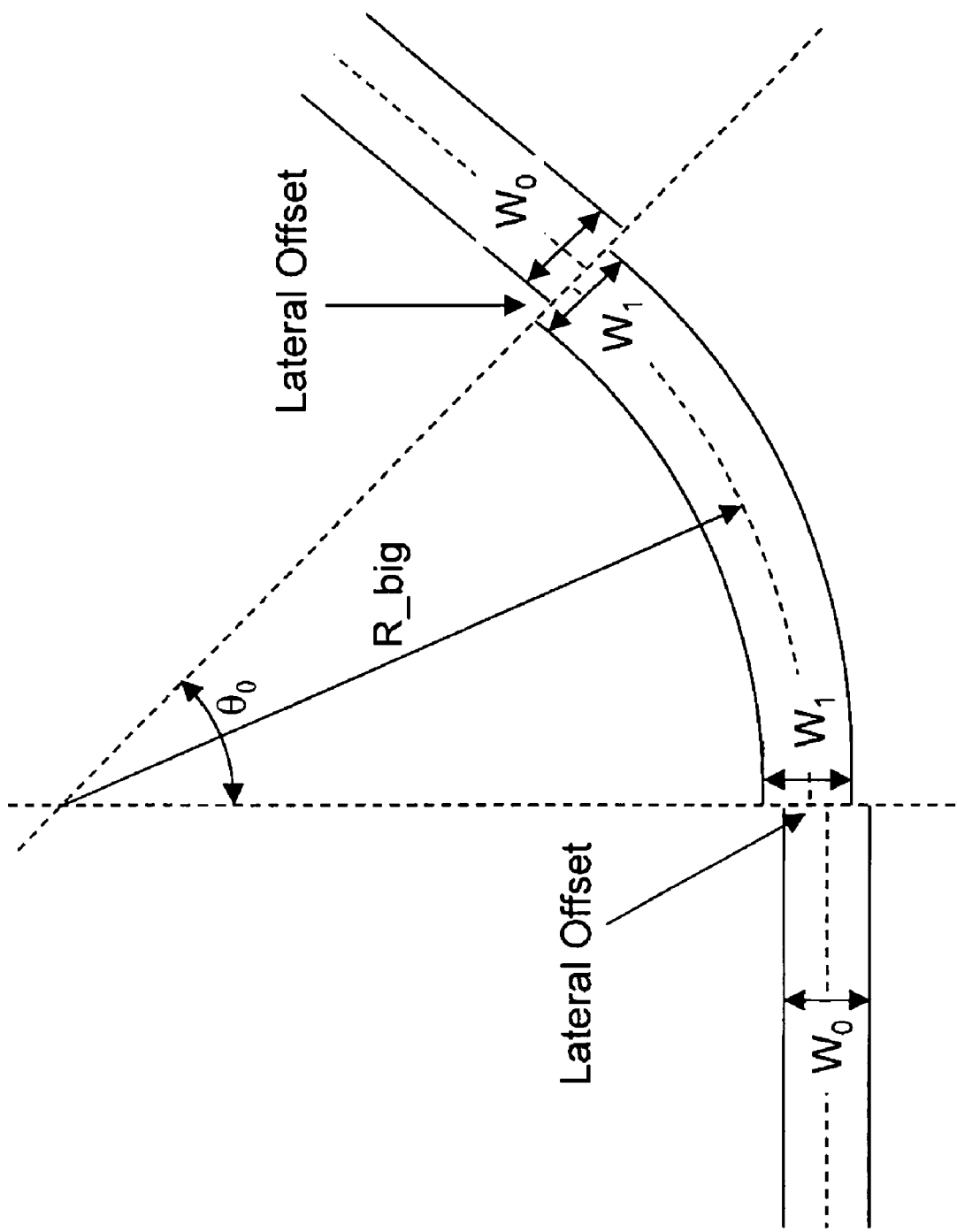
FIG. 27 is a schematic diagram showing a design for reducing optical loss in a large waveguide bend.

Of course other fabrication techniques used to reduce optical loss are also possible. For example, to reduce optical loss between the bend (B) and straight (A,C) waveguide sections, the waveguides are optionally fabricated with lateral offsets at the start and finish of the circular arcs (i.e., at the arc/straight waveguide junctions). The use of lateral offset is well-known in the art and is shown schematically in FIG. 27. Some example of suitable values for $W_o$ or $W_l$, $R_{big}$ and $\theta_o$ are 5–7 μm, 25,000 μm and 14 degrees, respectively.

Figure 28:
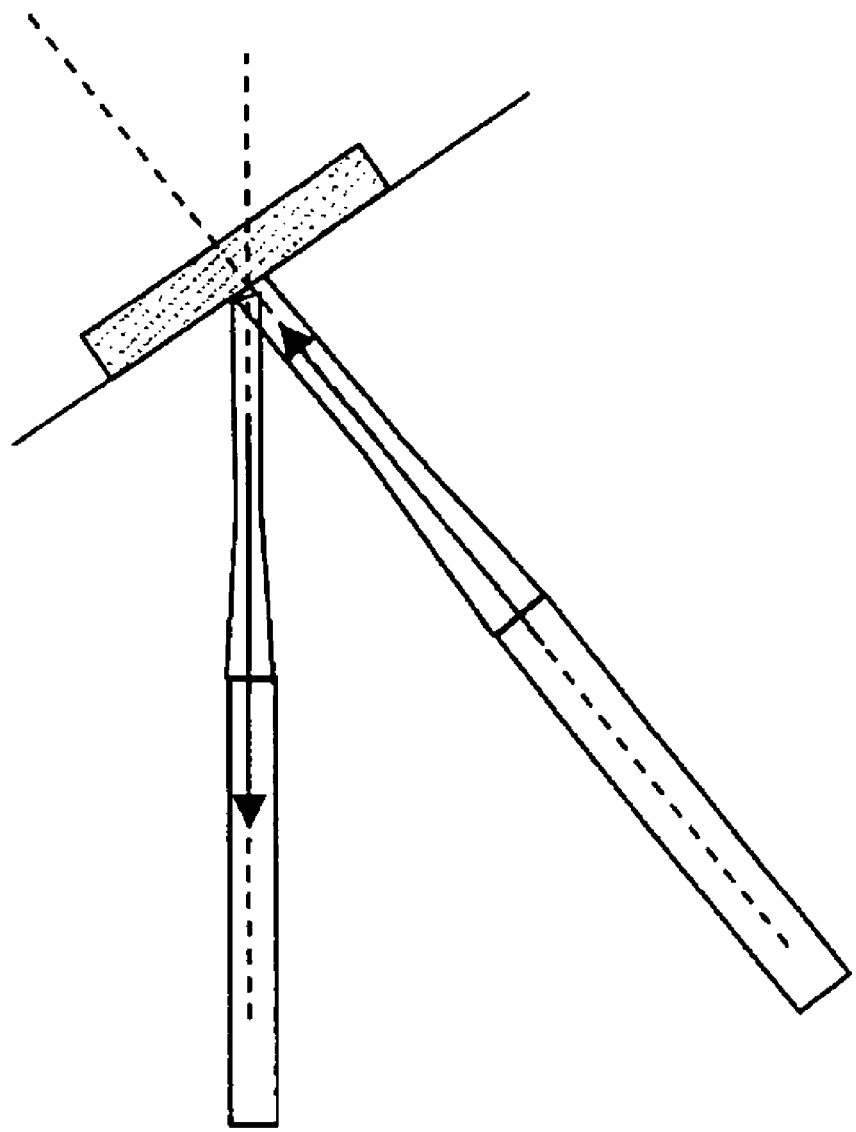
FIG. 28 is a schematic diagram showing a design for reducing optical loss in the optical fold region used tapered waveguides.
Figure 29:
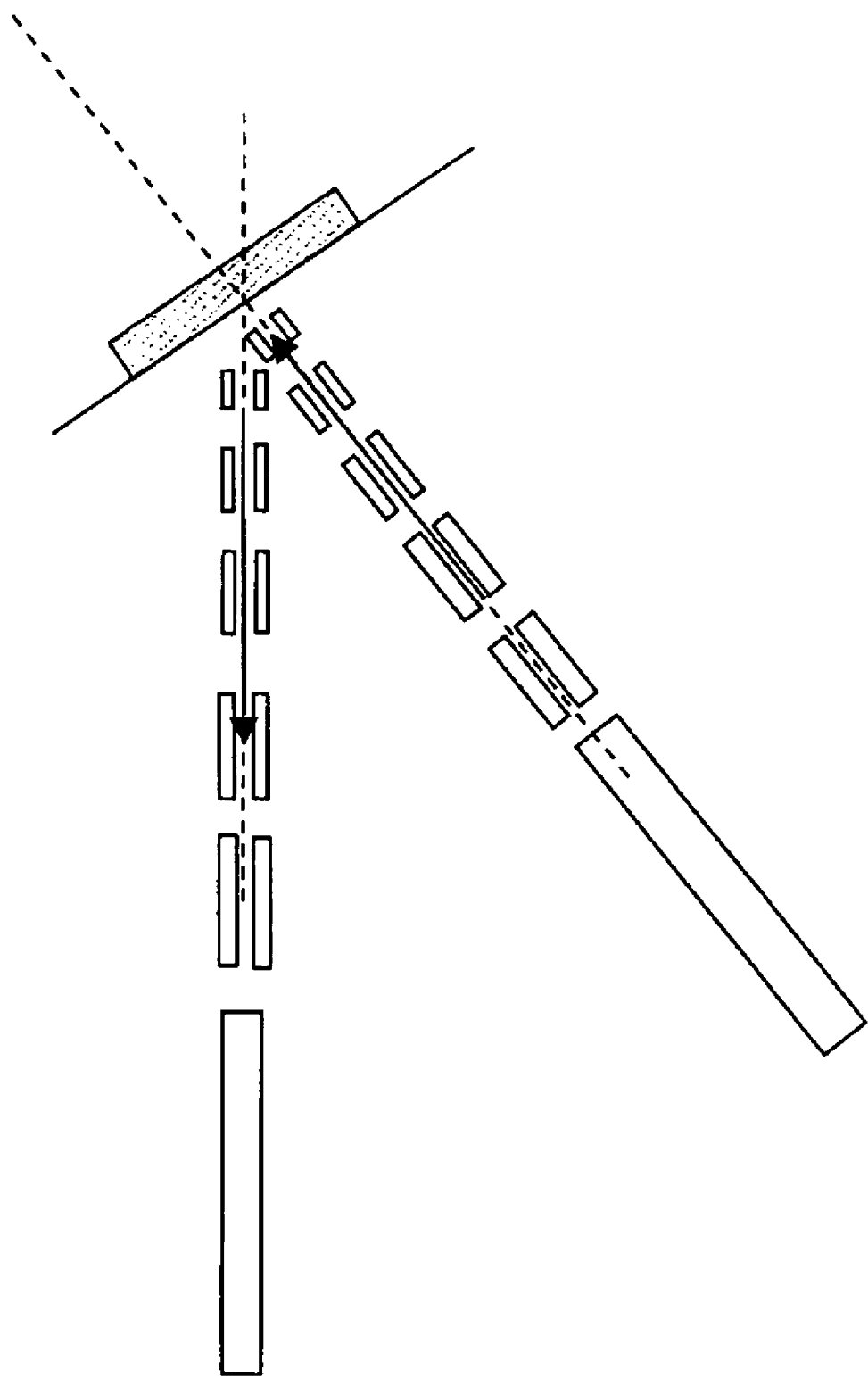
FIG. 29 is a schematic diagram showing a design for reducing optical loss in the optical fold region using segmented waveguides.

In addition, optical loss is optionally reduced by providing tapered waveguides as shown in FIG. 28 and/or longitudinal and/or lateral segmentation as shown in FIG. 29. Tapering the waveguide width and/or segmenting the waveguide reduces lateral and vertical confinement, and thus increase the horizontal and vertical mode sizes. Larger modes reduce the sensitivity to polishing errors as the resulting lateral offset of the reflected beam is a smaller percentage of the overall beam width. Optionally, the duty cycle of the segmentation is tapered as the waveguides approach and leave the mirror so as to prevent optical loss due to abrupt mode size changes.

One fabrication technique that is optionally used to reduce optical loss is to stitch in a waveguide of a different type in the optical fold region. For example, according to one embodiment the section(s) of the optical waveguide that are in close proximity to the electrodes are Ti-infused, while the section(s) of the optical waveguide in the optical fold region are annealed proton exchange (APE) waveguides. APE waveguides advantageously serve as an integrated polarizer.

Figure 30:
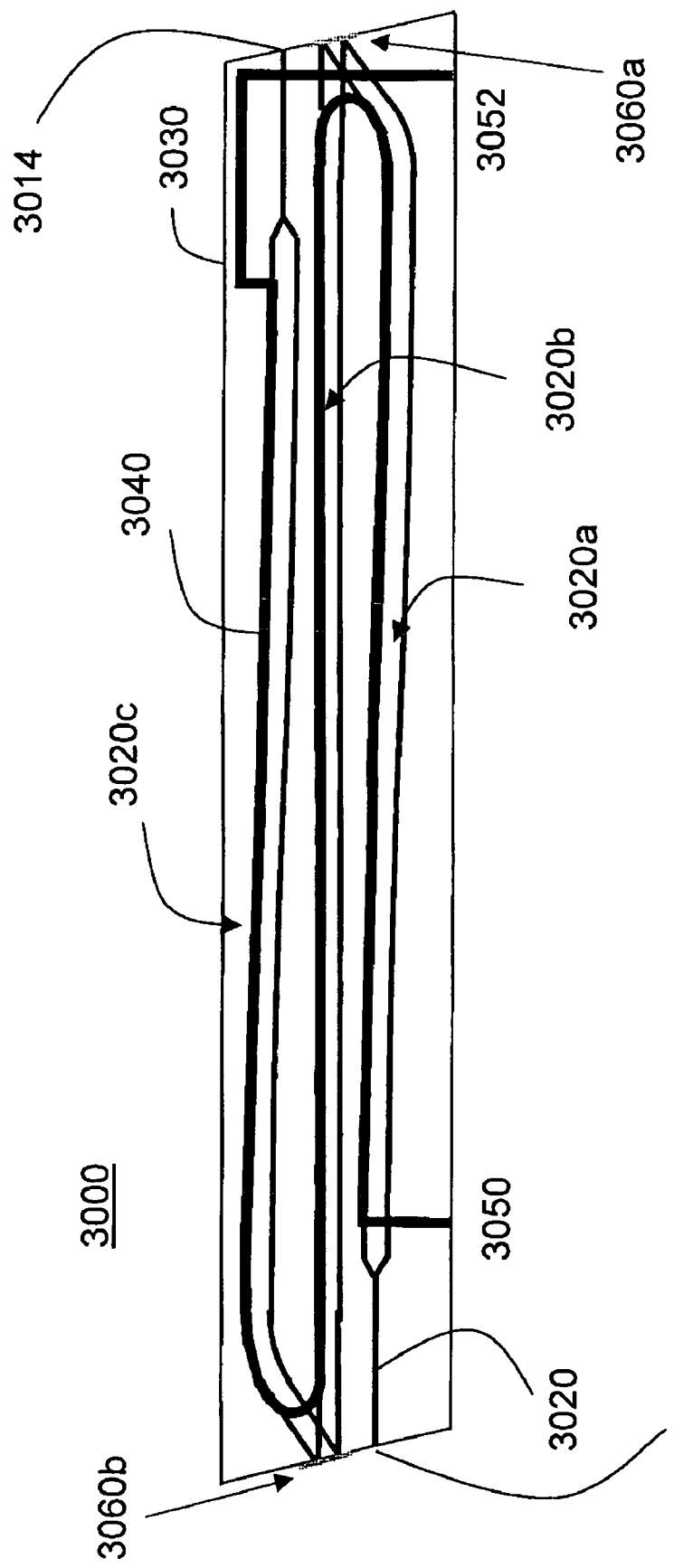
FIG. 30 is a schematic diagram of a 3-pass Mach-Zehnder optical modulator having a reflector on an angled endface.

Referring to FIG. 30, there is shown a schematic diagram of an embodiment of a 3-pass optical external modulator with angled endfaces. The optical modulator 3000 includes an optical waveguide 3020 formed in an z-cut lithium niobate (LiNbO$_3$) substrate 3030. The optical waveguide 3020 includes a first interferometer section 320a where the input waveguide branches into first and second interferometer arms, a second interferometer section 3020b where the first and second interferometer arms run parallel to the primary direction of optical propagation, and a third interferometer section 3020c where the output waveguide couples the first and second interferometer arms. Each end of the substrate 3030 is angled with respect to the primary direction of optical propagation and/or so as to form an acute angle with an edge of the substrate 3030. A mirror or reflective surface 3060a/3060b is coupled to the angled endfaces for reflecting light within the different parts of the interferometer (i.e., between 320a and 3020b and 3020c). For illustrative purposes, only the hot electrode of the electrode structure 3040 is shown. In particular, only the hot electrode of a ground-hot-ground electrode configuration is shown. One of the interferometer arms travels underneath the hot electrode for each of the three passes through the interferometer as shown, while the other interferometer arm travels underneath one ground electrode during the first pass, underneath the opposing ground electrode for the second pass, and underneath the first ground electrode for the third pass. Alternatively, a two-electrode configuration (hot-ground) is accommodated by including an electrical bridge, such as a wire bond, that provides a means for the ground electrode current to cross over the hot electrode. A single input terminal 3050 provides an input for the driving and bias voltages, while a single output terminal 3052 provides an output for the remaining drive signal.

In operation, light is input into the modulator 3000 through the input port 3012 and is output through the output port 3014. More specifically, the light input through the input port propagates through the optical waveguide 3020 until it is split at the first Y-branch where it then propagates equally along the two isolated paths corresponding to the two interferometer arms. When the light propagating through each arm of the interferometer reaches the mirror 3060a, it is reflected back along a different optical path until it reaches mirror 3060b and is directed to the output port 3014. When a time varying drive voltage, corresponding to a RF data modulation signal, is applied to the traveling-wave electrode structure 3040 the electro-optic effect causes the relative velocity of the light propagating through the two interferometer arms to change, thus creating a phase shift and producing constructive or destructive interference at the second Y-branch. The constructive and/or destructive interference produces an output amplitude modulated optical signal, where the modulation corresponds to the modulation of the RF data signal.

Figure 31:
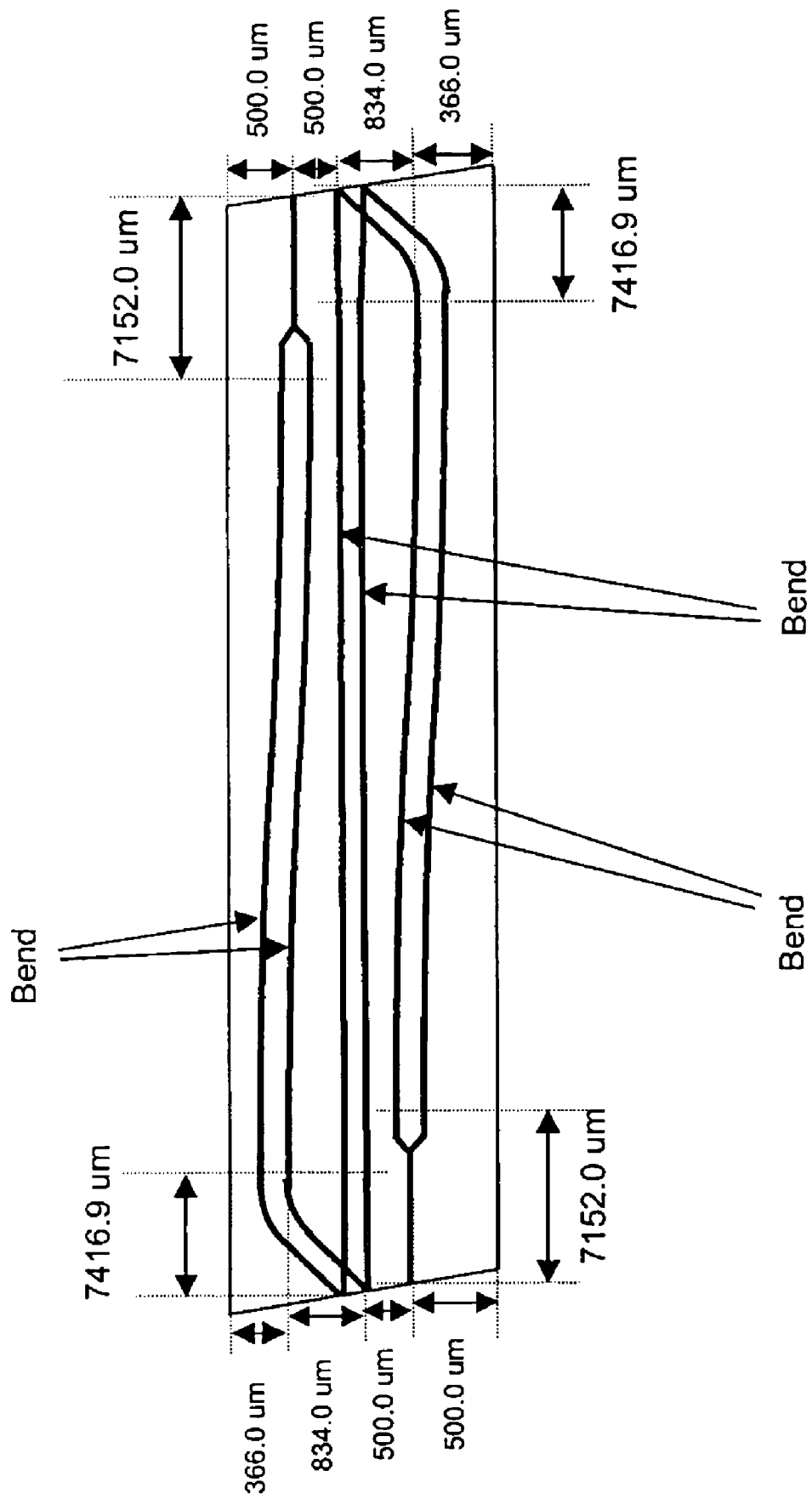
FIG. 31 is a schematic diagram showing a specific example of the 3-pass Mach-Zehnder optical modulator illustrated in FIG. 31.

In addition to the advantages discussed with respect to FIG. 21, this embodiment provides the additional advantage of increased interaction length (i.e., 3 times greater as opposed to twice as great). This results in a nearly three times reduction in the length of the modulator die. Furthermore, since the first and third interferometer sections are also angled with respect to the primary direction of optical propagation (e.g., have additional bends), the width of the modulator die is also reduced. With proper design it is possible to achieve a die width of approximately 2.2 mm, a number frequently found for single pass optical modulators. Referring to FIGS. 25 and 31, there are shown some examples of suitable dimensions for the optical modulator shown in FIG. 30. Reducing both die width and length increase the die count per wafer and significantly reduces manufacturing costs.

A further advantage of the instant embodiment is provided by alternating between having straight and bent sections on the incident end of the reflectors. More specifically, at the optical fold near the first reflective surface 3060a, incident light transmitted through the first interferometer section 320a propagates through bent waveguides and is reflected back through approximately straight waveguides, whereas at the optical fold near the second reflective surface 3060b, incident light transmitted through the second interferometer section 3020b approaches through approximately straight waveguides and is reflected back through bent waveguides to the third interferometer section 3020c. Alternating between straight and bent sections on the incident end of the reflectors advantageously maintains equal optical path lengths in the two interferometer arms.

Of course, the optical external modulator shown in FIG. 30 is described as above for exemplary purposes only. Alternatively, the optical modulator 3000 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a x- or y-cut electro-optic substrate, to replace the traditional traveling wave electrode with another electrode structure such as a lumped or dual drive electrode, to provide a polarizer near the input/output ports, and/or to fabricate the modulator as a four-pass optical modulator. When the modulator is fabricated as a four-pass modulator, the reflector or reflective surface is either continuous or patterned.

Figure 32:
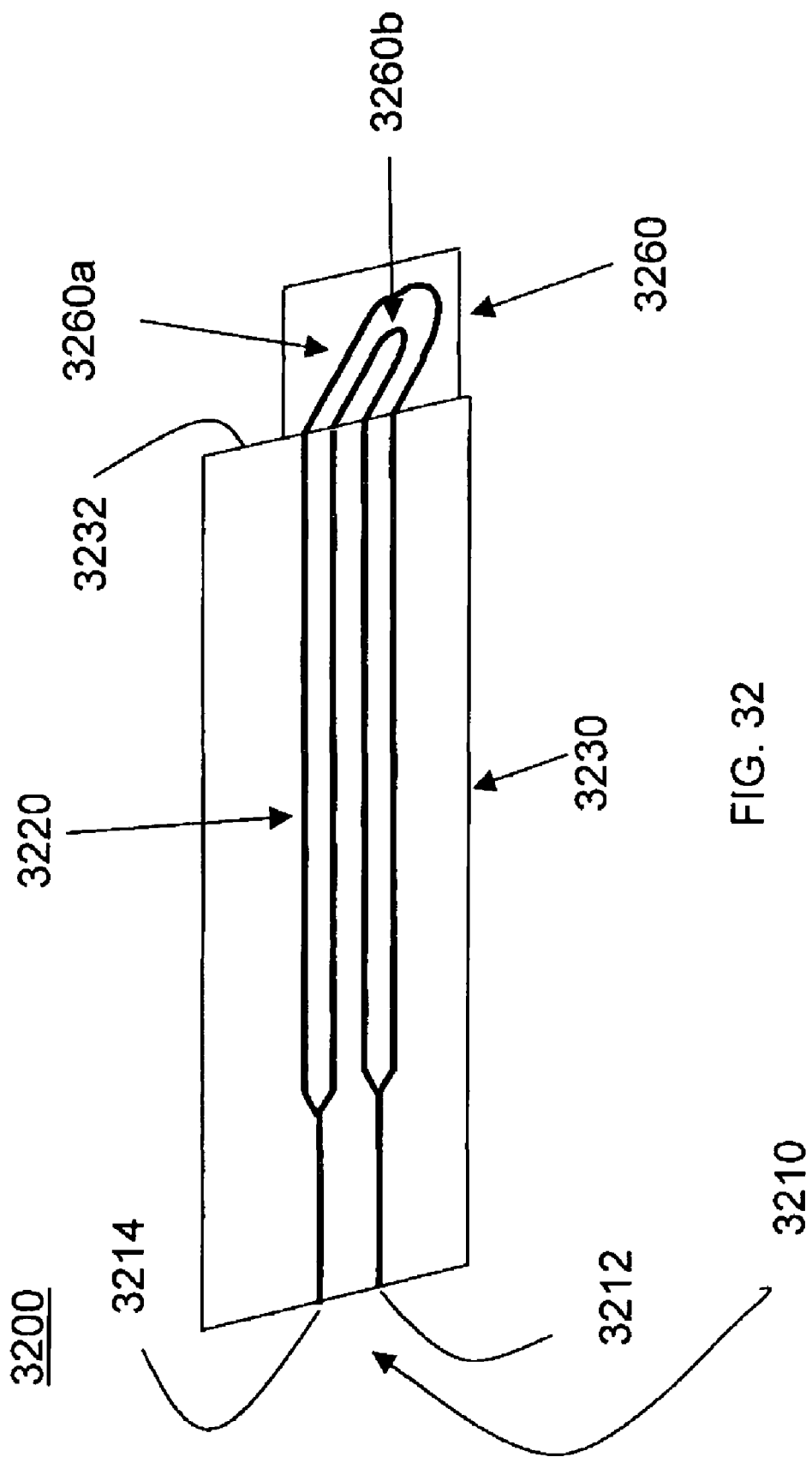
FIG. 32 is a schematic diagram of embodiment of an optical modulator using angled endfaces and a U-shaped waveguide reflector; and, FIG. 33 is a schematic diagram of embodiment of an optical modulator using angled endfaces and a non-concentric waveguide reflector.

Referring to FIG. 32, there is shown yet another embodiment of an optical modulator using angled endfaces. The optical modulator 3200 includes an optical waveguide 3220 formed in a z-cut lithium niobate (LiNbO$_3$) substrate 3230. The optical waveguide 3220 includes a first Y-branch, a first interferometer arm, a second interferometer arm, and a second Y-branch, which collectively form an integrated Mach-Zehnder interferometer. At the end of the substrate 3230 opposing the input/output end 3210 a reflector 3260 redirects light from a first interferometer section including the first Y-branch, a first part of the first interferometer arm, and a first part of the second interferometer arm to a second interferometer section including a second part of the first interferometer arm, a second part of the second interferometer arm and the second Y-branch. More specifically, the reflector is a glass substrate having two U-shaped waveguides 3260a and 3260b, both having with tight bends. A traveling-wave electrode structure (not shown) is provided to provide an interaction section that is parallel to the interferometer arms in the electro-optic substrate 3230. Preferably, the traveling-wave electrode structure (not shown) includes a hot electrode that is disposed above the lower interferometer arm in the first interferometer section and above the upper interferometer arm in the second interferometer section. A single input terminal (not shown) provides an input for the driving and bias voltages, while a single output terminal (not shown) provides an output for the remaining drive signal.

In operation, light is input into the modulator 3200 through the input port 3212 and is output through the output port 3214. More specifically, the light input through the input port propagates through the optical waveguide 3220 until it is split at the first Y-branch, where it then propagates equally along the two isolated paths corresponding to the two interferometer arms. When the light propagating through each arm of the first lower section of the interferometer reaches the angled endface 3232 that is opposite the input/output end, it is coupled into the waveguide on the glass substrate 3260 and is redirected to the second upper section of the interferometer. When a time varying drive voltage, corresponding to a RF data modulation signal, is applied to the traveling-wave electrode structure (not shown) the electro-optic effect causes the relative velocity of the light propagating through the two interferometer arms to change, thus creating a phase shift and producing constructive or destructive interference at the second Y-branch. The constructive and/or destructive interference produces an output amplitude modulated optical signal, wherein the modulation corresponds to the modulation of the RF data signal.

Advantageously, this embodiment provides quasi-velocity matching between the optical signal and the RF signal, uses angled endfaces on the substrate, and straight waveguides in the optical fold regions. With regards to the quasi-velocity matching, the length of the waveguides in the glass substrate provides the optical delay.

Further advantageously, this embodiment also provides a relatively narrow electro-optic substrate. The narrowness of the substrate is due to the fact that waveguide bends can be tighter in glass substrates than electro-optic substrates, such as lithium niobate.

Of course, the optical digital external modulator shown in FIG. 32 is described as above for exemplary purposes only. Alternatively, the optical modulator 3200 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a x- or y-cut electro-optic substrate, to replace the traditional traveling wave electrode with another electrode structure such as a lumped or dual drive electrode, and/or to include a polarizer (not shown) near the input/output ports. If the optical modulator is fabricated using an x-cut electro-optic substrate, then the design optionally includes an electrical polarity reversal or a cross in the reflector waveguides 3260a and 3260b. Electrical polarity reversal is described in greater detail in U.S. Pat. No. 6,192,167, which is hereby incorporated by reference. Optionally, the reflector 3260 is made of materials other than glass such as polymer, InP, or GaAs.

Figure 33:
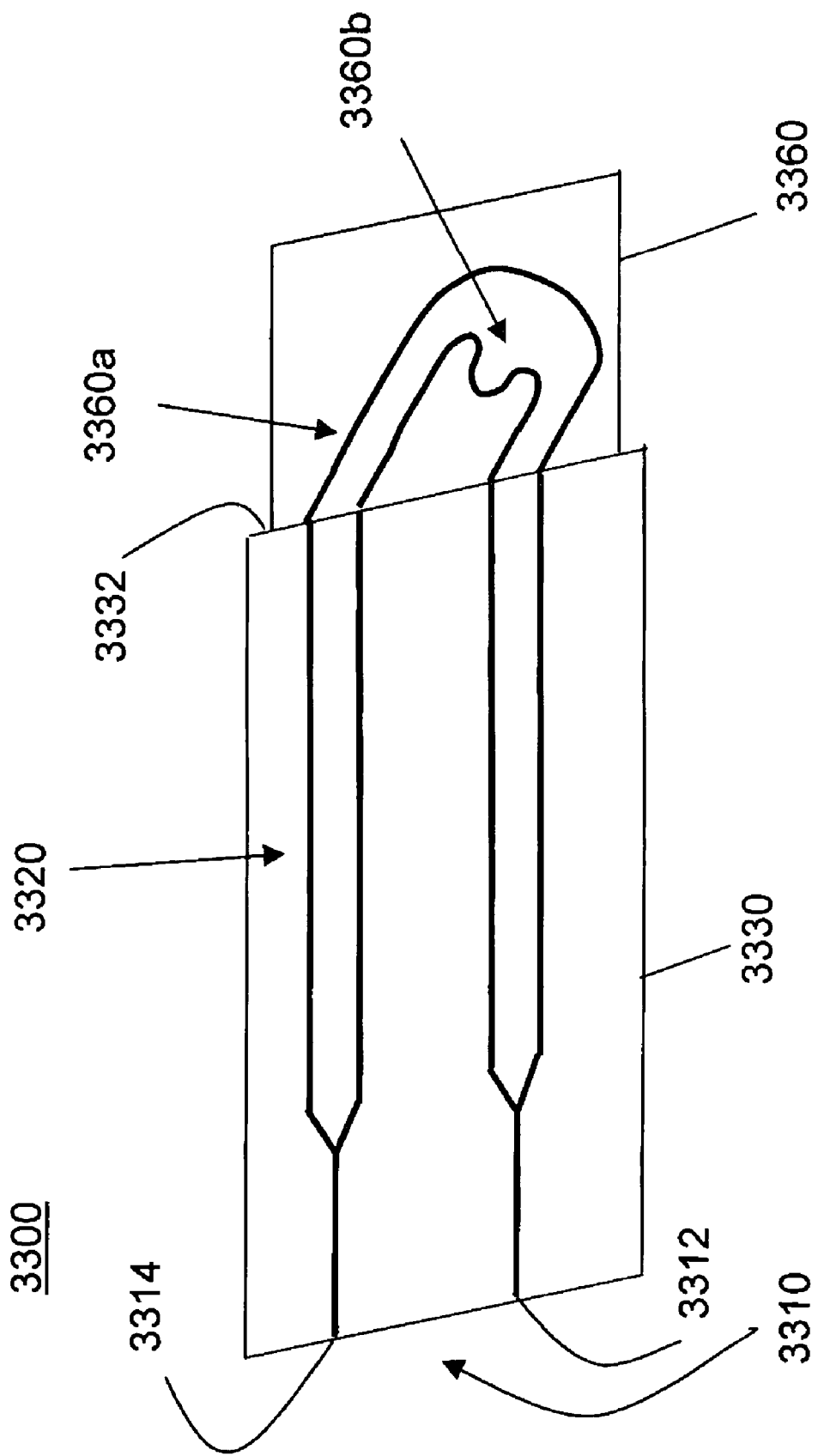

Referring to FIG. 33, there is shown yet another embodiment of an optical modulator using angled endfaces. The optical modulator 3300 includes an optical waveguide 3320 formed in a z-cut lithium niobate (LiNbO$_3$) substrate 3330. The optical waveguide 3320 includes a first Y-branch, a first interferometer arm, a second interferometer arm, and a second Y-branch, which collectively form an integrated Mach-Zehnder interferometer. At the end of the substrate 3330 opposing the input/output end 3310, a reflector 3360 redirects light from a first interferometer section including the first Y-branch, a first part of the first interferometer arm, and a first part of the second interferometer arm to a second interferometer section including a second part of the first interferometer arm, a second part of the second interferometer arm and the second Y-branch. More specifically, the reflector is a glass substrate having a U-shaped waveguide 3360a and a non-concentric U-shaped waveguide 3360b, both having tight bends. A traveling-wave electrode structure (not shown) is provided to provide an interaction section that is parallel to the interferometer arms in the electro-optic substrate 3330. Preferably, the traveling-wave electrode structure (not shown) includes a hot electrode that is disposed above the lower interferometer arm in the first interferometer section and above the upper interferometer arm in the second interferometer section. A single input terminal (not shown) provides an input for the driving and bias voltages, while a single output terminal (not shown) provides an output for the remaining drive signal.

In operation, light is input into the modulator 3300 through the input port 3312 and is output through the output port 3314. More specifically, the light input through the input port propagates through the optical waveguide 3320 until it is split at the first Y-branch, where it then propagates equally along the two isolated paths corresponding to the two interferometer arms. When the light propagating through each arm of the first lower section of the interferometer reaches the angled endface 3332 that is opposite the input/output end, it is coupled into the waveguide on the glass substrate 3360 and is redirected to the second upper section of the interferometer. When a time varying drive voltage, corresponding to a RF data modulation signal, is applied to the traveling-wave electrode structure (not shown) the electro-optic effect causes the relative velocity of the light propagating through the two interferometer arms to change, thus creating a phase shift and producing constructive or destructive interference at the second Y-branch. The constructive and/or destructive interference produces an output amplitude modulated optical signal, where the modulation corresponds to the modulation of the RF data signal.

Advantageously, this embodiment provides quasi-velocity matching between the optical signal and the RF signal, uses angled endfaces on the substrate, uses straight waveguides in the optical fold regions, and affords a relatively narrow electro-optic substrate.

Further advantageously, the non-concentric nature of the reflector 3360 is designed to match optical path lengths between the two interferometer arms. Providing matched optical path lengths helps to stabilize the modulator with respect to temperature fluctuations.

Of course, the optical digital external modulator shown in FIG. 33 is described as above for exemplary purposes only. Alternatively, the optical modulator 3300 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to use a x- or y-cut electro-optic substrate, to replace the traditional traveling wave electrode with another electrode structure such as a lumped or dual drive electrode, to replace the mirror with another reflective element, and/or to include a polarizer (not shown) between the substrate and the lenses and/or near the input/output ports. If the optical modulator is fabricated using an x-cut electro-optic substrate, then the design optionally includes an electrical polarity reversal or a cross-over in the reflector waveguides 3260a and 3260b. Electrical polarity reversal is described in greater detail in U.S. Pat. No. 6,192,167, which is hereby incorporated by reference. Optionally, the reflector 3260 is made of materials other than glass such as polymer, InP, or GaAs.

Figure 34:
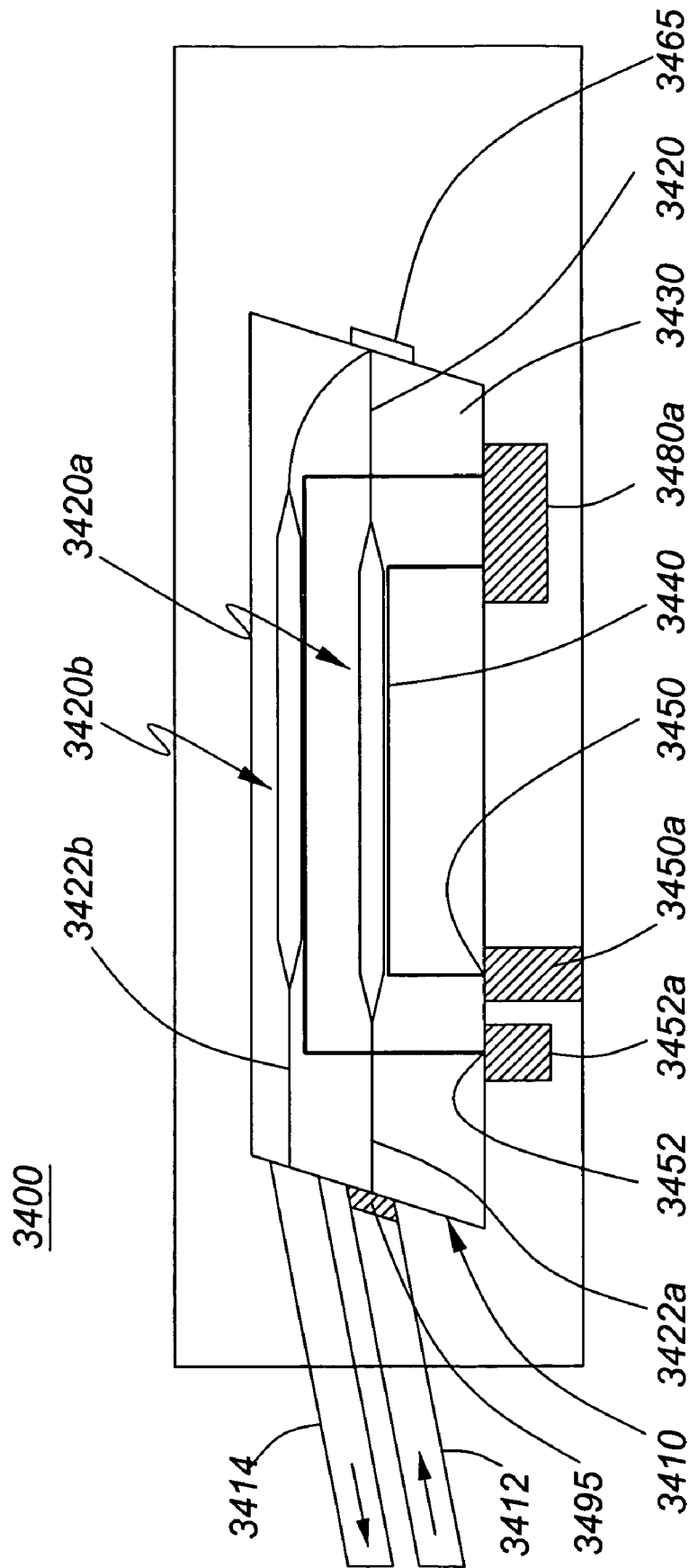
FIG. 34 is a schematic diagram of another embodiment of an optical modulator using angled endfaces.

Referring to FIG. 34, there is shown yet another embodiment of an optical modulator using angled endfaces. The optical modulator 3400 includes an optical waveguide 3420 formed in an z-cut lithium niobate (LiNbO$_3$) substrate 3430. The optical waveguide 3420 includes a first Mach-Zehnder interferometer 3420a and a second Mach-Zehnder interferometer 3420b. Input 3412 and output 3414 optical fibers are attached to one end 3410 of the substrate 3430. Optionally, the two fibers are aligned and mounted to the substrate with silicon V-grooves. At the end of the substrate 3430 opposing the input/output end 3410, a reflective surface 3465 is coupled to the end of the substrate. More specifically, the reflective surface 3465 is coated on the end of the angled endface. The waveguide 3420 approaches the reflective surface 3465 with a section of waveguide that is straight and is diverted away from the reflective surface 3465 with a section of waveguide that includes a waveguide bend. The angled endface forms an angle (i.e., that is other than 90°) to the primary direction of optical propagation. The primary direction of optical propagation is defined by the direction of the waveguide that couples optical power from the input optical fibers 3412. For example, in this embodiment the input 3422a optical waveguide section couples light into the device and its optical axis defines the primary direction of optical propagation. A traveling-wave electrode structure 3440, which for improved clarity does not show the individual electrodes, is provided near the first and second interferometers 3420a and 3420b. A single input terminal 3450 provides an input for the driving voltages, while a single output terminal 3452 provides an output for the remaining drive signal. Each of the input 3450 and output 3452 terminals are coupled to a separate ceramic substrate 3450a and 3452a on which the RF launch and RF termination circuits are formed, respectively. An RF driver (not shown) is coupled to the RF launch ceramic 3450a. A high-pass filter and bias-tee network (not shown) is provided on the third substrate 3480a and forms part of the electrical path linking the first and second stages of the optical modulator. Preferably, the high-pass filter and bias tee network includes a high-pass filter for passing higher frequencies and rejecting lower ones and bias-tees for injecting DC bias voltages into the RF circuit without affecting the flow of the RF. For example, FIG. 5b shows one example of a circuit suitable for serving as the high-pass filter and bias-tee network. A polarizer 3495 is provided between the substrate and the input optical fiber 3412 to attenuate the unwanted polarization state.

In operation, light is input into the modulator 3400 from the input fiber 3412 and is output the output fiber 3414. More specifically, the light input through the input fiber 3412 propagates through the optical waveguide 3420 to the first interferometer 3420a. When a time varying voltage is applied to the electrode structure 3440 via terminal 3450, an electric field is produced that propagates down the traveling-wave electrode structure 3440, which is constructed to form a microwave waveguide. The electric field at least partially overlaps the two interferometer arms of the first interferometer 3420a. In accordance with the electro-optic effect, the electric field causes the relative velocity of the light propagating through the two interferometer arms to change, thus creating a phase shift and producing constructive or destructive interference at the second Y-branch. The constructive and/or destructive interference produces an amplitude modulated optical signal, wherein the modulation corresponds to a modulated RF data signal used to produce the time varying voltage. The amplitude modulated optical signal propagates through the optical waveguide 3420 to the reflective surface 3465, where it is reflected and transmitted to the second interferometer 3420b. Simultaneously, the RF drive signal remaining at the end of the first interferometer 3420a passes through the high pass filter (not shown) and is applied to the second interferometer 3420b. This creates an electric field that propagates down the electrode structure 3440, which is constructed to form a microwave waveguide, and at least partially overlaps the two interferometer arms of the second interferometer 3420b. In accordance with the electro-optic effect, the electric field further impresses the synchronized modulated RF data signal onto the amplitude modulated optical signal, which is subsequently output the output fiber 3414.

Advantageously, this embodiment provides the advantages afforded with a cascaded interferometer design, allows quasi-velocity matching between the optical signal and the RF signal, uses angled endfaces on the substrate, and uses straight waveguides in the optical fold regions.

Of course, the optical digital external modulator shown in FIG. 34 is described as above for exemplary purposes only. Alternatively, the optical modulator 3400 is fabricated with other methods known to those skilled in the art, such as those described in Wooten et al., "A Review of Lithium Niobate Modulators for Fiber-Optic Communications Systems," IEEE Journal of Selected Topics in Quantum Electronics, vol. 6, no. 1, pp. 69–82 January/February 2000, hereby incorporated by reference. For example, it is possible to replace the lithium niobate substrate with another electro-optic substrate, such as a semiconductor (e.g., GaAs or InP), to provide an RF input terminal for each interferometer, and/or to replace the traditional traveling wave electrode with another electrode structure such as a lumped or dual drive electrode.

In each of the above embodiments, quasi-velocity matching advantageously provides improved modulator efficiency and/or RF performance. Preferably, quasi-velocity matching is achieved by introducing an optical time delay that supports the use of electrode structures wherein the RF signal travels much slower than the light. According to the above embodiments, the optical time delay is intentionally introduced by providing a free-space region between the electro-optic substrate and the reflective surface, by providing a lens between the electro-optic substrate and the reflective surface, and/or by increasing the length of the optical waveguides that are not in close proximity to the electrode structure. The magnitude of the optical time delay is predetermined in dependence upon the length of the optical waveguides in close proximity to the electrode structure (i.e., the length of the active region) and/or the magnitude of the velocity mismatch. Notably, quasi-velocity matching provides increased efficiency and/or performance when the velocity mismatch is relatively large and/or as the number of passes/stages increases. With respect to the latter, improved modulator efficiency is achieved even for the two pass design, and improves further with each additional pass, for the same total length of active region. Additional passes reduce the amount of velocity walk-off that occurs between the RF and optical signals before RF-optical synchronism is restored with optical delay in the optical fold region. With respect to the former, improved modulator efficiency and/or RF performance is achieved when the group velocity mismatch, given by the difference in microwave-optical refractive indices, is greater than 0.1. Since the RF and optical indices in lithium niobate are about 2.0, this corresponds to a significant 5% velocity mismatch. Experimentally, quasi-velocity matching has been found to compensate for a velocity mismatch as large as 40% in an optical modulator based on two cascaded interferometers.

The embodiments of the invention described above are intended to be exemplary only. For example, according to other embodiments the quasi-velocity matched modulators discussed above are used in non-digital applications. Furthermore, there are numerous possibilities for the use of substrates with angled endfaces. The scope of the invention is therefore intended to be limited solely by the scope of the appended claims.

What is claimed is:

1. An optical external modulator comprising:
an electro-optic substrate;
an optical waveguide formed on the electro-optic substrate, the optical waveguide including a first interferometer section and a second interferometer section;
an electrode structure disposed on the electro-optic substrate, the electrode structure for transmitting an RF drive signal that is applied to the first and second interferometer sections in series; and
a reflector optically disposed between the first and second interferometer sections, the reflector for redirecting light away from the first interferometer section to the second interferometer section and disposed to provide an optical fold region that introduces an optical time delay between the first and second interferometer sections, the optical time delay for at least partially compensating for a velocity mismatch between the light and the RF drive signal.

2. An optical external modulator according to claim 1, wherein the first and second interferometer sections are first and second Mach-Zehnder interferometers, respectively.

3. An optical external modulator according to claim 1, wherein the first and second interferometer sections are different parts of a same Mach-Zehnder interferometer.

4. An optical external modulator according to claim 3, wherein the first interferometer section includes an input waveguide that branches into first and second interferometer arms of the interferometer.

5. An optical external modulator according to claim 4, wherein the second interferometer section includes an output waveguide that couples the first and second interferometer arms.

6. An optical external modulator according to claim 4, comprising a second reflector, the second reflector disposed for redirecting light away from the second interferometer section to a third other interferometer section, the third interferometer section including an output waveguide that couples the first and second interferometer arms.

7. An optical external modulator according to claim 4, wherein the reflector comprises a reflective surface disposed on an endface of the electro-optic substrate, the endface being at an angle to an optical axis of the input waveguide, the angle being other than 90 degrees.

8. An optical external modulator according to claim 7, the angle being less than 85 degrees or greater than 95 degrees.

9. An optical external modulator according to claim 3, wherein the reflector comprises at least one lens and at least one reflective surface, the at least one lens coupled to the optical substrate, the at least one reflective surface disposed a fixed distance from the electro-optic substrate, the fixed distance selected in dependence upon a desired magnitude of the optical time delay.

10. An optical external modulator according to claim 9, wherein the at least one lens comprises a lens array.

11. An optical external modulator according to claim 3, wherein the reflector comprises a substrate having an approximately u-shaped waveguide formed thereon, the substrate coupled to an angled endface of the electro-optic substrate.

12. An optical external modulator according to claim 1, wherein the reflector comprises at least one of a lens, a lens array, a reflective surface, a prism, a reflective directional coupler, a tunable reflective directional coupler, an integrated mirror system, a MEMS mirror, and a second substrate having a substantially u-shaped waveguide thereon.

13. An optical external modulator according to claim 1, wherein the optical waveguide includes up to N interferometer sections, each of the N interferometer sections separated from another by one of N−1 reflectors, N being equal to or greater than 3.

14. An optical external modulator according to claim 1, wherein the electrode structure includes a first electrode for providing the RF drive signal to the first interferometer section and a second electrode for providing the RF drive signal to the second interferometer section, the first and second electrodes coupled via an electrical path.

15. An optical external modulator according to claim 14, wherein the first and second interferometer sections are first and second Mach-Zehnder interferometers, respectively, the first and second Mach-Zehnder interferometers coupled by a section of the optical waveguide having an optical propagation time that is longer than the electrical propagation time between the first and second electrodes.

16. An optical external modulator according to claim 15, comprising a high-pass filter disposed in the electrical path.

17. An optical external modulator according to claim 16, comprising first and second bias-tee circuits integrated with the high-pass filter, the first bias-tee circuit including a first input terminal for providing a first bias voltage to the first interferometer and the second bias-tee circuit including a second input terminal for providing a second bias voltage to the second interferometer.

18. An optical external modulator according to claim 1, wherein the reflector comprises a reflective surface coupled to an angled endface of the electro-optic substrate.

19. An optical external modulator according to claim 1, wherein the velocity mismatch is greater than about 5%.

20. An optical external modulator comprising:
an input port for transmitting an optical signal in a first direction;
an electro-optic substrate having first and second endfaces, the second endface opposite the first endface and angled to form an acute angle with the first direction;
an optical waveguide forming an interferometer on the electro-optic substrate, the interferometer optically coupled to the input port and including a first interferometer section and a second interferometer section;
an electrode structure disposed on the electro-optic substrate, the electrode structure for transmitting an RF drive signal that is applied to the first and second interferometer sections to modulate the optical signal; and
a reflective surface coupled to the electro-optic substrate at the second endface, the reflective surface for redirecting light away from the first interferometer section to the second interferometer section and disposed to provide an optical fold region wherein first and second fold sections of the optical waveguide converge at the reflective surface, one of the first and second fold sections being substantially straight, the other of the first and second fold sections including a waveguide bend.

21. An optical external modulator according to claim 20, wherein the acute angle is less than about 85 degrees.

22. An optical external modulator according to claim 20, wherein the fold section of optical waveguide that is substantially straight is substantially parallel to the first direction.

23. An optical external modulator according to claim 20, wherein a radius of curvature of the waveguide bend is selected in dependence upon the acute angle.

24. An optical external modulator according to claim 20, wherein the first and second fold sections of optical waveguide converge at the reflective surface with straight waveguide sections.

25. An optical external modulator according to claim 20, wherein the first endface is substantially parallel to the second endface.

26. An optical external modulator according to claim 25, comprising another reflective surface coupled to the electro-optic substrate at the first endface, the other reflective surface for redirecting light away from the second interferometer section to a third interferometer section and disposed to provide another optical fold region wherein third and fourth fold sections of the optical waveguide converge at the other reflective surface, one of the third and fourth fold sections being substantially straight, the other of the third and fourth fold sections including a waveguide bend.

27. An optical external modulator according to claim 26, wherein the interferometer includes first and second interferometer arms, and wherein the first, second, third, and fourth fold sections are part of one of the first and second interferometer arms.

28. An optical external modulator according to claim 27, wherein the first, second, third and fourth fold sections are disposed for equalizing optical path lengths of the first and second interferometer arms.

29. An optical external modulator according to claim 26, wherein each of the first, second, and third interferometer sections includes two substantially parallel waveguide regions, and wherein the substantially parallel waveguide regions in the first interferometer section are angled relative to the substantially parallel waveguide regions in the second interferometer section.

30. An optical external modulator according to claim 20, wherein the optical waveguide in the optical fold region includes at least one of a sculpted waveguide section, a notch, a lateral offset, a tapered waveguide section, a longitudinal segmentation section, a lateral segmentation section, and a waveguide section fabricated using a different process.

31. An optical external modulator comprising:

an input port for transmitting an optical signal in a direction of primary optical propagation;

an electro-optic substrate having first and second endfaces, the second endface opposite the first endface and angled to form an acute angle with the direction of primary optical propagation;

an optical waveguide forming an interferometer on the electro-optic substrate, the interferometer optically coupled to the input port and including a first interferometer section where the optical waveguide branches into first and second interferometer arms and a second interferometer section where the first and second interferometer arms merge;

an electrode structure disposed on the electro-optic substrate, the electrode structure for transmitting an RF drive signal that is applied to the optical waveguide to modulate the optical signal; and a reflector coupled to the electro-optic substrate at the second endface, the reflector for folding the first and second interferometer arms.

32. An optical external modulator according to claim 31, wherein the reflector comprises a second substrate having a substantially u-shaped waveguide thereon.

* * * * *